(12) United States Patent
Hartman et al.

(10) Patent No.: US 7,213,006 B2
(45) Date of Patent: May 1, 2007

(54) METHOD AND APPARATUS FOR TRAINING A SYSTEM MODEL INCLUDING AN INTEGRATED SIGMOID FUNCTION

(75) Inventors: Eric Jon Hartman, Austin, TX (US); Stephen Piche, Austin, TX (US); Mark Gerules, Cedar Park, TX (US)

(73) Assignee: Pavilion Technologies, Inc., Austin, TX (US)

( * ) Notice: Subject to any disclaimer, the term of this patent is extended or adjusted under 35 U.S.C. 154(b) by 0 days.

(21) Appl. No.: 11/267,812

(22) Filed: Nov. 4, 2005

(65) Prior Publication Data

US 2006/0074501 A1 Apr. 6, 2006

Related U.S. Application Data

(63) Continuation of application No. 09/662,243, filed on Sep. 14, 2000, now Pat. No. 7,058,617, which is a continuation-in-part of application No. 09/167,504, filed on Oct. 6, 1998, now Pat. No. 6,278,899, which is a continuation-in-part of application No. 08/943,489, filed on Oct. 3, 1997, now Pat. No. 6,047,221, which is a continuation-in-part of application No. 08/643,464, filed on May 6, 1996, now Pat. No. 5,933,345.

(60) Provisional application No. 60/153,791, filed on Sep. 14, 1999.

(51) Int. Cl.
*G06E 1/00* (2006.01)
*G06E 3/00* (2006.01)
*G06F 15/18* (2006.01)
*G06G 7/00* (2006.01)

(52) U.S. Cl. .............................. 706/16; 706/15; 706/23

(58) Field of Classification Search .................. 706/16, 706/15, 23; 700/29
See application file for complete search history.

(56) References Cited

U.S. PATENT DOCUMENTS 3,758,764 A 9/1973 Hamer (Continued)

FOREIGN PATENT DOCUMENTS

| EP | 0280948 A1 | 7/1988 |
| JP | 03004993 A | 10/1991 |
| WO | WO9315448 | 8/1993 |
| WO | WO9612990 | 5/1996 |
| WO | WO9742553 | 11/1997 |

OTHER PUBLICATIONS

Andreas Draeger et al, Model Predictive Control Using Neural Networks, Oct. 1995, IEEE, 0272-1708/95, 61-66.*

T. J. Graettinger, N. V. Bhat, K. Heckendorn and J.S. Buck; "Model Predictive Control Using Neural Networks"; AIChE; Apr. 1994; pp. 1-11.

(Continued)

*Primary Examiner*—Joseph P Hirl
(74) *Attorney, Agent, or Firm*—Meyertons Hood Kivlin Kowert & Goetzel, P.C.; Jeffrey C. Hood

(57) ABSTRACT

Method and apparatus for training a system model with gain constraints. A method is disclosed for training a steady-state model having an input and an output and a mapping layer for mapping the input to the output, the model comprising a stored representation of a plant or process, and including a linear portion and a non-linear portion, where the non-linear portion includes a function. Input is received to the model, and predicted output computed corresponding to attribute(s) of the plant or process. The predicted output is stored, and is usable to manage the plant or process. The model is trained to optimize a specified objective function subject to one or more constraints, e.g., via a non-linear programming (NLP) optimizer, the constraints including, hard constraint(s) comprising strict limitations on the training in optimizing the objective function, and/or soft constraint(s) comprising a weighted penalty function included in the objective function.

23 Claims, 45 Drawing Sheets

U.S. PATENT DOCUMENTS

| | | |
|---|---|---|
| 3,828,171 A | 8/1974 | Griffin |
| 4,228,509 A | 10/1980 | Kennedy |
| 4,230,534 A | 10/1980 | Stewart |
| 4,349,869 A | 9/1982 | Prett et al. |
| 4,358,822 A | 11/1982 | Sanchez |
| 4,368,509 A | 1/1983 | Li |
| 4,583,497 A | 4/1986 | Likins, Jr. et al. |
| 4,604,714 A | 8/1986 | Putman et al. |
| 4,628,462 A | 12/1986 | Putman |
| 4,639,853 A | 1/1987 | Rake et al. |
| 4,663,703 A | 5/1987 | Axelby et al. |
| 4,674,029 A | 6/1987 | Maudal |
| 4,736,316 A | 4/1988 | Wallman |
| 4,769,766 A | 9/1988 | Tung |
| 4,858,147 A | 8/1989 | Conwell |
| 4,868,754 A | 9/1989 | Matsumoto |
| 4,922,412 A | 5/1990 | Lane et al. |
| 4,935,886 A | 6/1990 | Choka |
| 4,964,120 A | 10/1990 | Mostashari |
| 4,965,713 A | 10/1990 | Hong et al. |
| 5,050,095 A | 9/1991 | Samad |
| 5,111,531 A | 5/1992 | Grayson et al. |
| 5,159,562 A | 10/1992 | Putman et al. |
| 5,251,285 A | 10/1993 | Inoue et al. |
| 5,268,834 A | 12/1993 | Sanner et al. |
| 5,282,130 A | 1/1994 | Molnar |
| 5,282,261 A | 1/1994 | Skeirik |
| 5,285,377 A | 2/1994 | Sugasaka et al. |
| 5,305,230 A | 4/1994 | Matsumoto et al. |
| 5,311,452 A | 5/1994 | Yokota et al. |
| 5,311,562 A * | 5/1994 | Palusamy et al. ........... 376/215 |
| 5,353,207 A | 10/1994 | Keeler et al. |
| 5,369,345 A | 11/1994 | Phan et al. |
| 5,408,405 A | 4/1995 | Mozumder et al. |
| 5,442,544 A | 8/1995 | Jelinek |
| 5,467,291 A | 11/1995 | Fan et al. |
| 5,477,444 A | 12/1995 | Bhat et al. |
| 5,579,439 A * | 11/1996 | Khan ........................... 706/2 |
| 5,589,068 A * | 12/1996 | Nielsen ...................... 210/614 |
| 5,659,667 A * | 8/1997 | Buescher et al. ............. 706/23 |
| 5,677,609 A * | 10/1997 | Khan et al. ................. 318/561 |
| 5,682,309 A * | 10/1997 | Bartusiak et al. ............. 700/29 |
| 5,704,011 A | 12/1997 | Hansen et al. |
| 5,710,033 A | 1/1998 | Hallewell et al. |
| 5,781,432 A | 7/1998 | Keeler et al. |
| 5,796,922 A * | 8/1998 | Smith .......................... 706/23 |
| 5,828,812 A * | 10/1998 | Khan et al. .................... 706/2 |
| 5,933,345 A | 8/1999 | Martin et al. |
| 6,047,221 A | 4/2000 | Piche et al. |
| 6,278,899 B1 | 8/2001 | Piche et al. |

OTHER PUBLICATIONS

T. Graettinger, N. V. Bhat and J. S. Buck; "Adaptive Control with NeuCOP, the Neural Control and Optimization Package"; IEEE International Conference; 1994.

Kenneth R. Muske, Dan A. Logue and Michael M. Keaton; "Gain Scheduled Model Predictive Control of A Crude Oil Distillation Unit"; AlChE; Aug. 15, 1991; pp. 1-12.

G. D. Martin; "Systematic Process Modeling and Identification for Prediction, Control and Optimization"; Pavilion Invention Disclosure Description; Jun. 9, 1995.

C. E. Garcia, D. M. Prett and M. Morari; "Model Predictive Control: Theory and Practice—A Survey"; Automatica; 1989; pp. 335-348; vol. 25.

D. E. Seborg, T. F. Edgar and D. A. Mellichamp; "Process Dynamics and Control"; 1989; Wiley and Sons; New York, NY.

A. V. Oppenheim and R. W. Schafer; "Digital Signal Processing"; 1975; Prentice-Hall; Englewood Cliffs, NJ.

G. E. B. Box and G. M. Jenkins; "Time Series Analysis"; 1976; Holden-Day; San Francisco, CA.

J. L. Shearer, A. T. Murphy and H. H. Richardson; "Introduction to System Dynamics"; 1967; Addison-Wesley; Reading, MA.

P. Eykhoff; "System Identification"; 1974; John Wiley & Sons; New York, NY.

H. Kurz and W. Goedecke; Digital Parameter-Adaptive Control of Processes with Unknown Dead Time; Automatica; 1981; pp. 245-252; vol. 17, No. 1.

H. -T. Su and T. J. McAvoy; "Integration of Multilayer Perceptron Networks and Linear Dynamic Models; A Hammerstein Modeling Approach"; I&ED Fundamentals; Jul. 1992.

"BrainMaker Professional User's Guide and Reference Manual 4th Edition"; California Scientific Software; Jul. 1993.

Sekine, et al.; European Patent Office Abstract; Application No. 01138748; filed May 31, 1989.

* cited by examiner

METHOD AND APPARATUS FOR TRAINING A SYSTEM MODEL INCLUDING AN INTEGRATED SIGMOID FUNCTION

CROSS-REFERENCE TO RELATED APPLICATIONS

This application is a Continuation of U.S. patent application Ser. No. 09/662,243 entitled "Method and Apparatus for Training a System Model with Gain Constraints", filed on Sep. 14, 2000, now U.S. Pat. No. 7,058,617 whose inventors are Eric J. Hartman, Stephen Piche and Mark Gerules, which claims benefit of priority of Provisional Patent Application Ser. No. 60/153,791 entitled "Method and Apparatus for Training a System Model with Gain Constraints", filed Sep. 14, 1999, whose inventors are Eric J. Hartman, Stephen Piche and Mark Gerules, and which is a Continuation-in-Part Application of U.S. patent application Ser. No. 09/167,504 entitled "Method for On-line Optimization of a Plant", filed Oct. 6, 1998, whose inventors are Stephen Piche, John P. Havener and Donald Semrad, which is now U.S. Pat. No. 6,278,899, which is a Continuation-in-Part Application of U.S. patent application Ser. No. 08/943,489 entitled "Method for Steady-State Identification Based upon Identified Dynamics", filed Oct. 3, 1997, whose inventors are Stephen Piche, James David Keeler, Eric Hartman, William D. Johnson, Mark Gerules and Kadir Liano, which is now U.S. Pat. No. 6,047,221, which is a Continuation-in-Part of U.S. patent Ser. No. 08/643,464 entitled "Method and Apparatus for Dynamic and Steady State Modeling over a Desired Path Between Two End Points", filed May 6, 1996, whose inventors are Gregory D. Martin, Eugene Boe, Stephen Piche, James David Keeler, Douglas Timmer, Mark Gerules and John P. Havener, which is now U.S. Pat. No. 5,933,345.

TECHNICAL FIELD OF THE INVENTION

The present invention pertains in general to neural network based control systems and, more particularly, to on-line optimization thereof.

BACKGROUND OF THE INVENTION

Process models that are utilized for prediction, control and optimization can be divided into two general categories, steady-state models and dynamic models. In each case the model is a mathematical construct that characterizes the process, and process measurements are utilized to parameterize or fit the model so that it replicates the behavior of the process. The mathematical model can then be implemented in a simulator for prediction or inverted by an optimization algorithm for control or optimization.

Steady-state or static models are utilized in modem process control systems that usually store a great deal of data, this data typically containing steady-state information at many different operating conditions. The steady-state information is utilized to train a non-linear model wherein the process input variables are represented by the vector U that is processed through the model to output the dependent variable Y. The non-linear model is a steady-state phenomenological or empirical model developed utilizing several ordered pairs $(U_i, Y_i)$ of data from different measured steady states. If a model is represented as:

$$Y = P(U, Y) \quad (1)$$

where P is some parameterization, then the steady-state modeling procedure can be presented as:

$$(\vec{U}, \vec{Y}) \to P \quad (2)$$

where U and Y are vectors containing the $U_i$, $Y_i$ ordered pair elements. Given the model P, then the steady-state process gain can be calculated as:

$$K = \frac{\Delta P(U, Y)}{\Delta U} \quad (3)$$

The steady-state model therefore represents the process measurements that are taken when the system is in a "static" mode. These measurements do not account for the perturbations that exist when changing from one steady-state condition to another steady-state condition. This is referred to as the dynamic part of a model.

A dynamic model is typically a linear model and is obtained from process measurements which are not steady-state measurements; rather, these are the data obtained when the process is moved from one steady-state condition to another steady-state condition. This procedure is where a process input or manipulated variable u(t) is input to a process with a process output or controlled variable y(t) being output and measured. Again, ordered pairs of measured data (u(I), y(I)) can be utilized to parameterize a phenomenological or empirical model, this time the data coming from non-steady-state operation. The dynamic model is represented as:

$$y(t) = p(u(t), y(t)) \quad (4)$$

where p is some parameterization. Then the dynamic modeling procedure can be represented as:

$$(\vec{u}, \vec{y}) \to p \quad (5)$$

Where u and y are vectors containing the (u(I),y(I)) ordered pair elements. Given the model p, then the steady-state gain of a dynamic model can be calculated as:

$$k = \frac{\Delta p(u, y)}{\Delta u} \quad (6)$$

Unfortunately, almost always the dynamic gain k does not equal the steady-state gain K, since the steady-state gain is modeled on a much larger set of data, whereas the dynamic gain is defined around a set of operating conditions wherein an existing set of operating conditions are mildly perturbed. This results in a shortage of sufficient non-linear information in the dynamic data set in which non-linear information is contained within the static model. Therefore, the gain of the system may not be adequately modeled for an existing set of steady-state operating conditions. Thus, when considering two independent models, one for the steady-state model and one for the dynamic model, there is a mis-match between the gains of the two models when used for prediction, control and optimization. The reason for this mis-match are that the steady-state model is non-linear and the dynamic model is linear, such that the gain of the steady-state model changes depending on the process operating point, with the gain of the linear model being fixed. Also, the data utilized to parameterize the dynamic model do not represent the complete operating range of the process, i.e., the dynamic data is only valid in a narrow region. Further, the dynamic model represents the acceleration properties of the process (like inertia) whereas the steady-state model represents the tradeoffs that determine the process final resting value (similar to the tradeoff between gravity and drag that determines terminal velocity in free fall).

One technique for combining non-linear static models and linear dynamic models is referred to as the Hammerstein model. The Hammerstein model is basically an input-output representation that is decomposed into two coupled parts. This utilizes a set of intermediate variables that are determined by the static models which are then utilized to construct the dynamic model. These two models are not independent and are relatively complex to create.

Plants have been modeled utilizing the various non-linear networks. One type of network that has been utilized in the past is a neural network. These neural networks typically comprise a plurality of inputs which are mapped through a stored representation of the plant to yield on the output thereof predicted outputs. These predicted outputs can be any output of the plant. The stored representation within the plant is typically determined through a training operation.

During the training of a neural network, the neural network is presented with a set of training data. This training data typically comprises historical data taken from a plant. This historical data is comprised of actual input data and actual output data, which output data is referred to as the target data. During training, the actual input data is presented to the network with the target data also presented to the network, and then the network trained to reduce the error between the predicted output from the network and the actual target data. One very widely utilized technique for training a neural network is a backpropagation training algorithm. However, there ate other types of algorithms that can be utilized to set the "weights" in the network.

When a large amount of steady-state data is available to a network, the stored representation can be accurately modeled. However, some plants have a large amount of dynamic information associated therewith. This dynamic information reflects the fact that the inputs to the plant undergo a change which results in a corresponding change in the output. If a user desired to predict the final steady-state value of the plant, plant dynamics may not be important and this data could be ignored. However, there are situations wherein the dynamics of the plant are important during the prediction. It may be desirable to predict the path that an output will take from a beginning point to an end point. For example, if the input were to change in a step function from one value to another, a steady-state model that was accurately trained would predict the final steady-state value with some accuracy. However, the path between the starting point and the end point would not be predicted, as this would be subject to the dynamics of the plant. Further, in some control applications, it may be desirable to actually control the plant such that the plant dynamics were "constrained," this requiring some knowledge of the dynamic operation of the plant.

In some applications, the actual historical data that is available as the training set has associated therewith a considerable amount of dynamic information. If the training data set had a large amount of steady-state information, an accurate model could easily be obtained for a steady-state model. However, if the historical data had a large amount of dynamic information associated therewith, i.e., the plant were not allowed to come to rest for a given data point, then there would be an error associated with the training opera tion that would be a result of this dynamic component in the training data. This is typically the case for small data sets. This dynamic component must therefore be dealt with for small training data sets when attempting to train a steady-state model.

When utilizing a model for the purpose of optimization, it is necessary to train a model on one set of input values to predict another set of input values at future time. This will typically require a steady-state modeling technique. In optimization, especially when used in conjunction with a control system, the optimization process will take a desired set of set points and optimizes those set points. However, these models are typically selected for accurate gain. a problem arises whenever the actual plant changes due to external influences, such as outside temperature, build up of slag, etc. Of course, one could regenerate the model with new parameters. However, the typical method is to actually measure the output of the plant, compare it with a predicted value to generate a "biased" value which sets forth the error in the plant as opposed to the model. This error is then utilized to bias the optimization network. However, to date this technique has required the use of steady-state models which are generally off-line models. The reason for this is that the actual values must "settle out" to reach a steady-state value before the actual bias can be determined. During operation of a plant, the outputs are dynamic.

SUMMARY OF THE INVENTION

The present invention disclosed and claimed herein comprises a method for training a steady-state model, the model having an input and an output and a mapping layer for mapping the input to the output through a stored representation of a system. A training data set is provided having a set of input data u(t) and target output data y(t) representative of the operation of a system. The model is trained with a predetermined training algorithm. The training algorithm is constrained to maintain the sensitivity of the output with respect to the input substantially within user defined constraint bounds by iteratively minimizing an objective function as a function of a data objective and a constraint objective. The data objective has a data fitting learning rate and the constraint objective has constraint learning rate. The data fitting learning rate and the constraint learning rate are varied as a function of the values of the data objective and the constraint objective after selective iterative steps.

In another embodiment, the best set of input variables is determined from a set of historical training data for a system comprised of input variables and output variables in order to train a model of the system on a smaller subset of the training data with less than all of the input variables. The best time delays are determined between input and output variables pairs in the training data prior to training of a model thereon and a statistical relationship defined for each of the input variables at the best time delay for a given one of the output variables. Less than all of the input variables are selected by defining a maximum statistical relationship and selecting only those input variables for the given output variable having a statistical relationship that exceeds the maximum. The model is trained on the selected input variables and the associated output variables.

BRIEF DESCRIPTION OF THE DRAWINGS

For a more complete understanding of the present invention and the advantages thereof, reference is now made to the following description taken in conjunction with the accompanying Drawings in which:

FIGS. 41–45 illustrate screen views for changing the number of variables that can be displayed from a given set;

DETAILED DESCRIPTION OF THE INVENTION

Figure 1:
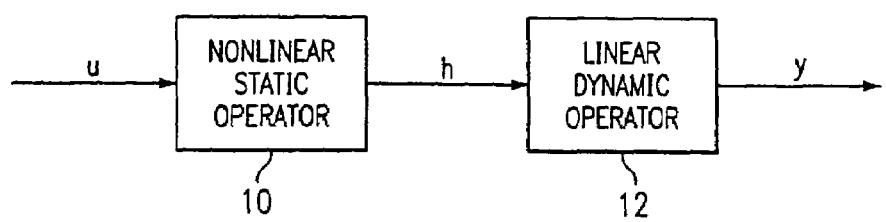
FIG. 1 illustrates a prior art Hammerstein model.

Referring now to FIG. 1, there is illustrated a diagrammatic view of a Hammerstein model of the prior art. This is comprised of a non-linear static operator model 10 and a linear dynamic model 12, both disposed in a series configuration. The operation of this model is described in H. T. Su, and T. J. McAvoy, "Integration of Multilayer Perceptron Networks and Linear Dynamic Models: A Hammerstein Modeling Approach" to appear in *I & EC Fundamentals*, paper dated Jul. 7, 1992, which reference is incorporated herein by reference. Hammerstein models in general have been utilized in modeling non-linear systems for some time. The structure of the Hammerstein model illustrated in FIG. 1 utilizes the non-linear static operator model 10 to transform the input U into intermediate variables H. The non-linear operator is usually represented by a finite polynomial expansion. However, this could utilize a neural network or any type of compatible modeling system. The linear dynamic operator model 12 could utilize a discreet dynamic transfer function representing the dynamic relationship between the intermediate variable H and the output Y. For multiple input systems, the non-linear operator could utilize a multilayer neural network, whereas the linear operator could utilize a two layer neural network. A neural network for the static operator is generally well known and described in U.S. Pat. No. 5,353,207, issued Oct. 4, 1994, and assigned to the present assignee, which is incorporated herein by reference. These type of networks are typically referred to as a multilayer feed-forward network which utilizes training in the form of back-propagation. This is typically performed on a large set of training data. Once trained, the network has weights associated therewith, which are stored in a separate database.

Once the steady-state model is obtained, one can then choose the output vector from the hidden layer in the neural network as the intermediate variable for the Hammerstein model. In order to determine the input for the linear dynamic operator, u(t), it is necessary to scale the output vector h(d) from the non-linear static operator model 10 for the mapping of the intermediate variable h(t) to the output variable of the dynamic model y(t), which is determined by the linear dynamic model.

During the development of a linear dynamic model to represent the linear dynamic operator, in the Hammerstein model, it is important that the steady-state non-linearity remain the same. To achieve this goal, one must train the dynamic model subject to a constraint so that the non-linearity learned by the steady-state model remains unchanged after the training. This results in a dependency of the two models on each other.

Figure 2:
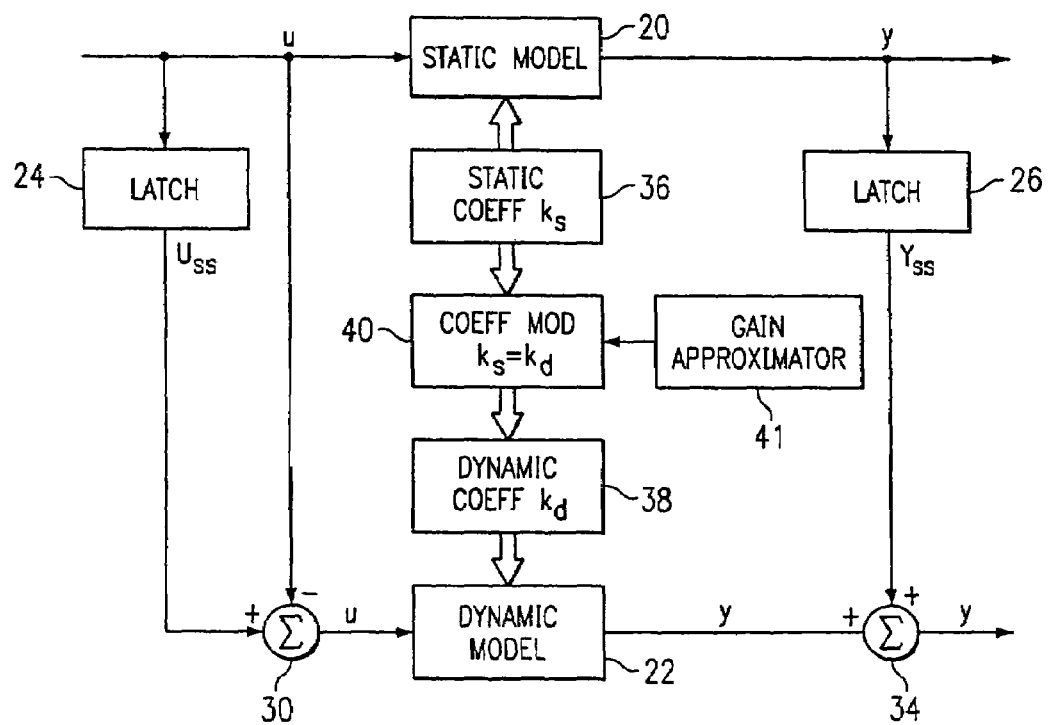
FIG. 2 illustrates a block diagram of a modeling technique utilizing steady-state gain to define the gain of the dynamic model.

Referring now to FIG. 2, there is illustrated a block diagram of the modeling method in one embodiment, which is referred to as a systematic modeling technique. The general concept of the systematic modeling technique in the present embodiment results from the observation that, while process gains (steady-state behavior) vary with U's and Y's, (i.e., the gains are non-linear), the process dynamics seemingly vary with time only, (i.e., they can be modeled as locally linear, but time-varied). By utilizing non-linear models for the steady-state behavior and linear models for the dynamic behavior, several practical advantages result. They are as follows:

1. Completely rigorous models can be utilized for the steady-state part. This provides a credible basis for economic optimization.
2. The linear models for the dynamic part can be updated on-line, i.e., the dynamic parameters that are known to be time-varying can be adapted slowly.
3. The gains of the dynamic models and the gains of the steady-state models can be forced to be consistent (k=K).

With further reference to FIG. 2, there are provided a static or steady-state model 20 and a dynamic model 22. The static model 20, as described above, is a rigorous model that is trained on a large set of steady-state data. The static model 20 will receive a process input U and provide a predicted output Y. These are essentially steady-state values. The steady-state values at a given time are latched in various latches, an input latch 24 and an output latch 26. The latch 24 contains the steady-state value of the input $U_{ss}$, and the latch 26 contains the steady-state output value $Y_{ss}$. The dynamic model 22 is utilized to predict the behavior of the plant when a change is made from a steady-state value of $Y_{ss}$ to a new value Y. The dynamic model 22 receives on the input the dynamic input value u and outputs a predicted dynamic value y. The value u is comprised of the difference between the new value U and the steady-state value in the latch 24, $U_{ss}$. This is derived from a subtraction circuit 30 which receives on the positive input thereof the output of the latch 24 and on the negative input thereof the new value of U. This therefore represents the delta change from the steady-state. Similarly, on the output the predicted overall dynamic value will be the sum of the output value of the dynamic model, y, and the steady-state output value stored in the latch 26, $Y_{ss}$. These two values are summed with a summing block 34 to provide a predicted output Y. The difference between the value output by the summing junction 34 and the predicted value output by the static model 20 is that the predicted value output by the summing junction 20 accounts for the dynamic operation of the system during a change. For example, to process the input values that are in the input vector U by the static model 20, the rigorous model, can take significantly more time than running a relatively simple dynamic model. The method utilized in the present embodiment is to force the gain of the dynamic model 22 $k_d$ to equal the gain $K_{ss}$ of the static model 20.

In the static model 20, there is provided a storage block 36 which contains the static coefficients associated with the static model 20 and also the associated gain value $K_{ss}$. Similarly, the dynamic model 22 has a storage area 38 that is operable to contain the dynamic coefficients and the gain value $k_d$. One of the important aspects of the present embodiment is a link block 40 that is operable to modify the coefficients in the storage area 38 to force the value of $k_d$ to be equal to the value of $K_{ss}$. Additionally, there is an approximation block 41 that allows approximation of the dynamic gain $k_d$ between the modification updates.

Systematic Model

The linear dynamic model 22 can generally be represented by the following equations:

$$\delta y(t) = \sum_{i=1}^{n} b_1 \delta u(t-d-i) - \sum_{i=1}^{n} a_i \delta y(t-i) \tag{7}$$

where:

$$\delta y(t) = y(t) - Y_{ss} \tag{8}$$

$$\delta u(t) = u(t) - u_{ss} \tag{9}$$

and t is time, $a_i$ and $b_i$ are real numbers, d is a time delay, u(t) is an input and y(t) an output. The gain is represented by:

$$\frac{y(B)}{u(B)} = k = \frac{\left(\sum_{i=1}^{n} b_i B^{i-1}\right) B^d}{1 + \sum_{i=1}^{n} a_i B^{i-1}} \quad (10)$$

where B is the backward shift operator $B(x(t))=x(t-1)$, t=time, the $a_i$ and $b_i$ are real numbers, I is the number of discreet time intervals in the dead-time of the process, and n is the order of the model. This is a general representation of a linear dynamic model, as contained in George E. P. Box and G. M. Jenkins, "TIME SERIES ANALYSIS forecasting and control", Holden-Day, San Francisco, 1976, Section 10.2, Page 345. This reference is incorporated herein by reference.

The gain of this model can be calculated by setting the value of B equal to a value of "1". The gain will then be defined by the following equation:

$$\left[\frac{y(B)}{u(B)}\right]_{B=1} = k_d = \frac{\sum_{i=1}^{n} b_i}{1 + \sum_{i=1}^{n} a_i} \quad (11)$$

The $a_i$ contain the dynamic signature of the process, its unforced, natural response characteristic. They are independent of the process gain. The $b_i$ contain part of the dynamic signature of the process; however, they alone contain the result of the forced response. The $b_i$ determine the gain k of the dynamic model. See: J. L. Shearer, A. T. Murphy, and H. H. Richardson, "Introduction to System Dynamics", Addison-Wesley, Reading, Mass., 1967, Chapter 12. This reference is incorporated herein by reference.

Since the gain $K_{ss}$ of the steady-state model is known, the gain $k_d$ of the dynamic model can be forced to match the gain of the steady-state model by scaling the $b_i$ parameters. The values of the static and dynamic gains are set equal with the value of $b_i$ scaled by the ratio of the two gains:

$$(b_i)_{scaled} = (b_i)_{old}\left(\frac{K_{ss}}{k_d}\right) \quad (12)$$

$$(b_1)_{scaled} = \frac{(b_i)_{old} K_{ss}\left(1 + \sum_{i=1}^{n} a_1\right)}{\sum_{i=1}^{n} b_i} \quad (13)$$

This makes the dynamic model consistent with its steady-state counterpart. Therefore, each time the steady-state value changes, this corresponds to a gain $K_{ss}$ of the steady-state model. This value can then be utilized to update the gain $k_d$ of the dynamic model and, therefore, compensate for the errors associated with the dynamic model wherein the value of $k_d$ is determined based on perturbations in the plant on a given set of operating conditions. Since all operating conditions are not modeled, the step of varying the gain will account for changes in the steady-state starting points.

Figure 3A:
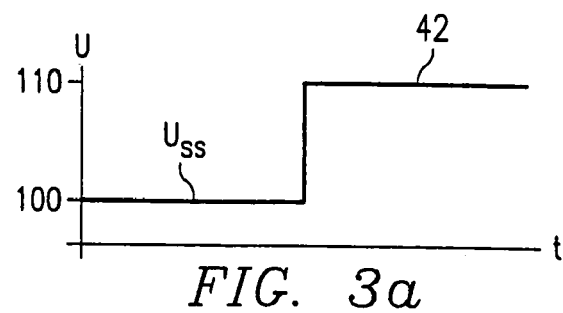
FIGS. 3a–3d illustrate timing diagrams for the various outputs of the system of FIG. 2.
Figure 3B:
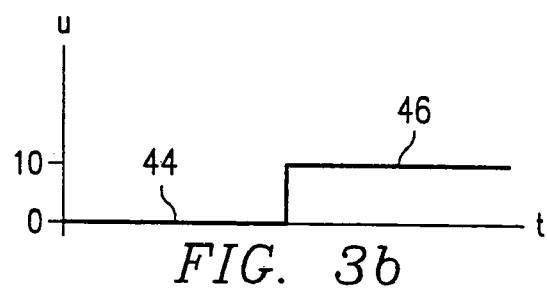
Figure 3C:
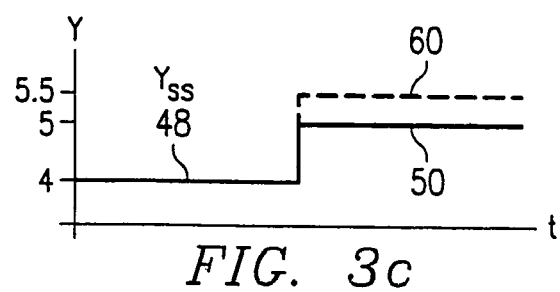
Figure 3D:
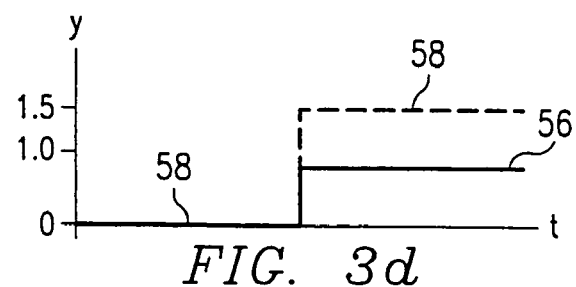

Referring now to FIGS. 3a–3d, there are illustrated plots of the system operating in response to a step function wherein the input value U changes from a value of 100 to a value of 110. In FIG. 3a, the value of 100 is referred to as the previous steady-state value $U_{ss}$. In FIG. 3b, the value of u varies from a value of 0 to a value of 10, this representing the delta between the steady-state value of $U_{ss}$ to the level of 110, represented by reference numeral 42 in FIG. 3a. Therefore, in FIG. 3b the value of u will go from 0 at a level 44, to a value of 10 at a level 46. In FIG. 3c, the output Y is represented as having a steady-state value $Y_{ss}$ of 4 at a level 48. When the input value U rises to the level 42 with a value of 110, the output value will rise. This is a predicted value. The predicted value which is the proper output value is represented by a level 50, which level 50 is at a value of 5. Since the steady-state value is at a value of 4, this means that the dynamic system must predict a difference of a value of 1. This is represented by FIG. 3d wherein the dynamic output value y varies from a level 54 having a value of 0 to a level 56 having a value of 1.0. However, without the gain scaling, the dynamic model could, by way of example, predict a value for y of 1.5, represented by dashed level 58, if the steady-state values were outside of the range in which the dynamic model was trained. This would correspond to a value of 5.5 at a level 60 in the plot of FIG. 3c. It can be seen that the dynamic model merely predicts the behavior of the plant from a starting point to a stopping point, not taking into consideration the steady-state values. It assumes that the steady-state values are those that it was trained upon. If the gain $k_d$ were not scaled, then the dynamic model would assume that the steady-state values at the starting point were the same that it was trained upon. However, the gain scaling link between the steady-state model and the dynamic model allow the gain to be scaled and the parameter $b_i$ to be scaled such that the dynamic operation is scaled and a more accurate prediction is made which accounts for the dynamic properties of the system.

Figure 4:
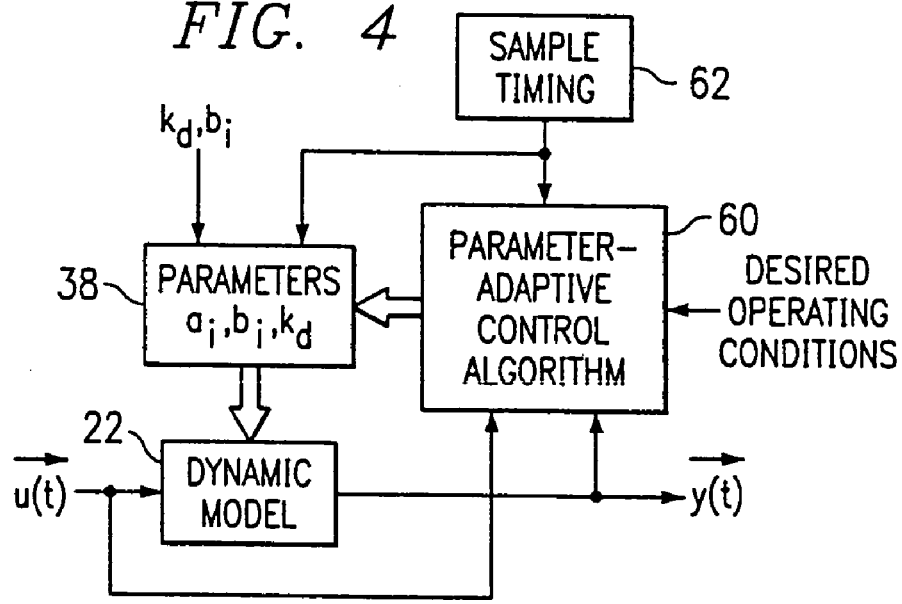
FIG. 4 illustrates a detailed block diagram of a dynamic model.

Referring now to FIG. 4, there is illustrated a block diagram of a method for determining the parameters $a_i$, $b_i$. This is usually achieved through the use of an identification algorithm, which is conventional. This utilizes the (u(t),y(t)) pairs to obtain the $a_i$ and $b_i$ parameters. In the preferred embodiment, a recursive identification method is utilized where the $a_i$ and $b_i$ parameters are updated with each new ($u_i(t),y_i(t)$) pair. See: T. Eykhoff, "System Identification", John Wiley & Sons, New York, 1974, Pages 38 and 39, et. seq., and H. Kurz and W. Godecke, "Digital Parameter-Adaptive Control Processes with Unknown Dead Time", Automatica, Vol. 17, No. 1, 1981, pp. 245–252, which references are incorporated herein by reference.

In the technique of FIG. 4, the dynamic model 22 has the output thereof input to a parameter-adaptive control algorithm block 60 which adjusts the parameters in the coefficient storage block 38, which also receives the scaled values of k, $b_i$. This is a system that is updated on a periodic basis, as defined by timing block 62. The control algorithm 60 utilizes both the input u and the output y for the purpose of determining and updating the parameters in the storage area 38.

Figure 5:
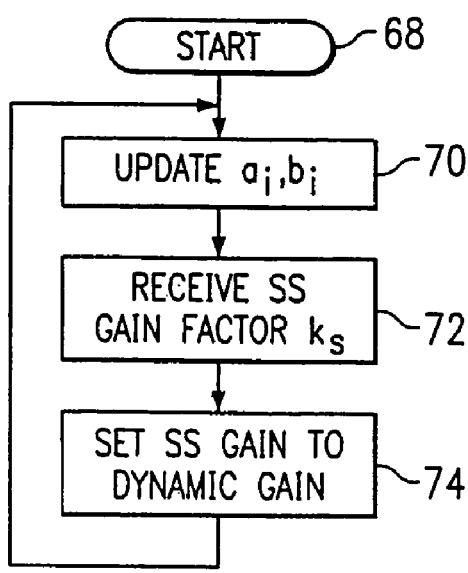
FIG. 5 illustrates a block diagram of the operation of the model of FIG. 4.

Referring now to FIG. 5, there is illustrated a block diagram of the preferred method. The program is initiated in a block 68 and then proceeds to a function block 70 to update the parameters $a_i$, $b_i$ utilizing the (u(I),y(I)) pairs. Once these are updated, the program flows to a function block 72 wherein the steady-state gain factor K is received, and then to a function block 74 to set the dynamic gain to the steady-state gain, i.e., provide the scaling function described hereinabove. This is performed after the update. This procedure can be used for on-line identification, non-linear dynamic model prediction and adaptive control.

Figure 6:
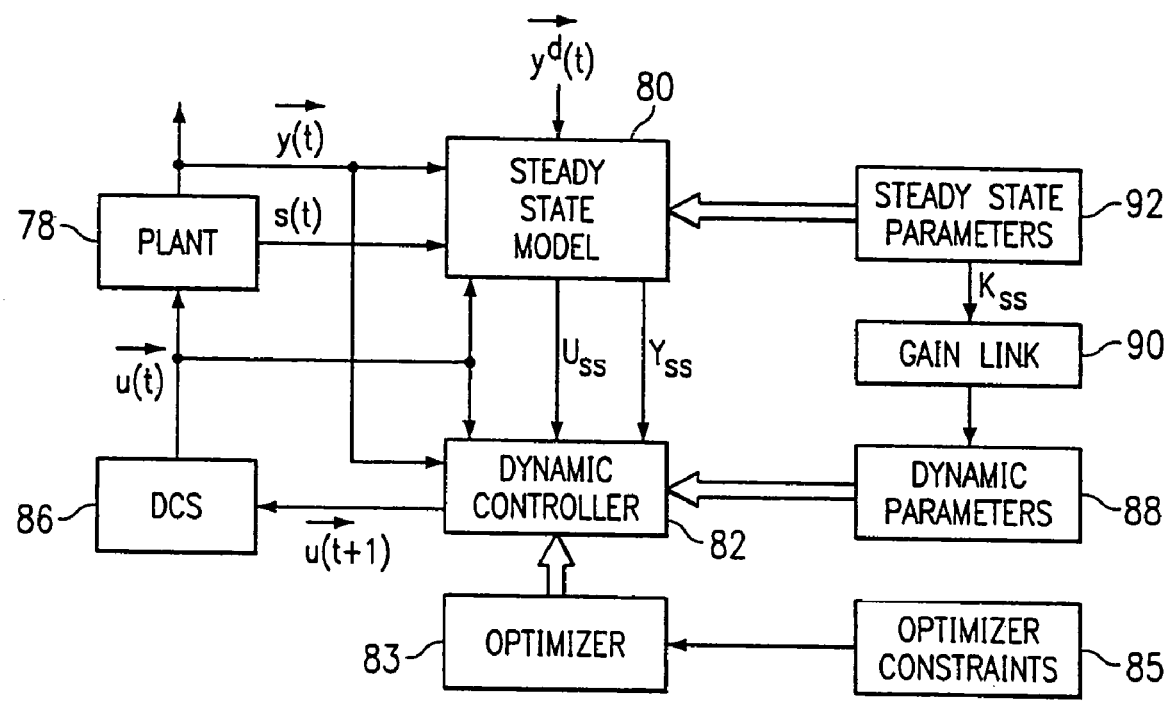
FIG. 6 illustrates an example of the modeling technique of the embodiment of FIG. 2 utilized in a control environment.

Referring now to FIG. 6, there is illustrated a block diagram of one application of the present embodiment utilizing a control environment. A plant 78 is provided which receives input values u(t) and outputs an output vector y(t). The plant 78 also has measurable state variables s(t). A predictive model 80 is provided which receives the input values u(t) and the state variables s(t) in addition to the output value y(t). The steady-state model 80 is operable to output a predicted value of both y(t) and also of a future input value u(t+1). This constitutes a steady-state portion of the system. The predicted steady-state input value is $U_{ss}$ with the predicted steady-state output value being $Y_{ss}$. In a conventional control scenario, the steady-state model 80 would receive as an external input a desired value of the output $y^d(t)$ which is the desired value that the overall control system seeks to achieve. This is achieved by controlling a distributed control system (DCS) 86 to produce a desired input to the plant. This is referred to as u(t+1), a future value. Without considering the dynamic response, the predictive model 80, a steady-state model, will provide the steady-state values. However, when a change is desired, this change will effectively be viewed as a "step response".

To facilitate the dynamic control aspect, a dynamic controller 82 is provided which is operable to receive the input u(t), the output value y(t) and also the steady-state values $U_{ss}$ and $Y_{ss}$ and generate the output u(t+1). The dynamic controller effectively generates the dynamic response between the changes, i.e., when the steady-state value changes from an initial steady-state value $U_{ss}^i$, $Y_{iss}$ to a final steady-state value $U_{ss}^f$, $Y_{ss}^f$.

During the operation of the system, the dynamic controller 82 is operable in accordance with the embodiment of FIG. 2 to update the dynamic parameters of the dynamic controller 82 in a block 88 with a gain link block 90, which utilizes the value $K_{ss}$ from a steady-state parameter block in order to scale the parameters utilized by the dynamic controller 82, again in accordance with the above described method. In this manner, the control function can be realized. In addition, the dynamic controller 82 has the operation thereof optimized such that the path traveled between the initial and final steady-state values is achieved with the use of the optimizer 83 in view of optimizer constraints in a block 85. In general, the predicted model (steady-state model) 80 provides a control network function that is operable to predict the future input values. Without the dynamic controller 82, this is a conventional control network which is generally described in U.S. Pat. No. 5,353,207, issued Oct. 4, 1994, to the present assignee, which patent is incorporated herein by reference.

Approximate Systematic Modeling

For the modeling techniques described thus far, consistency between the steady-state and dynamic models is maintained by rescaling the b, parameters at each time step utilizing equation 13. If the systematic model is to be utilized in a Model Predictive Control (MPC) algorithm, maintaining consistency may be computationally expensive. These types of algorithms are described in C. E. Garcia, D. M. Prett and M. Morari. Model predictive control: theory and practice—a survey, Automatica, 25:335–348, 1989; D. E. Seborg, T. F. Edgar, and D. A. Mellichamp. Process Dynamics and Control. John Wiley and Sons, New York, N.Y., 1989. These references are incorporated herein by reference. For example, if the dynamic gain $k_d$ is computed from a neural network steady-state model, it would be necessary to execute the neural network module each time the model was iterated in the MPC algorithm. Due to the potentially large number of model iterations for certain MPC problems, it could be computationally expensive to maintain a consistent model. In this case, it would be better to use an approximate model which does not rely on enforcing consistencies at each iteration of the model.

Figure 7:
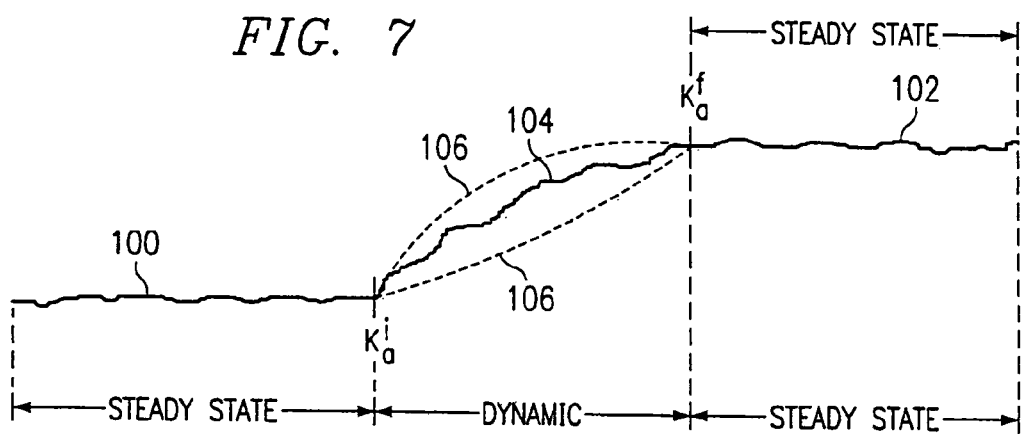
FIG. 7 illustrates a diagrammatic view of a change between two steady-state values.

Referring now to FIG. 7, there is illustrated a diagram for a change between steady-state values. As illustrated, the steady-state model will make a change from a steady-state value at a line 100 to a steady-state value at a line 102. A transition between the two steady-state values can result in unknown settings. The only way to insure that the settings for the dynamic model between the two steady-state values, an initial steady-state value $K_{ss}^i$ and a final steady-state gain $K_{ss}^f$, would be to utilize a step operation, wherein the dynamic gain $k_d$ was adjusted at multiple positions during the change. However, this may be computationally expensive. As will be described hereinbelow, an approximation algorithm is utilized for approximating the dynamic behavior between the two steady-state values utilizing a quadratic relationship. This is defined as a behavior line 104, which is disposed between an envelope 106, which behavior line 104 will be described hereinbelow.

Figure 8:
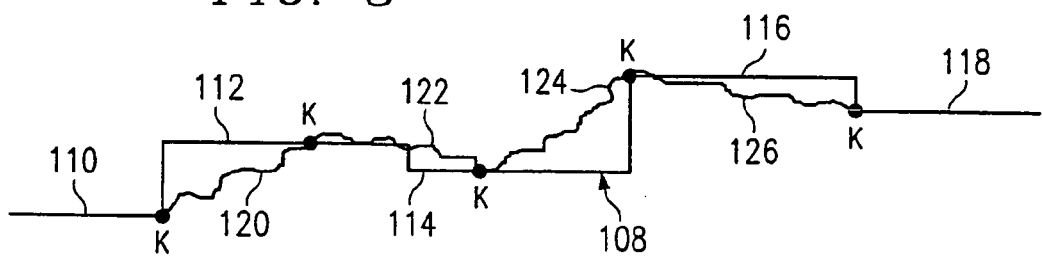
FIG. 8 illustrates a diagrammatic view of the approximation algorithm for changes in the steady-state value.

Referring now to FIG. 8, there is illustrated a diagrammatic view of the system undergoing numerous changes in steady-state value as represented by a stepped line 108. The stepped line 108 is seen to vary from a first steady-state value at a level 110 to a value at a level 112 and then down to a value at a level 114, up to a value at a level 116 and then down to a final value at a level 118. Each of these transitions can result in unknown states. With the approximation algorithm that will be described hereinbelow, it can be seen that, when a transition is made from level 110 to level 112, an approximation curve for the dynamic behavior 120 is provided. When making a transition from level 114 to level 116, an approximation gain curve 124 is provided to approximate the steady-state gains between the two levels 114 and 116. For making the transition from level 116 to level 118, an approximation gain curve 126 for the steady-state gain is provided. It can therefore be seen that the approximation curves 120–126 account for transitions between steady-state values that are determined by the network, it being noted that these are approximations which primarily maintain the steady-state gain within some type of error envelope, the envelope 106 in FIG. 7.

The approximation is provided by the block 41 noted in FIG. 2 and can be designed upon a number of criteria, depending upon the problem that it will be utilized to solve. The system in the preferred embodiment, which is only one example, is designed to satisfy the following criteria:

1. Computational Complexity: The approximate systematic model will be used in a Model Predictive Control algorithm, therefore, it is required to have low computational complexity.
2. Localized Accuracy: The steady-state model is accurate in localized regions. These regions represent the steady-state operating regimes of the process. The steady-state model is significantly less accurate outside these localized regions.
3. Final Steady-State: Given a steady-state set point change, an optimization algorithm which uses the steady-state model will be used to compute the steady-state inputs required to achieve the set point. Because of item 2, it is assumed that the initial and final steady-states associated with a set-point change are located in regions accurately modeled by the steady-state model.

Given the noted criteria, an approximate systematic model can be constructed by enforcing consistency of the steady-state and dynamic model at the initial and final steady-state associated with a set point change and utilizing a linear approximation at points in between the two steady-states. This approximation guarantees that the model is accurate in regions where the steady-state model is well known and utilizes a linear approximation in regions where the steady-state model is known to be less accurate. In addition, the resulting model has low computational complexity. For purposes of this proof, Equation 13 is modified as follows:

$$b_{i,scaled} = \frac{b_i K_{ss}(u(t-d-1))\left(1 + \sum_{i=1}^{n} a_i\right)}{\sum_{i=1}^{n} b_i} \quad (14)$$

This new equation 14 utilizes $K_{ss}(u(t-d-1))$ instead of $K_{ss}(u(t))$ as the consistent gain, resulting in a systematic model which is delay invariant.

The approximate systematic model is based upon utilizing the gains associated with the initial and final steady-state values of a set-point change. The initial steady-state gain is denoted $K^i_{ss}$ while the initial steady-state input is given by $U^i_{ss}$. The final steady-state gain is $K^f_{ss}$ and the final input is $U^f_{ss}$. Given these values, a linear approximation to the gain is given by:

$$K_{ss}(u(t)) = K^i_{ss} + \frac{K^f_{ss} - K^i_{ss}}{U^f_{ss} - U^i_{ss}}(u(t) - U^i_{ss}). \quad (15)$$

Substituting this approximation into Equation 13 and replacing $u(t-d-1)-u^i$ by $\delta u(t-d-1)$ yields:

$$\tilde{b}_{j,scaled} = \quad (16)$$

$$\frac{b_j K^i_{ss}\left(1 + \sum_{i=1}^{n} a_i\right)}{\sum_{i=1}^{n} b_i} + \frac{1}{2}\frac{b_j\left(1 + \sum_{i=1}^{n} a_i\right)(K^f_{ss} - K^i_{ss})}{\left(\sum_{i=1}^{n} b_i\right)(U^f_{ss} - U^i_{ss})}\delta u(t-d-i).$$

To simplify the expression, define the variable $b_j$-Bar as:

$$\bar{b}_j = \frac{b_j K^i_{ss}\left(1 + \sum_{i=1}^{n} a_i\right)}{\sum_{i=1}^{n} b_i} \quad (17)$$

and $g_j$ as:

$$g_j = \frac{b_j\left(1 + \sum_{i=1}^{n} a_i\right)(K^f_{ss} - K^i_{ss})}{\left(\sum_{i=1}^{n} b_i\right)(U^f_{ss} - U^i_{ss})} \quad (18)$$

Equation 16 may be written as:

$$\tilde{b}_{j,scaled} = \bar{b}_j + g_j \delta u(t-d-i). \quad (19)$$

Finally, substituting the scaled b's back into the original difference Equation 7, the following expression for the approximate systematic model is obtained:

$$\delta y(t) = \sum_{i=1}^{n} \bar{b}_i \delta u(t-d-i) + \quad (20)$$

$$\sum_{i=1}^{n} g_i \delta u(t-d-i^2) \delta u(t-d-i) - \sum_{i=1}^{n} a_1 \delta y(t-i).$$

The linear approximation for gain results in a quadratic difference equation for the output. Given Equation 20, the approximate systematic model is shown to be of low computational complexity. It may be used in a MPC algorithm to efficiently compute the required control moves for a transition from one steady-state to another after a set-point change. Note that this applies to the dynamic gain variations between steady-state transitions and not to the actual path values.

Control System Error Constraints

Figure 9:
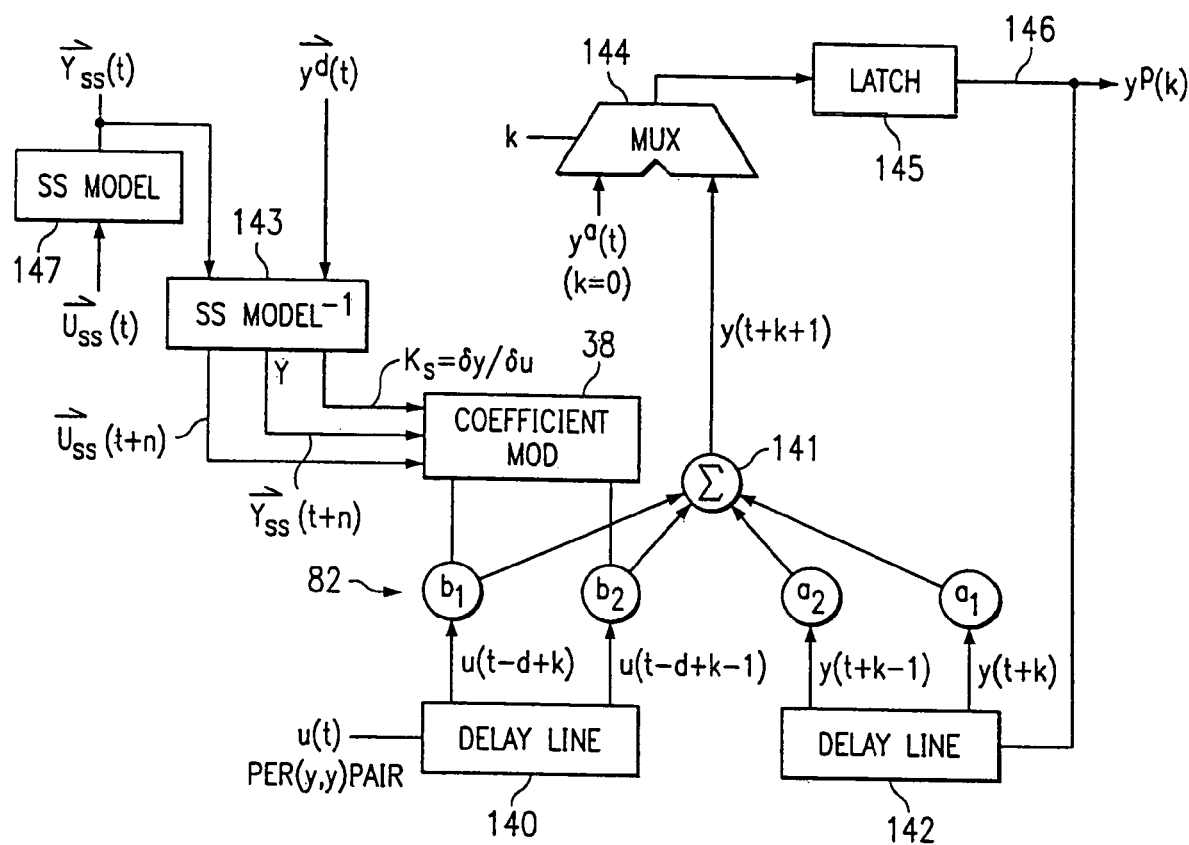
FIG. 9 illustrates a block diagram of the dynamic model.

Referring now to FIG. 9, there is illustrated a block diagram of the prediction engine for the dynamic controller 82 of FIG. 6. The prediction engine is operable to essentially predict a value of y(t) as the predicted future value y(t+1). Since the prediction engine must determine what the value of the output y(t) is at each future value between two steady-state values, it is necessary to perform these in a "step" manner. Therefore, there will be k steps from a value of zero to a value of N, which value at k=N is the value at the "horizon", the desired value. This, as will be described hereinbelow, is an iterative process, it being noted that the terminology for "(t+1)" refers to an incremental step, with an incremental step for the dynamic controller being smaller than an incremented step for the steady-state model. For the steady-state model, "y(t+N)" for the dynamic model will be, "y(t+1)" for the steady state The value y(t+1) is defined as follows:

$$y(t+1) = a_1 y(t) + a_2 y(t-1) + b_1 u(t-d-1) + b_2 u(t-d-2) \quad (21)$$

With further reference to FIG. 9, the input values u(t) for each (u,y) pair are input to a delay line 140. The output of the delay line provides the input value u(t) delayed by a delay value "d". There are provided only two operations for multiplication with the coefficients $b_1$ and $b_2$, such that only two values u(t) and u(t−1) are required. These are both delayed and then multiplied by the coefficients $b_1$ and $b_2$ and then input to a summing block 141. Similarly, the output value $y^p(t)$ is input to a delay line 142, there being two values required for multiplication with the coefficients $a_1$ and $a_2$. The output of this multiplication is then input to the summing block 141. The input to the delay line 142 is either the actual input value $y^a(t)$ or the iterated output value of the summation block 141, which is the previous value computed by the dynamic controller 82. Therefore, the summing block 141 will output the predicted value y(t+1) which will then be input to a multiplexor 144. The multiplexor 144 is operable to select the actual output $y^a(t)$ on the first operation and, thereafter, select the output of the summing block 141. Therefore, for a step value of k=0 the value $y^a(t)$ will be selected by the multiplexor 144 and will be latched in a latch 145. The latch 145 will provide the predicted value $y^p(t+k)$ on an output 146. This is the predicted value of y(t) for a given k that is input back to the input of delay line 142 for multiplication with the coefficients $a_1$ and $a_2$. This is iterated for each value of k from k=0 to k=N.

The $a_1$ and $a_2$ values are fixed, as described above, with the $b_1$ and $b_2$ values scaled. This scaling operation is performed by the coefficient modification block 38. However, this only defines the beginning steady-state value and the final steady-state value, with the dynamic controller and the optimization routines described in the present application defining how the dynamic controller operates between the steady-state values and also what the gain of the dynamic controller is. The gain specifically is what determines the modification operation performed by the coefficient modification block 38.

In FIG. 9, the coefficients in the coefficient modification block 38 are modified as described hereinabove with the information that is derived from the steady-state model. The steady-state model is operated in a control application, and is comprised in part of a forward steady-state model 141 which is operable to receive the steady-state input value $U_{ss}(t)$ and predict the steady-state output value $Y_{ss}(t)$. This predicted value is utilized in an inverse steady-state model 143 to receive the desired value $y^d(t)$ and the predicted output of the steady-state model 141 and predict a future steady-state input value or manipulated value $U_{ss}(t+N)$ and also a future steady-state input value $Y_{ss}(t+N)$ in addition to providing the steady-state gain $K_{ss}$. As described hereinabove, these are utilized to generate scaled b-values. These b-values are utilized to define the gain $k_d$ of the dynamic model. In can therefore be seen that this essentially takes a linear dynamic model with a fixed gain and allows it to have a gain thereof modified by a non-linear model as the operating point is moved through the output space.

Figure 10:
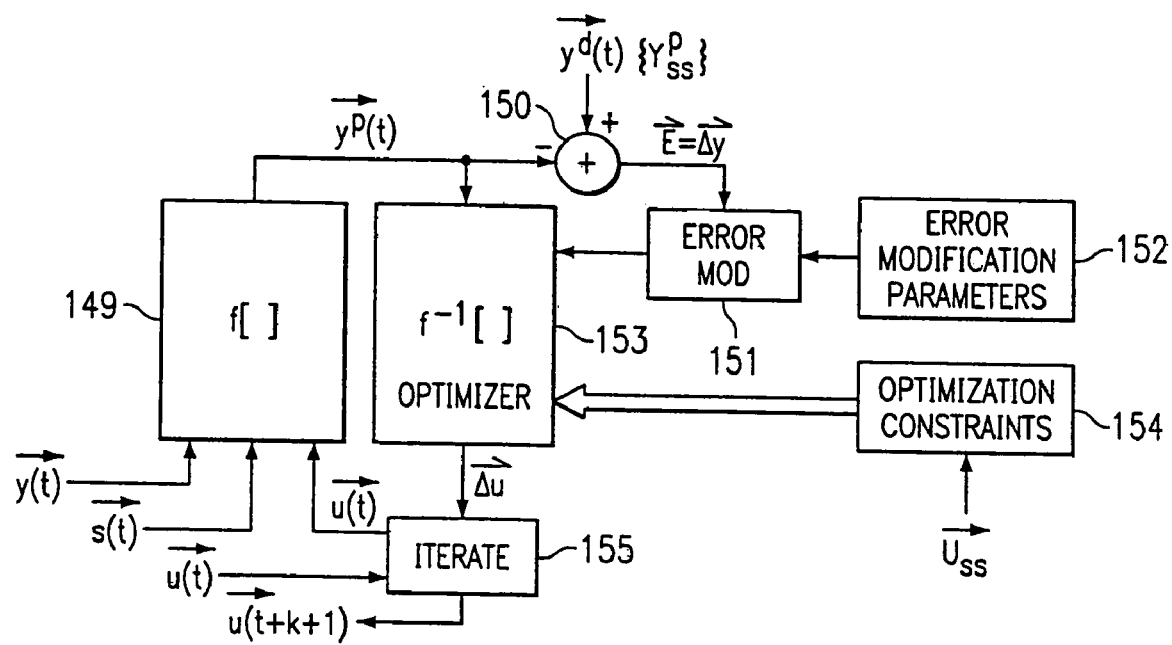
FIG. 10 illustrates a detail of the control network utilizing an error constraining algorithm.

Referring now to FIG. 10, there is illustrated a block diagram of the dynamic controller and optimizer. The dynamic controller includes a dynamic model 149 which basically defines the predicted value $y^p(k)$ as a function of the inputs y(t), s(t) and u(t). This was essentially the same model that was described hereinabove with reference to FIG. 9. The model 149 predicts the output values $y^p(k)$ between the two steady-state values, as will be described hereinbelow. The model 149 is predefined and utilizes an identification algorithm to identify the $a_1$, $a_2$, $b_1$ and $b_2$ coefficients during training. Once these are identified in a training and identification procedure, these are "fixed". However, as described hereinabove, the gain of the dynamic model is modified by scaling the coefficients $b_1$ and $b_2$. This gain scaling is not described with respect to the optimization operation of FIG. 10, although it can be incorporated in the optimization operation.

The output of model 149 is input to the negative input of a summing block 150. Summing block 150 sums the predicted output $y^p(k)$ with the desired output $y^d(t)$. In effect, the desired value of $y^d(t)$ is effectively the desired steady-state value $Y^f_{ss}$, although it can be any desired value. The output of the summing block 150 comprises an error value which is essentially the difference between the desired value $y^d(t)$ and the predicted value $y^p(k)$. The error value is modified by an error modification block 151, as will be described hereinbelow, in accordance with error modification parameters in a block 152. The modified error value is then input to an inverse model 153, which basically performs an optimization routine to predict a change in the input value u(t). In effect, the optimizer 153 is utilized in conjunction with the model 149 to minimize the error output by summing block 150. Any optimization function can be utilized, such as a Monte Carlo procedure. However, in the present embodiment, a gradient calculation is utilized. In the gradient method, the gradient $\partial(y)/\partial(u)$ is calculated and then a gradient solution performed as follows:

$$\Delta u_{new} = \Delta u_{old} + \left(\frac{\partial(y)}{\partial(u)}\right) \times E \quad (22)$$

The optimization function is performed by the inverse model 153 in accordance with optimization constraints in a block 154. An iteration procedure is performed with an iterate block 155 which is operable to perform an iteration with the combination of the inverse model 153 and the predictive model 149 and output on an output line 156 the future value u(t+k+1). For k=0, this will be the initial steady-state value and for k=N, this will be the value at the horizon, or at the next steady-state value. During the iteration procedure, the previous value of u(t+k) has the change value Δu added thereto. This value is utilized for that value of k until the error is within the appropriate levels. Once it is at the appropriate level, the next u(t+k) is input to the model 149 and the value thereof optimized with the iterate block 155. Once the iteration procedure is done, it is latched. As will be described hereinbelow, this is a combination of modifying the error such that the actual error output by the block 150 is not utilized by the optimizer 153 but, rather, a modified error is utilized. Alternatively, different optimization constraints can be utilized, which are generated by the block 154, these being described hereinbelow.

Figure 11A:
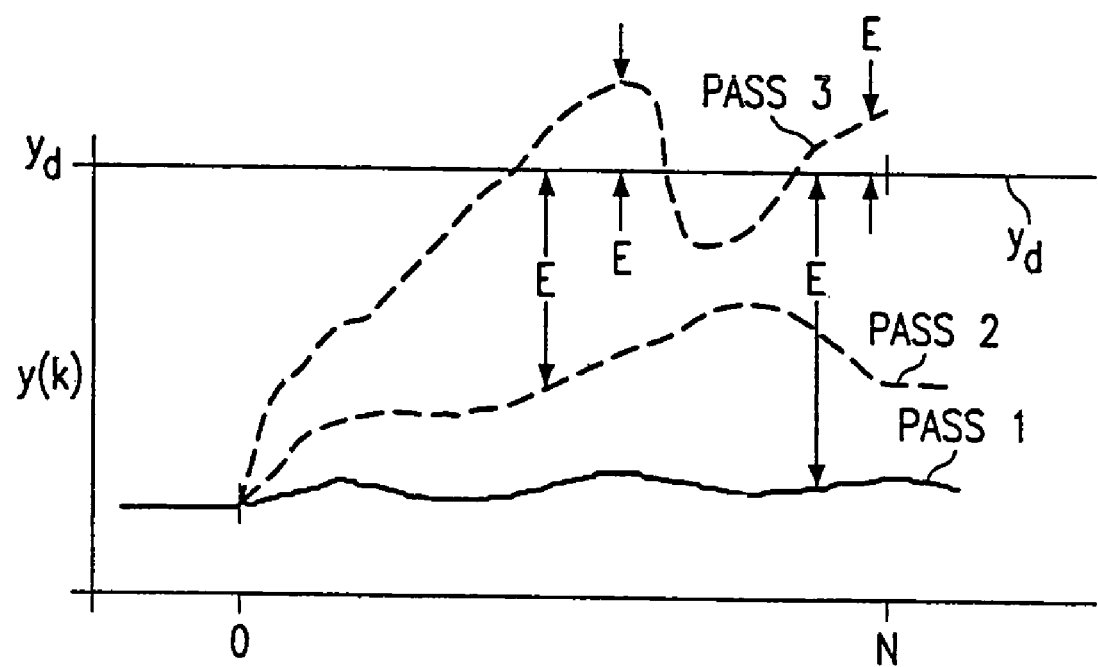
FIGS. 11a and 11b illustrate plots of the input and output during optimization.
Figure 11B:
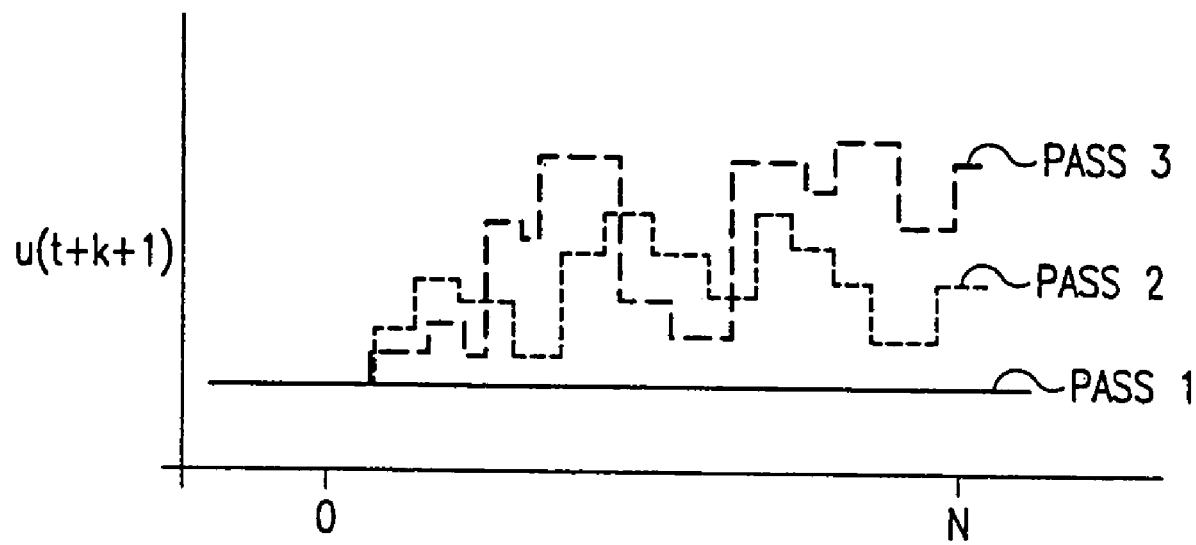

Referring now to FIGS. 11a and 11b, there are illustrated plots of the output y(t+k) and the input $u_k(t+k+1)$, for each k from the initial steady-state value to the horizon steady-state value at k=N. With specific reference to FIG. 11a, it can be seen that the optimization procedure is performed utilizing multiple passes. In the first pass, the actual value $u^a(t+k)$ for each k is utilized to determine the values of y(t+k) for each u,y pair. This is then accumulated and the values processed through the inverse model 153 and the iterate block 155 to minimize the error. This generates a new set of inputs $u_k(t+k+1)$ illustrated in FIG. 11b. Therefore, the optimization after pass 1 generates the values of u(t+k+1) for the second pass. In the second pass, the values are again optimized in accordance with the various constraints to again generate another set of values for u(t+k+1). This continues until the overall objective function is reached. This objective function is a combination of the operations as a function of the error and the operations as a function of the constraints, wherein the optimization constraints may control the overall operation of the inverse model 153 or the error modification parameters in block 152 may control the overall operation. Each of the optimization constraints will be described in more detail hereinbelow.

Figure 12:
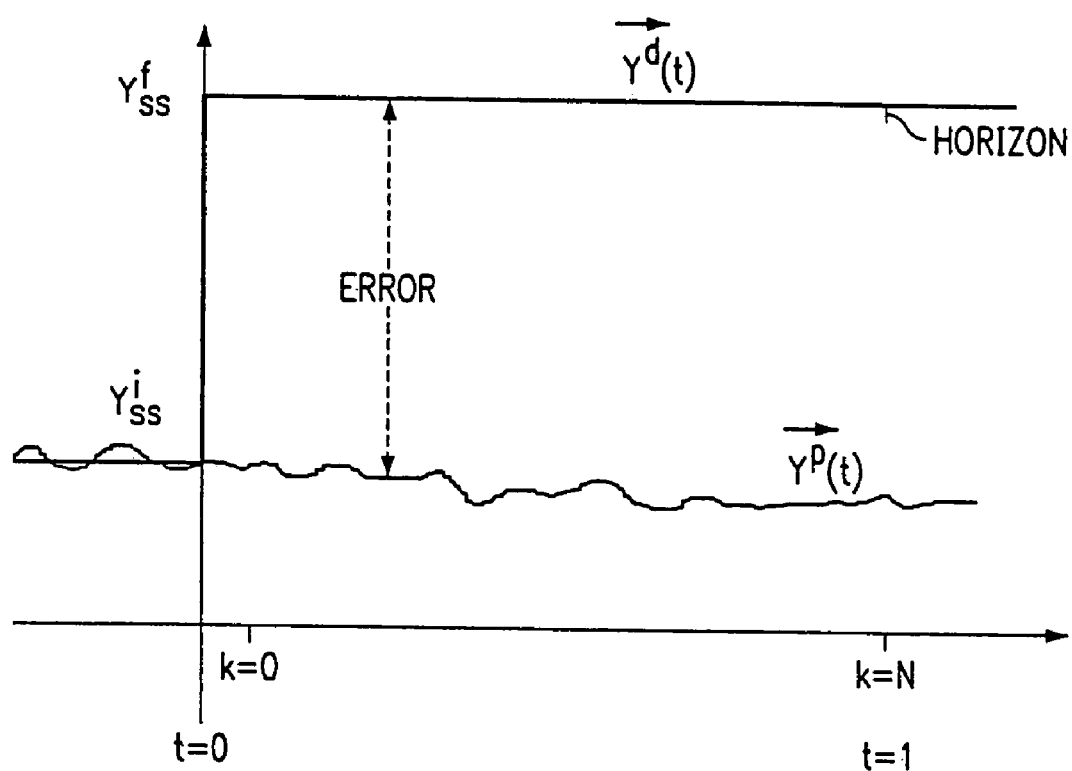
FIG. 12 illustrates a plot depicting desired and predicted behavior.

Referring now to FIG. 12, there is illustrated a plot of $y^d(t)$ and $y^p(t)$. The predicted value is represented by a waveform 170 and the desired output is represented by a waveform 172, both plotted over the horizon between an initial steady-state value $Y^i_{ss}$ and a final steady-state value $Y^f_{ss}$. It can be seen that the desired waveform prior to k=0 is substantially equal to the predicted output. At k=0, the desired output waveform 172 raises its level, thus creating an error. It can be seen that at k=0, the error is large and the system then must adjust the manipulated variables to minimize the error and force the predicted value to the desired value. The objective function for the calculation of error is of the form:

$$\min_{\Delta u_{il}} \sum_j \sum_k \left(A_j * (\bar{y}^p(t) - \bar{y}^d(t))\right)^2 \quad (23)$$

where: $Du_{il}$ is the change in input variable (IV) I at time interval 1
$A_j$ is the weight factor for control variable (CV) j
$y^p(t)$ is the predicted value of CV j at time interval k
$y^d(t)$ is the desired value of CV j.

Trajectory Weighting

Figure 13:
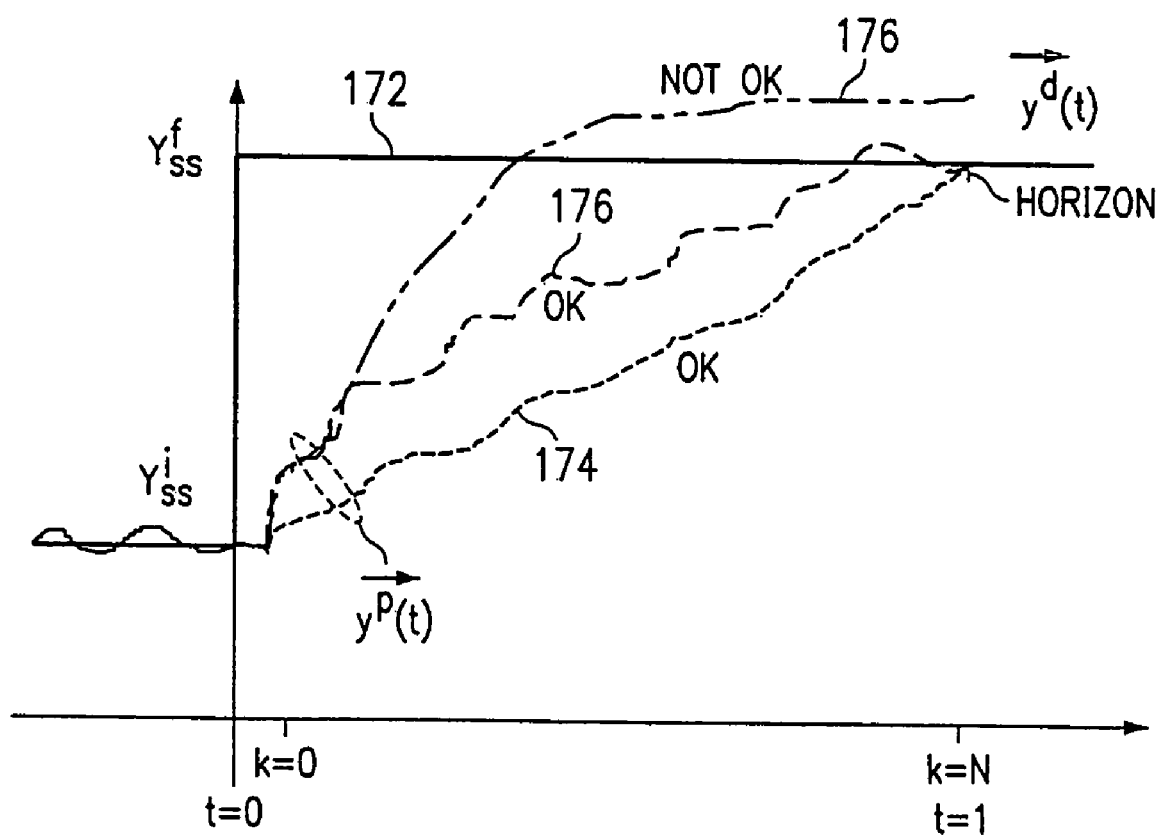
FIG. 13 illustrates various plots for controlling a system to force the predicted behavior to the desired behavior.

The present system utilizes what is referred to as "trajectory weighting" which encompasses the concept that one does not put a constant degree of importance on the future predicted process behavior matching the desired behavior at every future time set, i.e., at low k-values. One approach could be that one is more tolerant of error in the near term (low k-values) than farther into the future (high k-values). The basis for this logic is that the final desired behavior is more important than the path taken to arrive at the desired behavior, otherwise the path traversed would be a step function. This is illustrated in FIG. 13 wherein three possible predicted behaviors are illustrated, one represented by a curve 174 which is acceptable, one is represented by a different curve 176, which is also acceptable and one represented by a curve 178, which is unacceptable since it goes above the desired level on curve 172. Curves 174–178 define the desired behavior over the horizon for k=1 to N.

Figure 14:
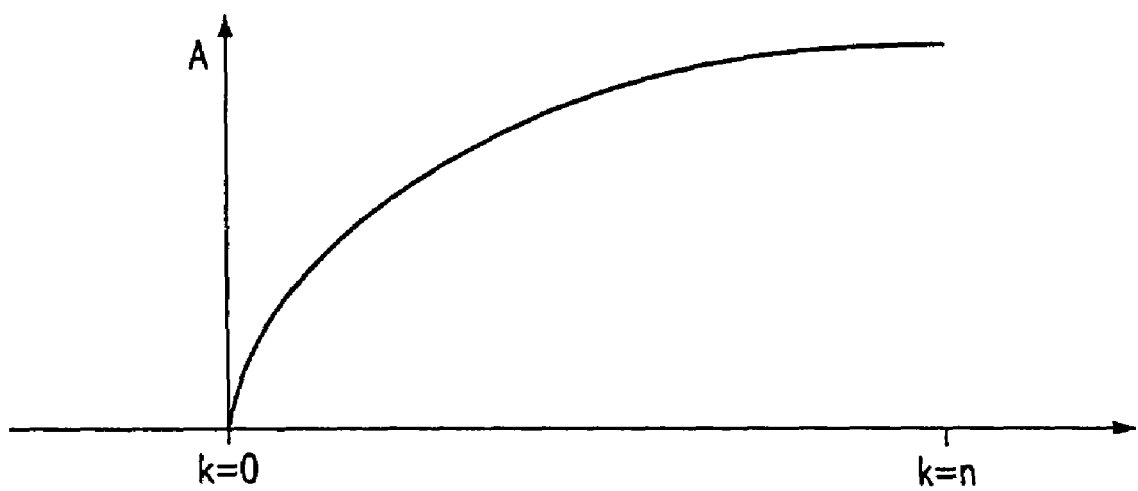
FIG. 14 illustrates a plot of a trajectory weighting algorithm.

In Equation 23, the predicted curves 174–178 would be achieved by forcing the weighting factors $A_j$ to be time varying. This is illustrated in FIG. 14. In FIG. 14, the weighting factor A as a function of time is shown to have an increasing value as time and the value of k increases. This results in the errors at the beginning of the horizon (low k-values) being weighted much less than the errors at the end of the horizon (high k-values). The result is more significant than merely redistributing the weights out to the end of the control horizon at k=N. This method also adds robustness, or the ability to handle a mismatch between the process and the prediction model. Since the largest error is usually experienced at the beginning of the horizon, the largest changes in the independent variables will also occur at this point. If there is a mismatch between the process and the prediction (model error), these initial moves will be large and somewhat incorrect, which can cause poor performance and eventually instability. By utilizing the trajectory weighting method, the errors at the beginning of the horizon are weighted less, resulting in smaller changes in the independent variables and, thus, more robustness.

Error Constraints

Figure 15:
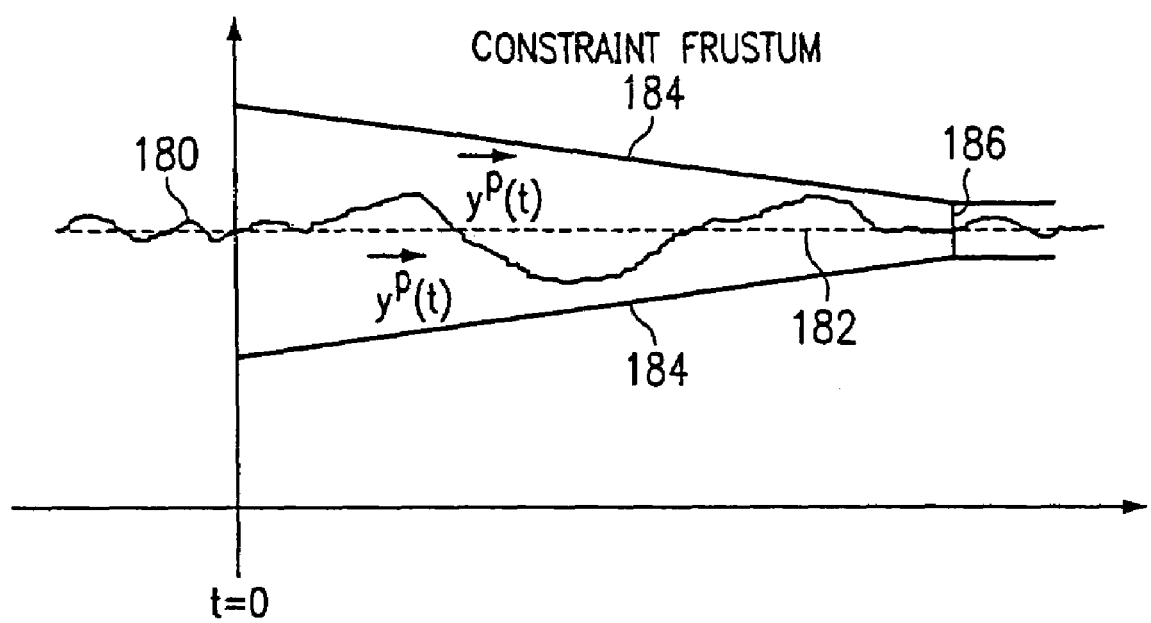
FIG. 15 illustrates a plot for one type of constraining algorithm.

Referring now to FIG. 15, there are illustrated constraints that can be placed upon the error. There is illustrated a predicted curve 180 and a desired curve 182, desired curve 182 essentially being a flat line. It is desirable for the error between curve 180 and 182 to be minimized. Whenever a transient occurs at t=0, changes of some sort will be required. It can be seen that prior to t=0, curve 182 and 180 are substantially the same, there being very little error between the two. However, after some type of transition, the error will increase. If a rigid solution were utilized, the system would immediately respond to this large error and attempt to reduce it in as short a time as possible. However, a constraint frustum boundary 184 is provided which allows the error to be large at t=0 and reduces it to a minimum level at a point 186. At point 186, this is the minimum error, which can be set to zero or to a non-zero value, corresponding to the noise level of the output variable to be controlled. This therefore encompasses the same concepts as the trajectory weighting method in that final future behavior is considered more important that near term behavior. The ever shrinking minimum and/or maximum bounds converge from a slack position at t=0 to the actual final desired behavior at a point 186 in the constraint frustum method.

The difference between constraint frustum and trajectory weighting is that constraint frustums are an absolute limit (hard constraint) where any behavior satisfying the limit is just as acceptable as any other behavior that also satisfies the limit. Trajectory weighting is a method where differing behaviors have graduated importance in time. It can be seen that the constraints provided by the technique of FIG. 15 requires that the value $y^p(t)$ is prevented from exceeding the constraint value. Therefore, if the difference between $y^d(t)$ and $y^p(t)$ is greater than that defined by the constraint boundary, then the optimization routine will force the input values to a value that will result in the error being less than the constraint value. In effect, this is a "clamp" on the difference between $y^p(t)$ and $y^d(t)$. In the trajectory weighting method, there is no "clamp" on the difference therebetween; rather, there is merely an attenuation factor placed on the error before input to the optimization network.

Trajectory weighting can be compared with other methods, there being two methods that will be described herein, the dynamic matrix control (DMC) algorithm and the identification and command (IdCom) algorithm. The DMC algorithm utilizes an optimization to solve the control problem by minimizing the objective function:

$$\min_{\Delta U_{il}} \sum_j \sum_k \left(A_j * (\bar{y}^P(t) - \bar{y}^D(t))\right) + \sum_i B_i * \sum_1 (\Delta U_{il})^2 \quad (24)$$

where $B_i$ is the move suppression factor for input variable I. This is described in Cutler, C. R. and B. L. Ramaker, Dynamic Matrix Control—A Computer Control Algorithm, AIChE National Meeting, Houston, Tex. (April, 1979), which is incorporated herein by reference.

It is noted that the weights $A_j$ and desired values $y^d(t)$ are constant for each of the control variables. As can be seen from Equation 24, the optimization is a trade off between minimizing errors between the control variables and their desired values and minimizing the changes in the independent variables. Without the move suppression term, the independent variable changes resulting from the set point changes would be quite large due to the sudden and immediate error between the predicted and desired values. Move suppression limits the independent variable changes, but for all circumstances, not just the initial errors.

Figure 16:
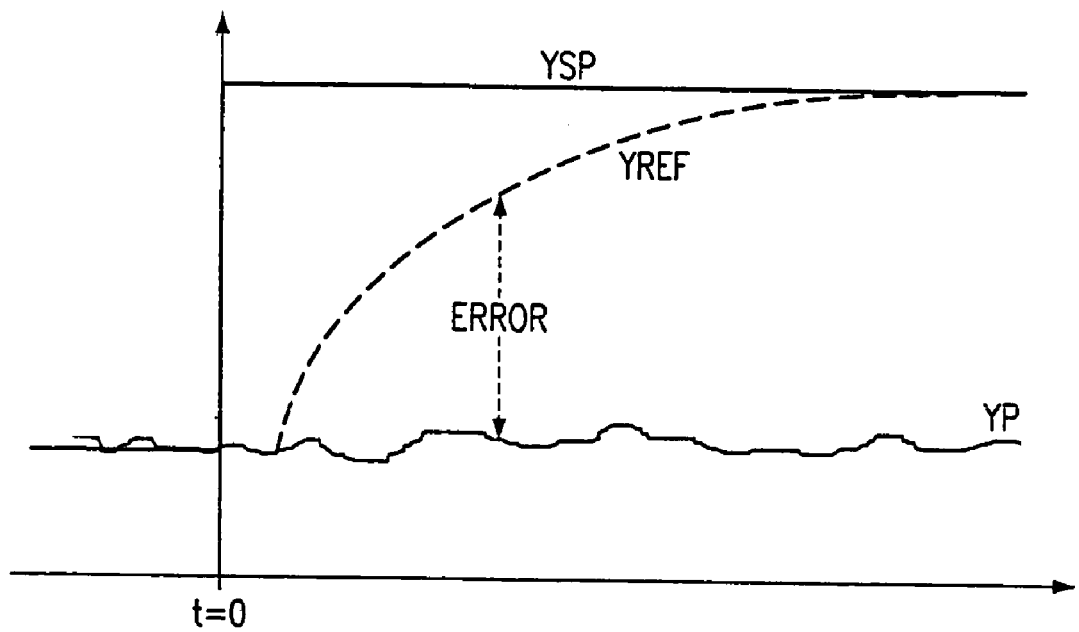
FIG. 16 illustrates a plot of the error algorithm as a function of time.

The IdCom algorithm utilizes a different approach. Instead of a constant desired value, a path is defined for the control variables to take from the current value to the desired value. This is illustrated in FIG. 16. This path is a more gradual transition from one operation point to the next. Nevertheless, it is still a rigidly defined path that must be met. The objective function for this algorithm takes the form:

$$\min_{\Delta U_{il}} \sum_j \sum_k (A_j * (Y^{Pjk} - y_{refjk}))^2 \quad (25)$$

This technique is described in Richalet, J., A. Rault, J. L. Testud, and J. Papon, Model Predictive Heuristic Control: Applications to Industrial Processes, Automatica, 14, 413–428 (1978), which is incorporated herein by reference. It should be noted that the requirement of Equation 25 at each time interval is sometimes difficult. In fact, for control variables that behave similarly, this can result in quite erratic independent variable changes due to the control algorithm attempting to endlessly meet the desired path exactly.

Control algorithms such as the DMC algorithm that utilize a form of matrix inversion in the control calculation, cannot handle control variable hard constraints directly. They must treat them separately, usually in the form of a steady-state linear program. Because this is done as a steady-state problem, the constraints are time invariant by definition. Moreover, since the constraints are not part of a control calculation, there is no protection against the controller violating the hard constraints in the transient while satisfying them at steady-state.

With further reference to FIG. 15, the boundaries at the end of the envelope can be defined as described hereinbelow. One technique described in the prior art, W. Edwards Deming, "Out of the Crisis," Massachusetts Institute of Technology, Center for Advanced Engineering Study, Cambridge Mass., Fifth Printing, September 1988, pages 327–329, describes various Monte Carlo experiments that set forth the premise that any control actions taken to correct for common process variation actually may have a negative impact, which action may work to increase variability rather than the desired effect of reducing variation of the controlled processes. Given that any process has an inherent accuracy, there should be no basis to make a change based on a difference that lies within the accuracy limits of the system utilized to control it. At present, commercial controllers fail to recognize the fact that changes are undesirable, and continually adjust the process, treating all deviation from target, no matter how small, as a special cause deserving of control actions, i.e., they respond to even minimal changes. Over adjustment of the manipulated variables therefore will result, and increase undesirable process variation. By placing limits on the error with the present filtering algorithms described herein, only controller actions that are proven to be necessary are allowed, and thus, the process can settle into a reduced variation free from unmerited controller disturbances. The following discussion will deal with one technique for doing this, this being based on statistical parameters.

Filters can be created that prevent model-based controllers from taking any action in the case where the difference between the controlled variable measurement and the desired target value are not significant. The significance level is defined by the accuracy of the model upon which the controller is statistically based. This accuracy is determined as a function of the standard deviation of the error and a predetermined confidence level. The confidence level is based upon the accuracy of the training. Since most training sets for a neural network-based model will have "holes" therein, this will result in inaccuracies within the mapped space. Since a neural network is an empirical model, it is only as accurate as the training data set. Even though the model may not have been trained upon a given set of inputs, it will extrapolate the output and predict a value given a set of inputs, even though these inputs are mapped across a space that is questionable. In these areas, the confidence level in the predicted output is relatively low. This is described in detail in U.S. patent application Ser. No. 08/025,184, filed Mar. 2, 1993, which is incorporated herein by reference.

Figure 17:
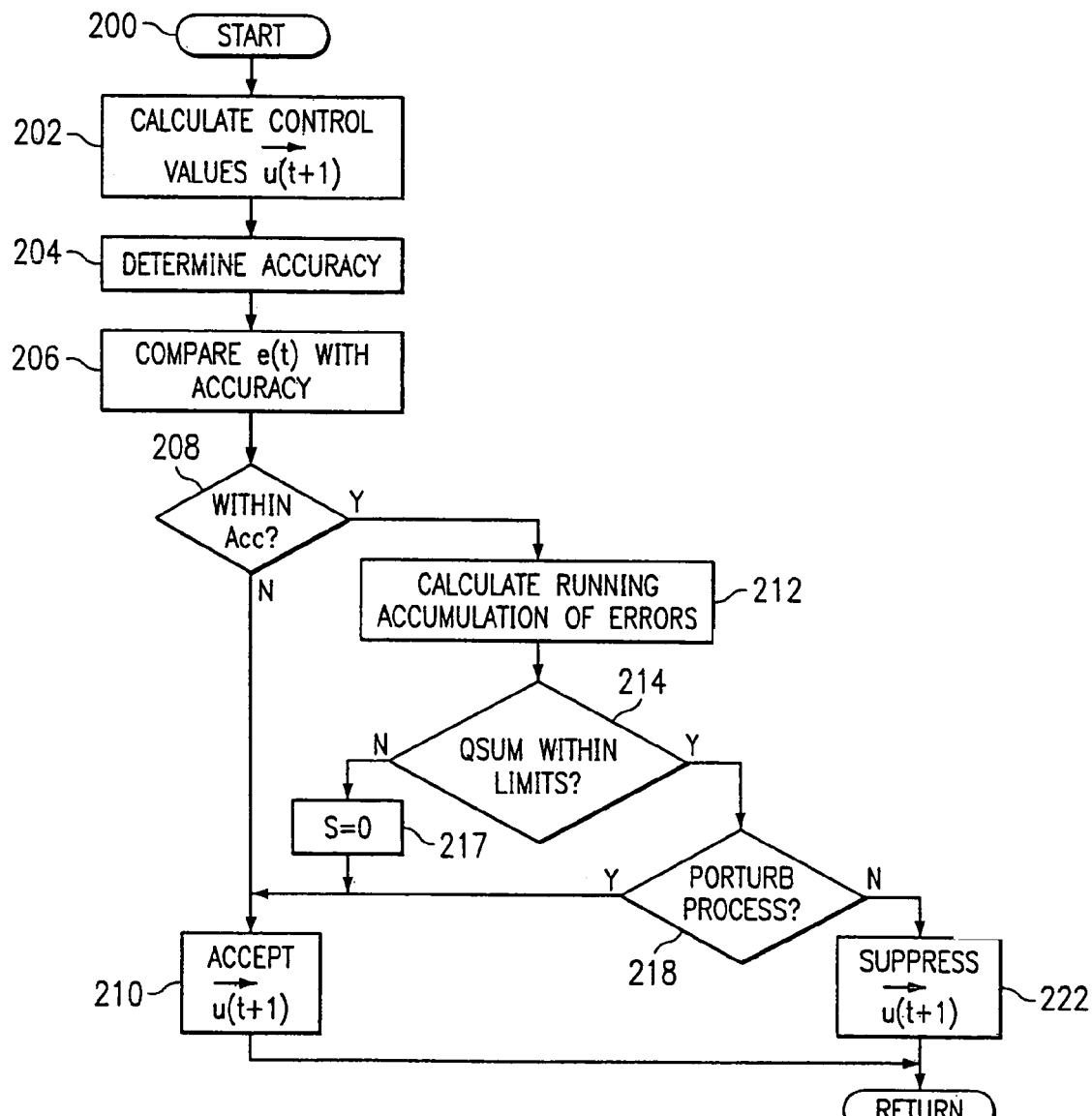
FIG. 17 illustrates a flowchart depicting the statistical method for generating the filter and defining the end point for the constraining algorithm of FIG. 15.

Referring now to FIG. 17, there is illustrated a flowchart depicting the statistical method for generating the filter and defining the end point 186 in FIG. 15. The flowchart is initiated at a start block 200 and then proceeds to a function block 202, wherein the control values u(t+1) are calculated. However, prior to acquiring these control values, the filtering operation must be a processed. The program will flow to a function block 204 to determine the accuracy of the controller. This is done off-line by analyzing the model predicted values compared to the actual values, and calculating the standard deviation of the error in areas where the target is undisturbed. The model accuracy of $e_m(t)$ is defined as follows:

$$e_m(t)=a(t)-p(t) \quad (26)$$

where: $e_m$=model error,
a=actual value
p=model predicted value

The model accuracy is defined by the following equation:

$$Acc=H*\sigma_m \quad (27)$$

where: Acc=accuracy in terms of minimal detector error $H$ = significance level = 1 67% confidence
= 2 95% confidence
= 3 99.5% confidence $\sigma_m$ = standard deviation of $e_m(t)$.

The program then flows to a function block 206 to compare the controller error $e_c(t)$ with the model accuracy. This is done by taking the difference between the predicted value (measured value) and the desired value. This is the controller error calculation as follows:

$$e_c(t)=d(t)-m(t) \quad (28)$$

where: $e_c$ = controller error
$d$ = desired value
$m$ = measured value

The program will then flow to a decision block 208 to determine if the error is within the accuracy limits. The determination as to whether the error is within the accuracy limits is done utilizing Shewhart limits. With this type of limit and this type of filter, a determination is made as to whether the controller error $e_c(t)$ meets the following conditions: $e_c(t) \geq -1*Acc$ and $e_c(t) \leq +1*Acc$, then either the control action is suppressed or not suppressed. If it is within the accuracy limits, then the control action is suppressed and the program flows along a "Y" path. If not, the program will flow along the "N" path to function block 210 to accept the u(t+1) values. If the error lies within the controller accuracy, then the program flows along the "Y" path from decision block 208 to a function block 212 to calculate the running accumulation of errors. This is formed utilizing a CUSUM approach. The controller CUSUM calculations are done as follows:

$$S_{low}=\min(0, S_{low}(t-1)+d(t)-m(t))-\Sigma(m)+k) \quad (29)$$

$$S_{hi}=\max(0, S_{hi}(t-1)+[d(t)-m(t)]-\Sigma(m)]-k) \quad (30)$$

where: $S_{hi}$ = Running Positive Qsum $S_{low}$ = Running Negative Qsum $k$ = Tuning factor- minimal detectable change threshold with the following defined:
Hq=significance level. Values of (j,k) can be found so that the CUSUM control chart will have significance levels equivalent to Shewhart control charts.

The program will then flow to a decision block 214 to determine if the CUSUM limits check out, i.e., it will determine if the Qsum values are within the limits. If the Qsum, the accumulated sum error, is within the established limits, the program will then flow along the "Y" path. And, if it is not within the limits, it will flow along the "N" path to accept the controller values u(t+1). The limits are determined if both the value of $S_{hi} \geq +1*Hq$ and $S_{low} \leq -1*Hq$. Both of these actions will result in this program flowing along the "Y" path. If it flows along the "N" path, the sum is set equal to zero and then the program flows to the function block 210. If the Qsum values are within the limits, it flows along the "Y" path to a function block 218 wherein a determination is made as to whether the user wishes to perturb the process. If so, the program will flow along the "Y" path to the function block 210 to accept the control values u(t+1). If not, the program will flow along the "N" path from decision block 218 to a function block 222 to suppress the controller values u(t+1). The decision block 218, when it flows along the "Y" path, is a process that allows the user to re-identify the model for on-line adaptation, i.e., retrain the model. This is for the purpose of data collection and once the data has been collected, the system is then reactivated.

Figure 18:
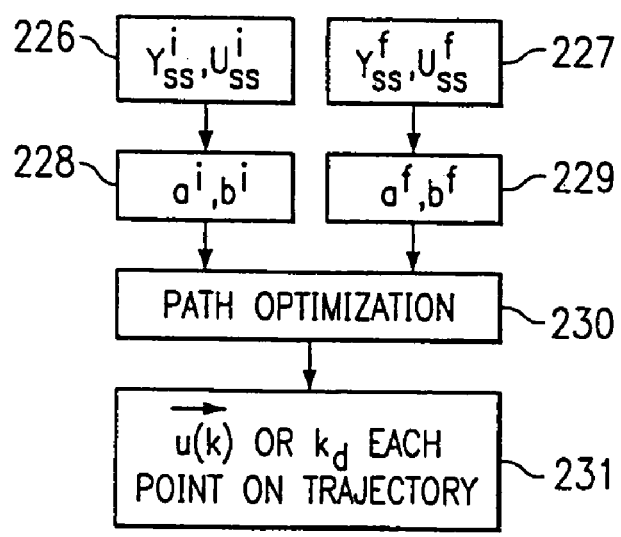
FIG. 18 illustrates a diagrammatic view of the optimization process.

Referring now to FIG. 18, there is illustrated a block diagram of the overall optimization procedure. In the first step of the procedure, the initial steady-state values $\{Y_{ss}^i, U_{ss}^i\}$ and the final steady-state values $\{Y_{ss}^f, U_{ss}^f\}$ are determined, as defined in blocks 226 and 228, respectively. In some calculations, both the initial and the final steady-state values are required. The initial steady-state values are utilized to define the coefficients $a^i, b^i$ in a block 228. As described above, this utilizes the coefficient scaling of the b-coefficients. Similarly, the steady-state values in block 228 are utilized to define the coefficients $a^f, b^f$, it being noted that only the b-coefficients are also defined in a block 229. Once the beginning and end points are defined, it is then necessary to determine the path therebetween. This is provided by block 230 for path optimization. There are two methods for determining how the dynamic controller traverses this path.

The first, as described above, is to define the approximate dynamic gain over the path from the initial gain to the final gain. As noted above, this can incur some instabilities. The second method is to define the input values over the horizon from the initial value to the final value such that the desired value $Y_{ss}^f$ is achieved. Thereafter, the gain can be set for the dynamic model by scaling the b-coefficients. As noted above, this second method does not necessarily force the predicted value of the output $y^p(t)$ along a defined path; rather, it defines the characteristics of the model as a function of the error between the predicted and actual values over the horizon from the initial value to the final or desired value. This effectively defines the input values for each point on the trajectory or, alternatively, the dynamic gain along the trajectory.

The steady-state model is operable to predict both the output steady-state value $Y_{ss}^i$ at a value of k=0, the initial steady-state value, and the output steady-state value $Y_{ss}^i$ at a time t+N where k=N, the final steady-state value. At the initial steady-state value, there is defined a region which comprises a surface in the output space in the proximity of the initial steady-state value, which initial steady-state value also lies in the output space. This defines the range over which the dynamic controller can operate and the range over which it is valid. At the final steady-state value, if the gain were not changed, the dynamic model would not be valid. However, by utilizing the steady-state model to calculate the steady-state gain at the final steady-state value and then force the gain of the dynamic model to equal that of the steady-state model, the dynamic model then becomes valid over a region proximate the final steady-state value. This is at a value of k=N. The problem that arises is how to define the path between the initial and final steady-state values. One possibility, as mentioned hereinabove, is to utilize the steady-state model to calculate the steady-state gain at multiple points along the path between the initial steady-state value and the final steady-state value and then define the dynamic gain at those points. This could be utilized in an optimization routine, which could require a large number of calculations. If the computational ability were there, this would provide a continuous calculation for the dynamic gain along the path traversed between the initial steady-state value and the final steady-state value utilizing the steady-state gain. However, it is possible that the steady-state model is not valid in regions between the initial and final steady-state values, i.e., there is a low confidence level due to the fact that the training in those regions may not be adequate to define the model therein. Therefore, the dynamic gain is approximated in these regions, the primary goal being to have some adjustment of the dynamic model along the path between the initial and the final steady-state values during the optimization procedure. This allows the dynamic operation of the model to be defined.

Figure 19:
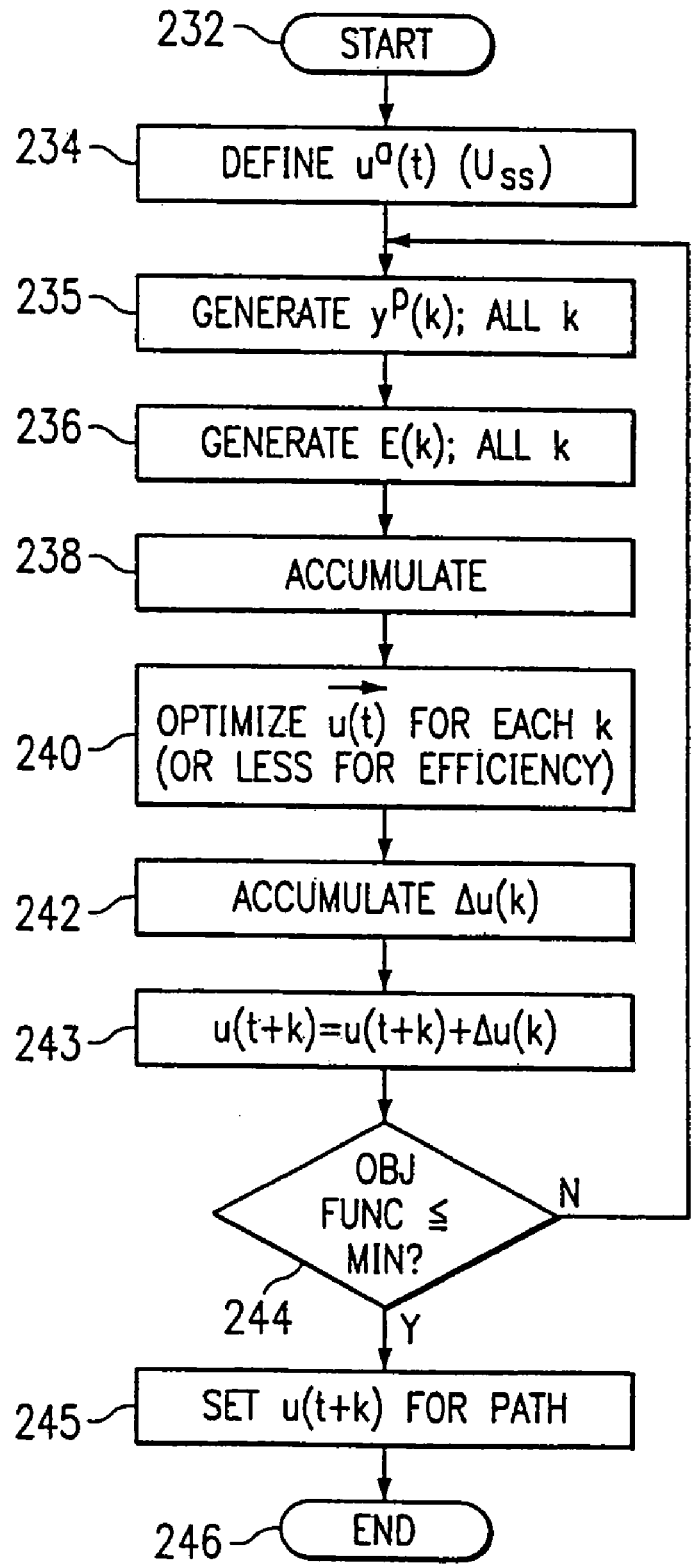
FIG. 19 illustrates a flowchart for the optimization procedure.

Referring now to FIG. 19, there is illustrated a flow chart depicting the optimization algorithm. The program is initiated at a start block 232 and then proceeds to a function block 234 to define the actual input values $u^a(t)$ at the beginning of the horizon, this typically being the steady-state value $U_{ss}$. The program then flows to a function block 235 to generate the predicted values $y^p(k)$ over the horizon for all k for the fixed input values. The program then flows to a function block 236 to generate the error E(k) over the horizon for all k for the previously generated $y^p(k)$. These errors and the predicted values are then accumulated, as noted by function block 238. The program then flows to a function block 240 to optimize the value of u(t) for each value of k in one embodiment. This will result in k-values for u(t). Of course, it is sufficient to utilize less calculations than the total k-calculations over the horizon to provide for a more efficient algorithm. The results of this optimization will provide the predicted change Δu(t+k) for each value of k in a function block 242. The program then flows to a function block 243 wherein the value of u(t+k) for each u will be incremented by the value Δu(t+k). The program will then flow to a decision block 244 to determine if the objective function noted above is less than or equal to a desired value. If not, the program will flow back along an "N" path to the input of function block 235 to again make another pass. This operation was described above with respect to FIGS. 11a and 11b. When the objective function is in an acceptable level, the program will flow from decision block 244 along the "Y" path to a function block 245 to set the value of u(t+k) for all u. This defines the path. The program then flows to an End block 246.

Steady State Gain Determination

Figure 20:
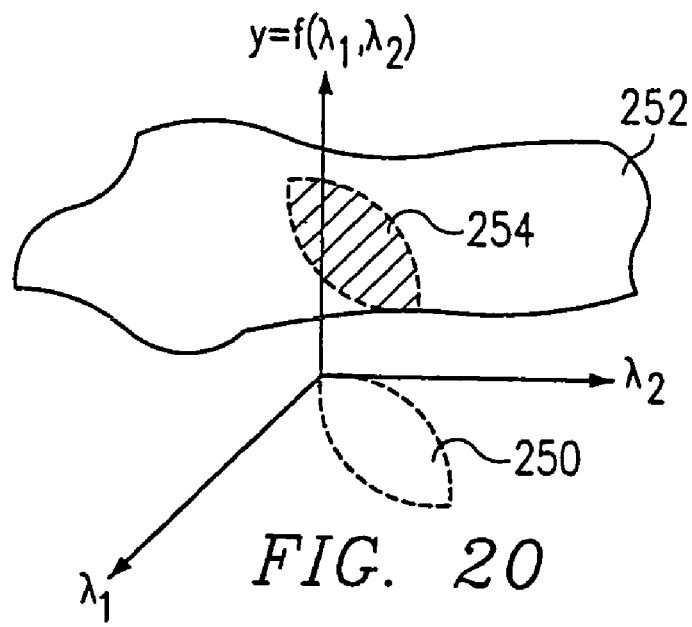
FIG. 20 illustrates a diagrammatic view of the input space and the error associated therewith.
Figure 21:
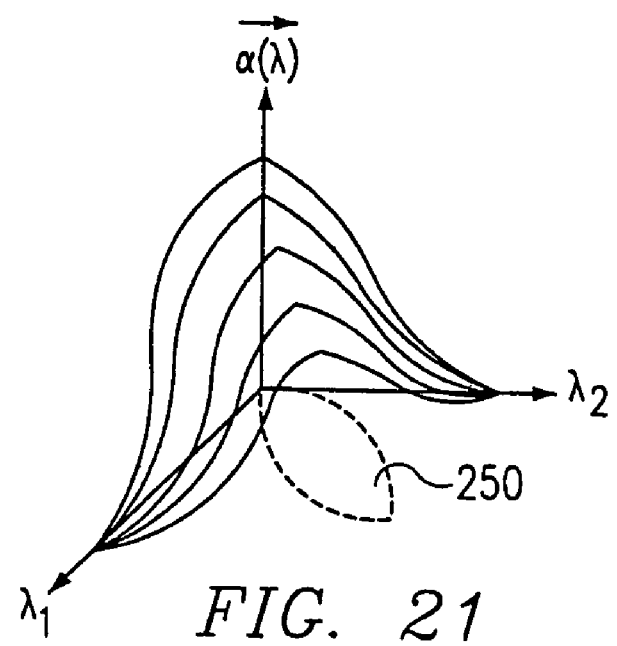
FIG. 21 illustrates a diagrammatic view of the confidence factor in the input space.

Referring now to FIG. 20, there is illustrated a plot of the input space and the error associated therewith. The input space is comprised of two variables $x_1$ and $x_2$. The y-axis represents the function $f(x_1, x_2)$. In the plane of $x_1$ and $x_2$, there is illustrated a region 250, which represents the training data set. Areas outside of the region 250 constitute regions of no data, i.e., a low confidence level region. The function Y will have an error associated therewith. This is represented by a plane 252. However, the error in the plane 250 is only valid in a region 254, which corresponds to the region 250. Areas outside of region 254 on plane 252 have an unknown error associated therewith. As a result, whenever the network is operated outside of the region 250 with the error region 254, the confidence level in the network is low. Of course, the confidence level will not abruptly change once outside of the known data regions but, rather, decreases as the distance from the known data in the training set increases. This is represented in FIG. 21 wherein the confidence is defined as α(x). It can be seen from FIG. 21 that the confidence level α(x) is high in regions overlying the region 250.

Once the system is operating outside of the training data regions, i.e., in a low confidence region, the accuracy of the neural net is relatively low. In accordance with one aspect of the preferred embodiment, a first principles model g(x) is utilized to govern steady-state operation. The switching between the neural network model f(x) and the first principle models g(x) is not an abrupt switching but, rather, it is a mixture of the two.

The steady-state gain relationship is defined in Equation 7 and is set forth in a more simple manner as follows:

$$K(\vec{u}) = \frac{\partial(f(\vec{u}))}{\partial(\vec{u})} \quad (31)$$

A new output function Y(u) is defined to take into account the confidence factor α(u) as follows:

$$Y(\vec{u}) = \alpha(\vec{u}) \cdot f(\vec{u}) + (1 - \alpha(\vec{u}))g(\vec{u}) \quad (32)$$

where: α(u)=confidence in model f(u)
α(u) in the range of 0→1
α(u)ε{0,1}

This will give rise to the relationship:

$$K(\vec{u}) = \frac{\partial(Y(\vec{u}))}{\partial(\vec{u})} \quad (33)$$

In calculating the steady-state gain in accordance with this Equation utilizing the output relationship Y(u), the following will result:

$$K(\vec{u}) = \frac{\partial(\alpha(\vec{u}))}{\partial(\vec{u})} \times F(\vec{u}) + \alpha(\vec{u}) \frac{\partial(F(\vec{u}))}{\partial(\vec{u})} + \frac{\partial(1-\alpha(\vec{u}))}{\partial(\vec{u})} \times g(\vec{u}) + (1-\alpha(\vec{u})) \frac{\partial(g(\vec{u}))}{\partial(\vec{u})} \quad (34)$$

Figure 22:
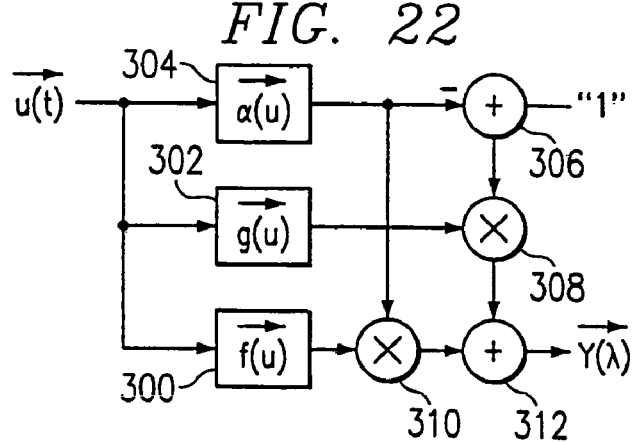
FIG. 22 illustrates a block diagram of the method for utilizing a combination of a non-linear system and a first principals system.

Referring now to FIG. 22, there is illustrated a block diagram of the embodiment for realizing the switching between the neural network model and the first principles model. A neural network block 300 is provided for the function f(u), a first principle block 302 is provided for the function g(u) and a confidence level block 304 for the function a(u). The input u(t) is input to each of the blocks 300–304. The output of block 304 is processed through a subtraction block 306 to generate the function 1–α(u), which is input to a multiplication block 308 for multiplication with the output of the first principles block 302. This provides the function (1–α(u))*g(u). Additionally, the output of the confidence block 304 is input to a multiplication block 310 for multiplication with the output of the neural network block 300. This provides the function f(u)*α(u). The output of block 308 and the output of block 310 are input to a summation block 312 to provide the output Y(u).

Figure 23:
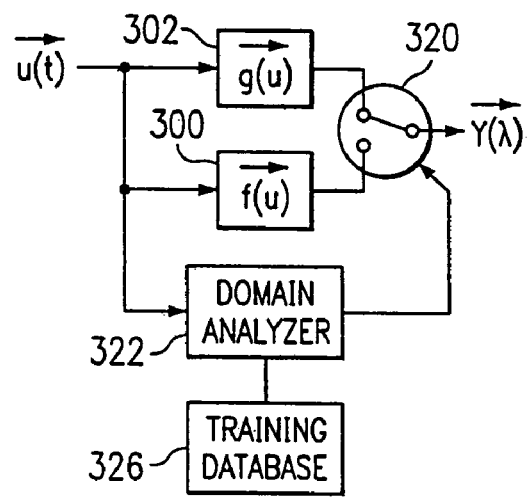
FIG. 23 illustrates an alternate embodiment of the embodiment of FIG. 22.

Referring now to FIG. 23, there is illustrated an alternate embodiment which utilizes discreet switching. The output of the first principles block 302 and the neural network block 300 are provided and are operable to receive the input x(t). The output of the network block 300 and first principles block 302 are input to a switch 320, the switch 320 operable to select either the output of the first principals block 302 or the output of the neural network block 300. The output of the switch 320 provides the output Y(u).

The switch 320 is controlled by a domain analyzer 322. The domain analyzer 322 is operable to receive the input x(t) and determine whether the domain is one that is within a valid region of the network 300. If not, the switch 320 is controlled to utilize the first principles operation in the first principles block 302. The domain analyzer 322 utilizes the training database 326 to determine the regions in which the training data is valid for the network 300. Alternatively, the domain analyzer 320 could utilize the confidence factor α(u) and compare this with a threshold, below which the first principles model 302 would be utilized.

Identification of Dynamic Models

Gain information, as noted hereinabove, can also be utilized in the development of dynamic models. Instead of utilizing the user-specified gains, the gains may be obtained from a trained steady-state model. Although described hereinabove with reference to Equation 7, a single input, single output dynamic model will be defined by a similar equation as follows:

$$\hat{y}(t) = -a_1\hat{y}(t-1) - a_2\hat{y}(t-2) + b_1u(t-d-1) + b_2u(t-d-2) \quad (35)$$

where the dynamic steady-state gain is defined as follows:

$$k_d = \frac{b_1 + b_2}{1 + a_1 + a_2} \quad (36)$$

This gain relationship is essentially the same as defined hereinabove in Equation 11. Given a time series of input and output data, u(t) and y(t), respectively, and the steady-state or static gain associated with the average value of the input, $K'_{ss}$, the parameters of the dynamic system may be defined by minimizing the following cost function:

$$J = \lambda(k_d - K'_{ss})^2 + \sum_{t=t_i}^{t_f} (y^p(t) - y(t))^2 \quad (37)$$

where λ is a user-specified value. It is noted that the second half of Equation 37 constitutes the summation over the time series with the value y(t) constituting the actual output and the function $y^p(t)$ constituting the predicted output values. The mean square error of this term is summed from an initial time $t_i$ to a final time $t_f$, constituting the time series. The gain value $k_d$ basically constitutes the steady-state gain of the dynamic model. This optimization is subject to the following constraints on dynamic stability:

$$0 \leq a_2 < 1 \quad (38)$$

$$-a_2 - 1 < a_1 < 0 \quad (39)$$

$$-a_2 - 1 < a_1 < 0 \quad (39)$$

which are conventional constraints. The variable λ is used to enforce the average steady-state gain, $K'_{ss}$, in the identification of the dynamic model. The value $K'_{ss}$ is found by calculating the average value of the steady-state gain associated with the neural network over the time horizon $t_i$ to $t_f$. Given the input time series $u(t_i)$ to $u(t_f)$, the $K'_{ss}$ is defined as follows:

$$K'_{ss} = \frac{1}{t_f - t_i} \sum_{t=t_i}^{t_f} K_{ss}(t) \quad (40)$$

For a large value of λ, the gain of the steady-state and dynamic models are forced to be equal. For a small value of λ, the gain of the dynamic model is found independently from that of the steady-state model. For λ=0, the optimization problem is reduced to a technique commonly utilized in identification of output equation-based models, as defined in L. Ljung, "System Identification: Theory for the User," Prentice-Hall, Englewood Cliffs, N.J. 1987.

In defining the dynamic model in accordance with Equation No. 37, it is recognized that only three parameters need to be optimized, the $a_1$ parameter, the $a_2$ parameter and the ratio of $b_1$ and $b_2$. This is to be compared with the embodiment described hereinabove with reference to FIG. 2, wherein the dynamic gain was forced to be equal to the steady-state gain of the static model 20. By utilizing the weighting factor λ and minimizing the cost function in accordance with Equation 37 without requiring the dynamic gain $k_d$ to equal the steady-state gain $K'_{ss}$ of the neural network, some latitude is provided in identifying the dynamic model.

In the embodiment described above with respect to FIG. 2, the model was identified by varying the b-values with the dynamic gain forced to be equal to the steady-state gain. In the embodiment illustrated above with respect to Equation 37, the dynamic gain does not necessarily have to equal the steady-state gain $K'_{ss}$, depending upon the value of λ defining the weighting factor.

The above noted technique of Equation 37 provides for determining the a's and b's of the dynamic model as a method of identification in a particular localized region of the input space. Once the a's and b's of the dynamic model are known, this determines the dynamics of the system with the only variation over the input space from the localized region in which the dynamic step test data was taken being the dynamic gain $k_d$. If this gain is set to a value of one, then the only component remaining are the dynamics. Therefore, the dynamic model, once defined, then has its gain scaled to a value of one, which merely requires adjusting the b-values. This will be described hereinbelow. After identification of the model, it is utilized as noted hereinabove with respect to the embodiment of FIG. 2 and the dynamic gain can then be defined for each region utilizing the static gain.

Steady-State Model Identification

As noted hereinabove, to optimize and control any process, a model of that process is needed. The present system relies on a combination of steady-state and dynamic models. The quality of the model determines the overall quality of the final control of the plant. Various techniques for training a steady-state model will be described hereinbelow.

Prior to discussing the specific model identification method utilized in the present embodiment, it is necessary to define a quasi-steady-state model. For comparison, a steady-state model will be defined as follows:

Steady-State Models:

A steady-state model is represented by the static mapping from the input, u(t) to the output y(t) as defined by the following equation:

$$\vec{y}(t) = F(\vec{u}(t)) \quad (41)$$

where F(u(t)) models the steady-state mapping of the process and $u(t) \in R^m$ and $y(t) \in R^n$ represent the inputs and outputs of a given process. It should be noted that the input, u(t), and the output, y(t), are not a function of time and, therefore, the steady-state mapping is independent of time. The gain of the process must be defined with respect to a point in the input space. Given the point $\bar{u}(t)$, the gain of process is defined as:

$$G(\vec{u}(t)) = \frac{d\vec{y}}{d\vec{u}}|u(t) \quad (42)$$

where G is a $R^{m \times n}$ matrix. This gain is equivalent to the sensitivity of the function F(u(t)).

Quasi-Steady-State Models:

A steady-state model by definition contains no time information. In some cases, to identify steady-state models, it is necessary to introduce time information into the static model:

$$\bar{y}(t) = G(\vec{u}(t,d)) \quad (43)$$

where:

$$\vec{u}(t,d) = [u_1(t-d_1) u_2(t-d_2) \ldots u_m(t-d_m)] \quad (44)$$

Figure 24:
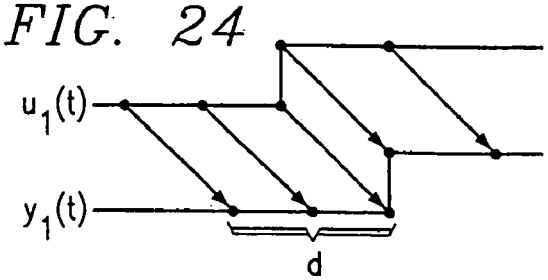
FIG. 24 illustrates a plot of a pair of data with a defined delay associated therewith.

The variable $d_i$ represents the delay associated with the $i^{th}$ input. In the quasi-steady-state model, the static mapping of $G(u(t))$ is essentially equal to the steady-state mapping $F(u(t))$. The response of such a model is illustrated in FIG. 24. In FIG. 24, there is illustrated a single input $u_1(t)$ and a single output $y_1(t)$, this being a single output, single input system. There is a delay, or dead time d, noted between the input and the output which represents a quasi-steady-state dynamic. It is noted, however, that each point on the input $u_1(t)$ corresponds to a given point on the output $y_1(t)$ by some delay d. However, when $u_1(t)$ makes a change from an initial value to a final value, the output makes basically an instantaneous change and follows it. With respect to the quasi-steady-state model, the only dynamics that are present in this model is the delay component.

Identification of Delays in Quasi-Steady-State Models

Given data generated by a quasi-steady-state model of the form $$y(t) = G(\vec{u}(t-d)), \quad (45)$$

where d is the dead-time or delay noted in FIG. 24, the generating function $G(\ )$ is approximated via a neural network training algorithm (nonlinear regression) when d is known. That is, a function $G(\ )$ is fitted to a set of data points generated from $G(\ )$, where each data point is a u(t), y(t) pair. The present system concerns time-series data, and thus the dataset is indexed by t. The data set is denoted by D.

In process modeling, exact values for d are ordinarily not critical to the quality of the model; approximate values typically suffice. Prior art systems specified a method for approximating d by training a model with multiple delays per input, and picking the delay which has the largest sensitivity (average absolute partial derivative of output w.r.t. input). In these prior art systems, the sensitivity was typically determined by manipulating a given input and determining the effect thereof on the output. By varying the delay, i.e., taking a different point of data in time with respect to a given y(t) value, a measure of sensitivity of the output on the input can be determined as a function of the delay. By taking the delay which exhibits the largest sensitivity, the delay of the system can be determined.

The disadvantage to the sensitivity technique is that it requires a number of passes through the network during training in order to determine the delay. This is an iterative technique. In accordance with the present system, the method for approximating the delay is done utilizing a statistical method for examining the data, as will be described in more detail hereinbelow. This method is performed without requiring actual neural network training during the determination operation. The method of the present embodiment examines each input variable against a given output variable, independently of the other input variables. Given $d_i$ for an input variable $u_i$, the method measures the strength of the relationship between $u_i(t-d_i)$ and y(t). The method is fast, such that many $d_i$ values may be tested for each $u_i$.

The user supplies $d_{i,min}$ and $d_{i,max}$ values for each $u_i$. The strength of the relationship between $u_i(t-d_i)$ and y(t) is computed for each $d_i$ between $d_{i,min}$ and $d_{i,max}$ (inclusive). The $d_i$ yielding the strongest relationship between $u_i(t-d_i)$ and y(t) is chosen as the approximation of the dead-time for that input variable on the given output variable. The strength of the relationship between $u_i(t-d_i)$ and y(t) is defined as the degree of statistical dependence between $u_i(t-d_i)$ and y(t). The degree of statistical dependence between $u_i(t-d_i)$ and y(t) is the degree to which $u_i(t-d_i)$ and y(t) are not statistically independent.

Statistical dependence is a general concept. As long as there is any relationship whatsoever between two variables, of whatever form, linear or nonlinear, the definition of statistical independence for those two variables will fail. Statistical independence between two variables $x_1(t)$ and $x_2(t)$ is defined as:

$$p(x_1(t))p(x_2(t)) = p(x_1(t), x_2(t)) \forall t \quad (46)$$

where $p(x_1(t))$ is the marginal probability density function of $x_1(t)$ and $p(x_1(t), x_2(t))$ is the joint probability density function $(x_1(t) = u_i(t-d_i)$ and $x_2 = y(t))$; that is, the product of the marginal probabilities is equal to the joint probability. If they are equal, this constitutes statistical independence, and the level of inequality provides a measure of statistical dependence.

Any measure $f(x_1(t), x_2(t))$ which has the following property ("Property 1") is a suitable measure of statistical dependence:

Property 1: $f(x_1(t), x_2(t))$ is 0 if and only if Equation 46 holds at each data point, and f>0 otherwise. In addition, the magnitude of f measures the degree of violation of Equation 46 summed over all data points.

Mutual information (MI) is one such measure, and is defined as:

$$MI = \sum_t p(x_1(t), x_2(t)) \log\left(\frac{p(x_1(t), x_2(t))}{p(x_1(t))p(x_2(t))}\right) \quad (47)$$

Property 1 holds for MI. Theoretically, there is no fixed maximum value of MI, as it depends upon the distributions of the variables in question. As explained hereinbelow, the maximum, as a practical matter, also depends upon the method employed to estimate probabilities. Regardless, MI values for different pairs of variables may be ranked by relative magnitude to determine the relative strength of the relationship between each pair of variables. Any other measure f having Property 1 would be equally applicable, such as the sum of the squares of the product of the two sides of Equation 58:

$$SSD = \Sigma_t [(p(x_1(t), x_2(t)) - p(x_1(t))p(x_2(t)))]^2 \quad (48)$$

However, MI (Equation 47) is the preferred method in the disclosed embodiment.

Statistical Dependence vs. Correlation

For purposes of the present embodiment, the method described above, i.e., measuring statistical dependence, is superior to using linear correlation. The definition of linear correlation is well-known and is not stated herein. Correlation ranges in value from −1 to 1, and its magnitude indicates the degree of linear relationship between variables $x_1(t)$ and $x_2(t)$. Nonlinear relationships are not detected by correlation.

For example, y(t) is totally determined by x(t) in the relation $$y(t) = x^2(t). \tag{49}$$

Yet, if x(t) varies symmetrically about zero, then:

$$corr(y(t),x(t))=0. \tag{50}$$

That is, correlation detects no linear relationship because the relationship is entirely nonlinear. Conversely, statistical dependence registers a relationship of any kind, linear or nonlinear, between variables. In this example, MI(y(t),x(t)) would calculate to be a large number.

Estimation Probabilities

An issue in computing MI is how to estimate the probability distributions given a dataset D. Possible methods include kernel estimation methods, and binning methods. The preferred method is a binning method, as binning methods are significantly cheaper to compute than kernel estimation methods.

Of the binning techniques, a very popular method is that disclosed in A. M. Fraser and Harry L. Swinney. "Independent Coordinates for Strange Attractors in Mutual Information," *Physical Review A,* 33(2):1134–1140, 1986. This method makes use of a recursive quadrant-division process.

The present method uses a binning method whose performance is highly superior to that of the Fraser method. The binning method used herein simply divides each of the two dimensions ($u_i(t-d_j)$ and y(t)) into a fixed number of divisions, where N is a parameter which may be supplied by the user, or which defaults to sqrt(#datapoints/20). The width of each division is variable, such that an (approximately) equal number of points fall into each division of the dimension. Thus, the process of dividing each dimension is independent of the other dimension.

In order to implement the binning procedure, it is first necessary to define a grid of data points for each input value at a given delay. Each input value will be represented by a time series and will therefore be a series of values. For example, if the input value were $u_1(t)$, there would be a time series of these $u_i(t)$ values, $u_1(t_1)$, $u_1(t_2)$ ... $u_1(t_j)$. There would be a time series $u_i(t)$ for each output value y(t). For the purposes of the illustration herein, there will be considered only a single output from y(t), although it should be understood that a multiple input, multiple output system could be utilized.

Figure 25:
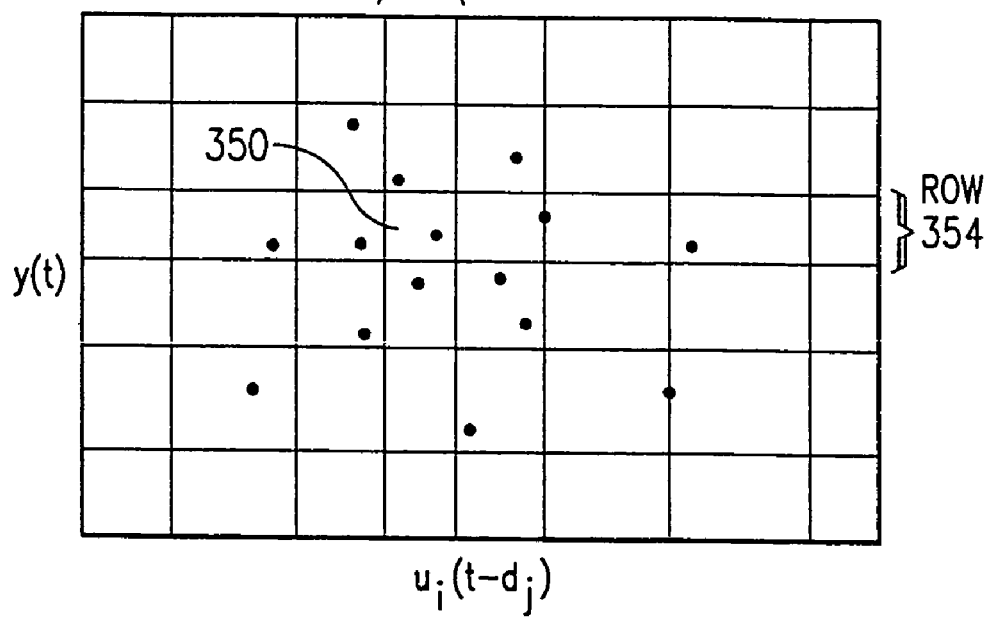
FIG. 25 illustrates a diagrammatic view of the binning method for determining statistical independence.

Referring now to FIG. 25, there is illustrated a diagrammatic view of a binning method. In this method, a single point generated for each value of $u_i(t)$ for the single value y(t). All of the data in the time series $u_i(t)$ is plotted in a single grid. This time series is then delayed by the delay value $d_j$ to provide a delay value $u_i(t-d_j)$. For each value of j from to $d_{j,min}$ to $d_{j,max}$, there will be a grid generated. There will then be a mutual information value generated for each grid to show the strength of the relationship between that particular delay value $d_j$ and the output y(t). By continually changing the delay $d_j$ for the time series $u_i(t)$, a different MI value can be generated.

In the illustration of FIG. 25, there are illustrated a plurality of rows and a plurality columns with the data points disposed therein with the x-axis labeled $u_i(t-d_j)$ and the y-axis labeled y(t). For a given column 352 and a given row 354, there is defined a single bin 350. As described above, the grid lines are variable such that the number of points in any one division is variable, as described hereinabove. Once the grid is populated, then it is necessary to determine the MI value. This MI value for the binning grid or a given value of $d_j$ is defined as follows:

$$MI = \sum_{i=1}^{N} \sum_{j=1}^{M} p(x_1(i), x_2(j)) \log \frac{p(x_1(i), x_2(j))}{p(x_1(i))p(x_2(j))} \tag{51}$$

where $p(x_1(i),x_2(j))$ is equal to the number of points in a particular bin over the total number of points in the grid, $p(x_1(i))$ is equal to the number of points in a column over the total number of points and $p(x_2(j))$ is equal to the number of data points in a row over the total number of data points in the grid and n is equal to the number of rows and M is equal to the number of columns. Therefore, it can be seen that if the data was equally distributed around the grid, the value of MI would be equal to zero. As the strength of the relationship increases as a function of the delay value, then it would be noted that the points tend to come together in a strong relationship, and the value of MI increases. The delay $d_j$ having the strongest relationship will therefore be selected as the proper delay for that given $u_i(t)$.

Figure 26:
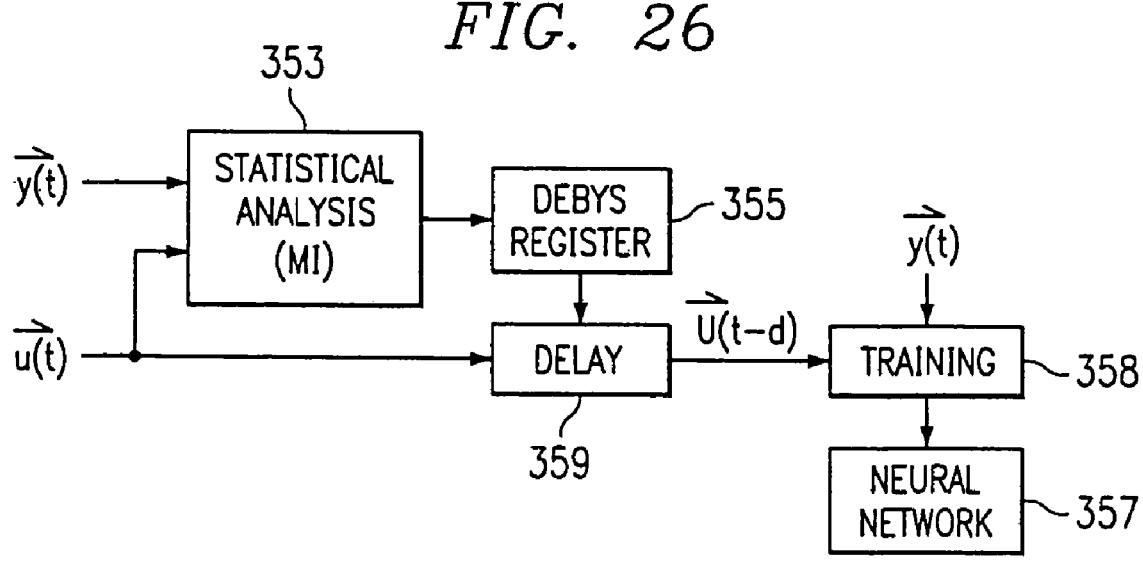
FIG. 26 illustrates a block diagram of a training method wherein delay is determined by statistical analysis.

Referring now to FIG. 26, there is illustrated a block diagram depicting the use of the statistical analysis approach. The statistical analysis is defined in a block 353 which receive both the values of y(t) and u(t). This statistical analysis is utilized to select for each $u_i(t)$ the appropriate delay $d_j$. This, of course, is for each y(t). The output of this is stored in a delay register 355. During training of a non-linear neural network 357, a delay block 359 is provided for selecting from the data set of u(t) for given $u_i(t)$ an appropriate delay and introducing that delay into the value before inputting it to a training block 358 for training the neural network 357. The training block 358 also utilizes the data set for y(t) as target data. Again, the particular delay for the purpose of training is defined by statistical analysis block 353, in accordance with the algorithms described hereinabove.

Figure 27:
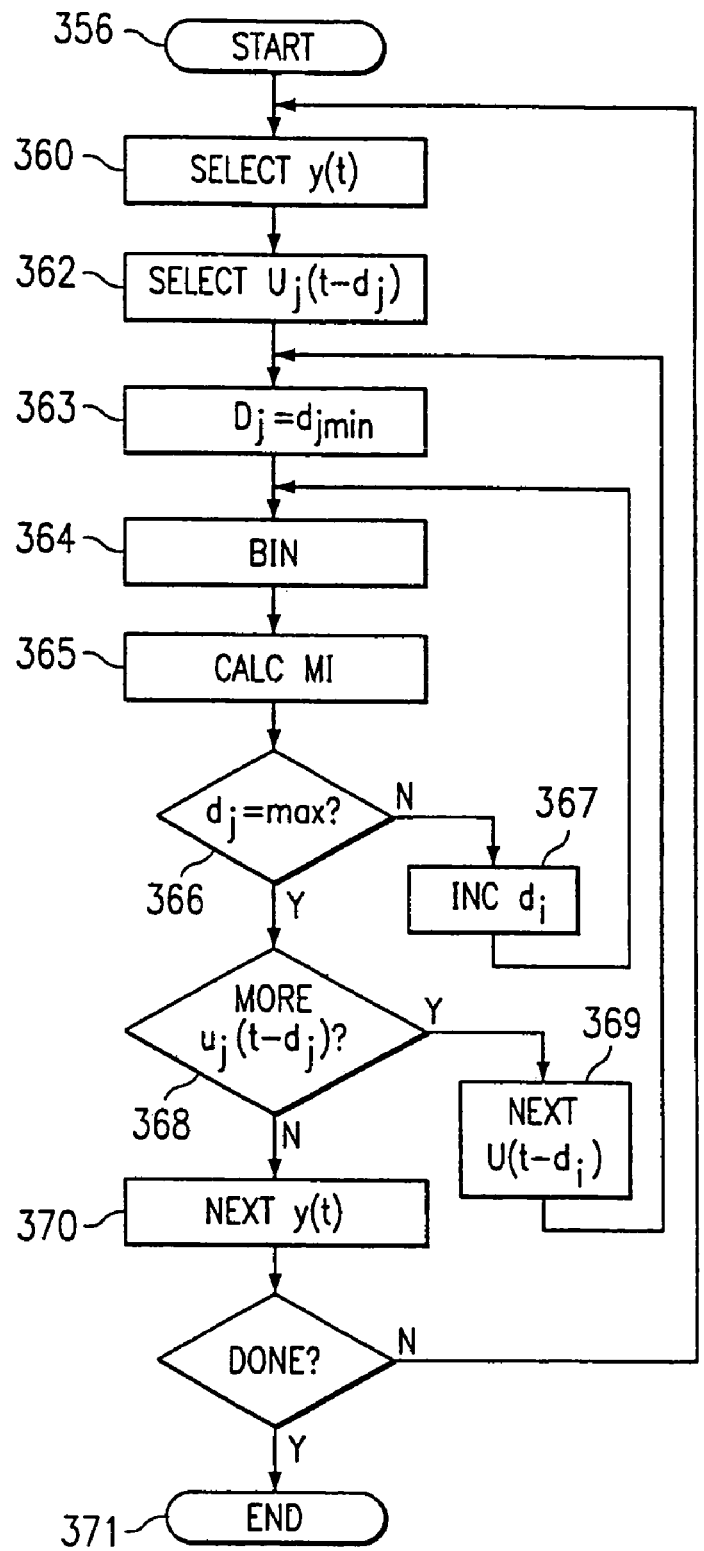
FIG. 27 illustrates a flow chart of the method for determining delays based upon statistical methods.

Referring now to FIG. 27, there is illustrated a flow chart depicting the binning operation. The procedure is initiated at a block 356 and proceeds to a block 360 to select a given one of the outputs y(t) for a multi-output system and then to a block 362 to select one of the input values $u_i(t-d_j)$. It then flows to a function block 363 to set the value of $d_j$ to the minimum value and then to a block 364 to perform the binning operation wherein all the points for that particular delay $d_j$ are placed onto the grid. The MI value is then calculated for this grid, as indicated by a block 365. The program then proceeds to a decision block 366 to determine if the value of $d_j$ is equal to the maximum value $d_{j,max}$. If not, this value is incremented by a block 367 and then proceeds back to the input of block 364 to increment the next delay value for $u_i(t-d_j)$. This continues until the delay has varied from $d_{j,min}$ through $d_{j,max}$. The program then flows to the decision block 368 to determine if there are additional input variables. If so, the program flows to a block 369 to select the next variable and then back to the input of block 363. If not, the program flows to a block 370 to select the next value of y(t). This will then flow back to the input of function block 360 until all input variables and output variables have been processed. The program will then flow to an END block 371.

Automatic Selection of Best Input Variable

It often occurs that many more input variables are available to the modeler than are necessary or sufficient to create a neural network model that is as good or better than a model created using all of the available input variables. In this case, it is desirable to have a method to assist the modeler to identify the best relatively small subset of the set of available input variables that would enable the creation of a model whose quality is as good or better than (1) a model that uses the entire set of available input variables, and (2) a model that uses any other relatively small subset of the available input variables. That is, we want an algorithm to assist the modeler in determining the best, hopefully relatively small, set of input variables, from the total set of input variables available (recognizing that in some cases the total set of available input variables may be the best set of input variables).

The criterion for choosing the "best" set of input variables therefore involves a tradeoff between having fewer variables, and hence a smaller, more manageable model, and increasing the number of input variables but achieving diminishing returns in terms of model quality in the process.

The method utilizes the mutual information, as described hereinabove, to determine the best time delays between input and output variables prior to training a neural network model. As described, for each pair of input-output variables, a mutual information value is obtained for each time delay increment between a minimum and maximum time delay specified by the modeler. For a given input-output pair, the maximum mutual information value across all of the time delays examined is chosen as the best time delay.

Figure 27A:
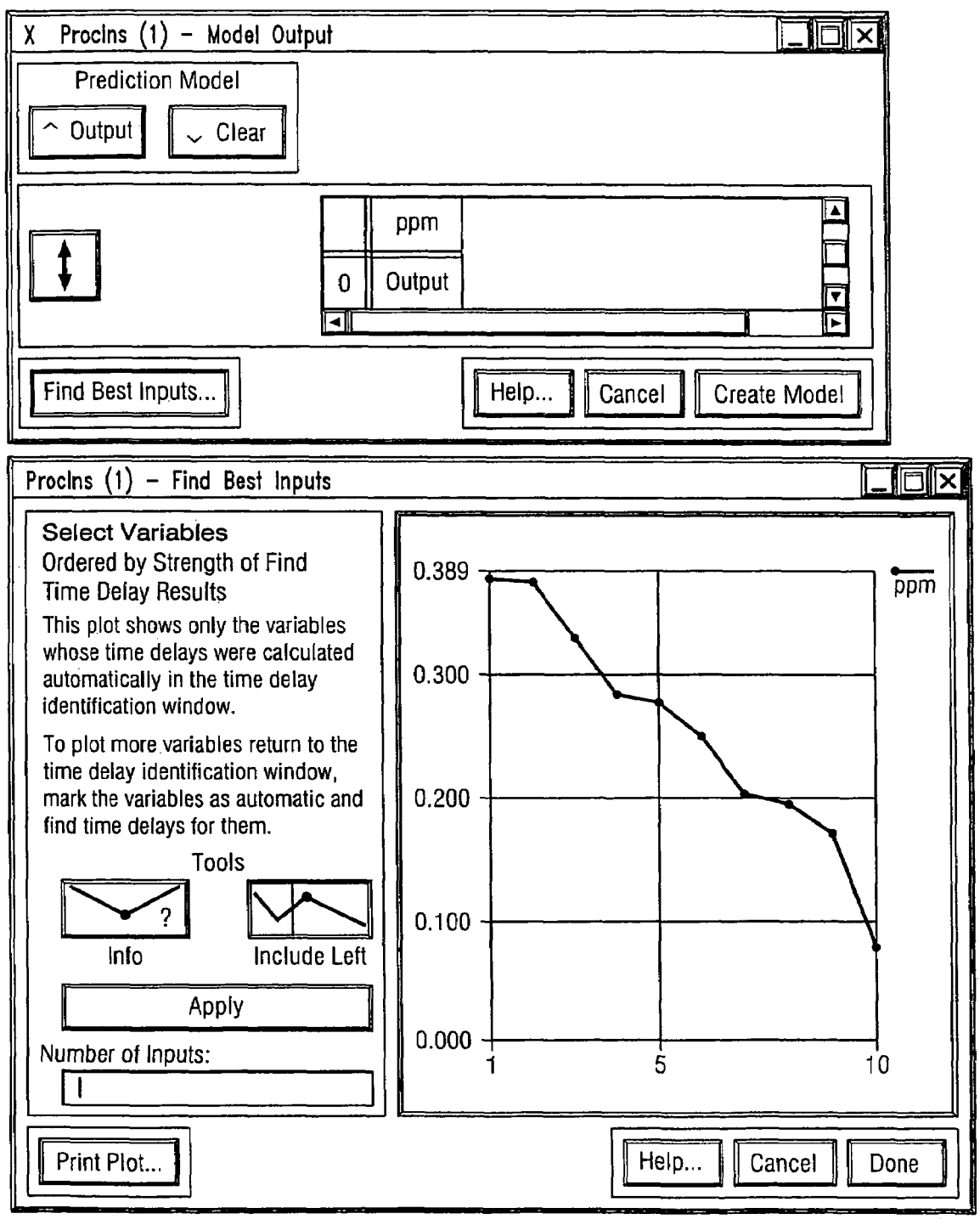
FIGS. 27a–27c illustrate plots of the best input variable selection process.

Thus, each pair of input-output variables has an associated maximum mutual information value. To assist the user in identifying the best set of input variables for a given output variable, the maximum mutual information values for all available input variables (corresponding to that output variable) are plotted in sequence of decreasing maximum mutual information values as shown in FIG. 27a. In the plot, the maximum mutual information values for the ten total available input variables are shown on the vertical axis, and the input variable number ranked by decreasing maximum mutual information value is shown on the horizontal axis. The user may identify the name of the variable by selecting the "Info" Tool, and clicking the mouse on any of the points in the plot, each of which represents one available input variable.

Figure 27B:
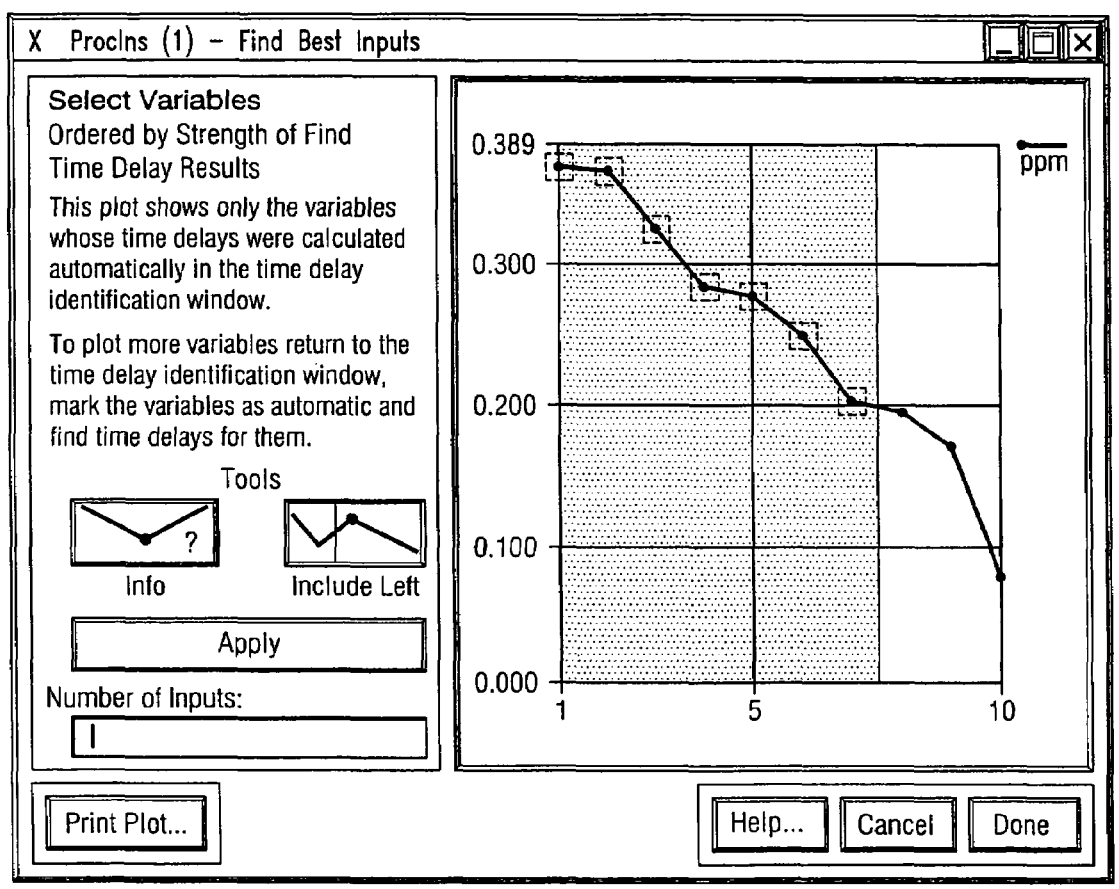

As shown in the plot of FIG. 27b, the modeler can then make their own determination regarding the above-mentioned trade-off regarding the number of input variables versus the amount of additional information delivered to the model. By selecting the "Include Left"Tool, the user can click anywhere on the plot to indicate how many of the left-most variables are to be included as inputs to the model. The left-most variables are those having the highest mutual information in association with the output variable indicated at the top right corner of the plot—""ppm" in this case. The plot is displayable for each output in the model. In the plot shown, the modeler has chosen to select seven of the ten possible input variables for the model.

Figure 27C:
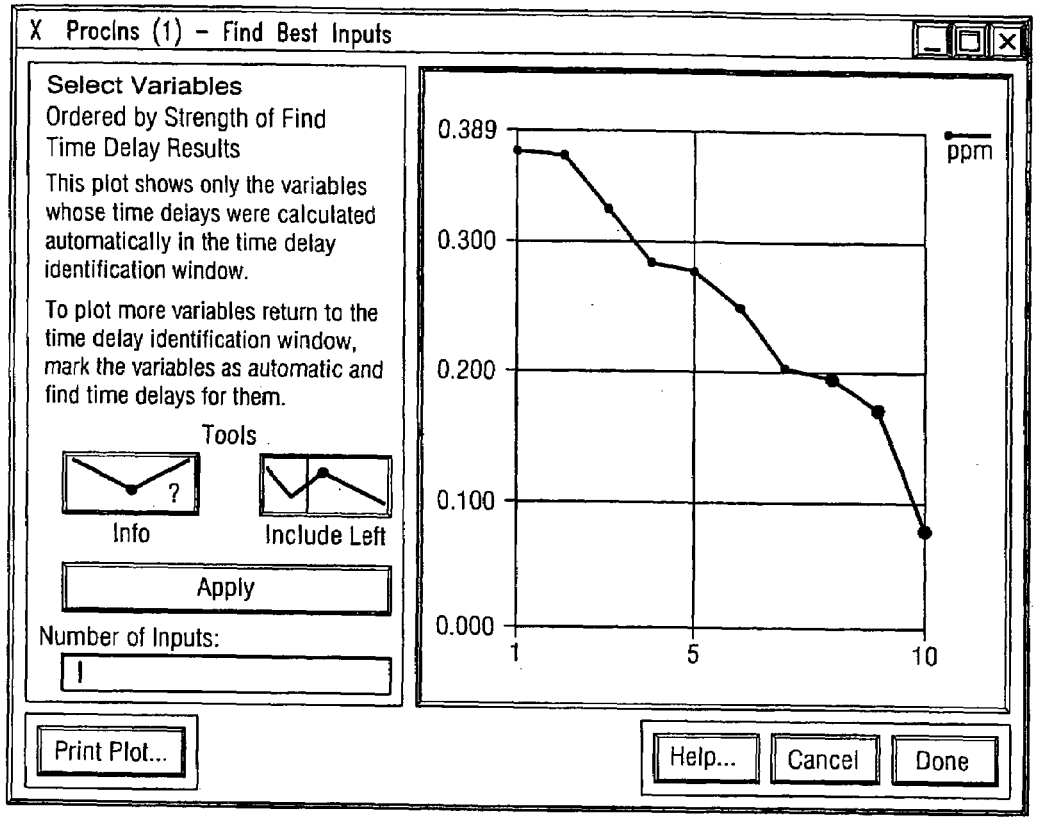

FIG. 27c illustrates the appearance of the screen after the user clicks the "Apply" button: the rejected three right-most variable are shown with larger dots than the seven retained variables.

Identification of Steady-State Models Using Gain Constraints:

In most processes, bounds upon the steady-state gain are known either from the first principles or from practical experience. Once it is assumed that the gain information is known, a method for utilizing this knowledge of empirically-based models will be described herein. If one considers a parameterized quasi-steady-state model of the form:

$$\vec{y}(t) = \vec{N}(\vec{w}, \vec{u}(t-d)) \tag{52}$$

where w is a vector of free parameters (typically referred to as the weights of a neural network) and N(w,u(t−d)) represents a continuous function of both w and u(t−d). A feedforward neural network as described hereinabove represents an example of the nonlinear function. A common technique for identifying the free parameters w is to establish some type of cost function and then minimize this cost function using a variety of different optimization techniques, including such techniques as steepest descent or conjugate gradients. As an example, during training of feedforward neural networks utilizing a backpropagation algorithm, it is common to minimize the mean squared error over a training set, $$J(\vec{w}) = \sum_{t=1}^{P} (\vec{y}(t) - \vec{y}_d(t))^2 \tag{53}$$

where P is the number of training patterns, $y^d(t)$ is the training data or target data, y(t) is the predicted output and J(w) is the error.

Constraints upon the gains of steady-state models may be taken into account in determining w by modifying the optimization problem. As noted above, w is determined by establishing a cost function and then utilizing an optimization technique to minimize the cost function. Gain constraints may be introduced into the problem by specifying them as part of the optimization problem. Thus, the optimization problem may be reformulated as:

$$\min(J(\vec{w})) \tag{54}$$

subject to $$G_l(\vec{u}(1)) < G(\vec{u}(1)) < G_h(\vec{u}(1)) \tag{55}$$

$$G_l(\vec{u}(2)) < G(\vec{u}(2)) < G_h(\vec{u}(2)) \tag{56}$$

$$\ldots \tag{57}$$

$$G_l(\vec{u}(P)) < G(u(P)) < G_h(\vec{u}(P)) \tag{58}$$

where $G_l(u(t))$ is the matrix of the user-specified lower gain constraints and $G_h(u(t))$ are the upper gain constraints. Each of the gain constraints represents the enforcement of a lower and upper gain on a single one of the input-output pairs of the training set, i.e., the gain is bounded for each input-output pair and can have a different value. These are what are referred to as "hard constraints." This optimization problem may be solved utilizing a non-linear programming technique.

Another approach to adding the constraints to the optimization problem is to modify the cost function, i.e., utilize some type of soft constraints. For example, the squared error cost function of Equation 53 may be modified to account for the gain constraints in the gain as follows:

$$J(w) = \sum_{t=1}^{P} (\vec{y}(t) - \vec{y}_d(t))^2 + \tag{59}$$

-continued $$\lambda \sum_{t=1}^{P} (H(G_l(\vec{u}(t)) - G(\vec{u}(t))) + H(G(\vec{u}(t)) - G_h(\vec{u}(t))))$$

where H(·) represents a non-negative penalty function for violating the constraints and λ is a user-specified parameter for weighting the penalty. For large values of λ, the resulting model will observe the constraints upon the gain. In addition, extra data points which are utilized only in the second part of the cost function may be added to the historical data set to effectively fill voids in the input space. By adding these additional points, proper gain extrapolation or interpolation can be guaranteed. In the preferred embodiment, the gain constraints are held constant over the entire input space.

By modifying the optimization problem with the gain constraints, models that observe gain constraints can be effectively trained. By guaranteeing the proper gain, users will have greater confidence that an optimization and control system based upon such a model will work properly under all conditions.

One prior art example of guaranteeing global positive or negative gain (monotonicity) in a neural network is described in J. Sill & Y. S. Abu-Mostafa, "Monotonicity Hints," Neural Information Processing Systems, 1996. The technique disclosed in this reference relies on adding an additional term to the cost function. However, this approach can only be utilized to bound the gain to be globally positive or negative and is not used to globally bound the range of the gain, nor is it utilized to locally bound the gain (depending on the value of u(t)).

To further elaborate on the problem addressed with gain constraint training, consider the following. Neural networks and other empirical modeling techniques are generally intended for situations where no physical (first-principles) models are available. However, in many instances, partial knowledge about physical models may be known, as described hereinabove Because empirical and physical modeling methods have largely complementary sets of advantages and disadvantages (e.g., physical models generally are more difficult to construct but extrapolate better than neural network models), the ability to incorporate available a priori knowledge into neural network models can capture advantages from both modeling methods.

The nature of partial prior knowledge varies by application. For example, in the continuous process industries such as refining or chemical manufacturing, operators and process engineers usually know, from physical understanding or experience, a great deal about their processes, including: (1) input-output casualty relations; this knowledge is easily modeled via network connectivity, (2) input-output nonlinear/linear relations; this knowledge is easily modeled via network architecture, and (3) approximate bounds on some or all of the gains. This knowledge can be modeled by adding constraints of the form $$\min_{ki} \leq \frac{\partial y_k}{\partial x_i} \leq \max_{ki} \quad (60)$$

to the training algorithm, where $y_k$ is the $k^{th}$ output, $x_i$ is the $i^{th}$ input, and $\min_{ki}$ and $\max_{ki}$ are constants. Note that a non-zero $\max_{ki}$-$\min_{ki}$ range allows for nonlinear input-output relationships. By using gain-constrained models, superior performance is achieved both when calculating predictions and when calculating gains.

When calculating predictions, extrapolation (generalization) accuracy can be improved by augmenting gain-constrained training with extrapolation training, in which the gain constraints alone are imposed outside of the regions populated by training data.

Figure 27D:
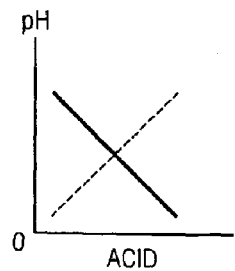
FIG. 27d illustrates a scatterplot of dots that represent data of pH versus acid for a stirred-tank reactor.

When calculating gains, accuracy is necessary for optimization, control, and other uses. Correlated inputs (substantial cross-correlations among the time series of the input variables), and "weak" (inaccurate, incomplete, or closed-loop) data are both very common in real applications, and frequently cause incorrect gains in neural network models. When inputs are correlated, many different sets of gains can yield equivalent data-fitting quality (the gain solution is under-specified). Constraining the gains breaks this symmetry by specifying which set of gains is known a priori to be correct (the gain solution is fully-specified). Such gain constraints are consistent by definition with the data, and therefore do not affect the data-fitting quality. In the case of "weak" data, on the other hand, gain constraints are imposed to purposefully override, or contradict, the data. A simple process industries example of this case is illustrated in FIG. 27d, and a simple generic example is given in (Sill and Abu-Mostafa 1977). Such gain constraints are not consistent with the data, and therefore typically increase the data-fitting error.

In FIG. 27d, dots represent scatterplot data of pH versus acid for a stirred-tank reactor, where the flowrate of base into the tank is constant, and the pH is closed-loop controlled to a constant setpoint value by adjusting the flowrate of acid into the tank. (The plot represents a small, linear region of operation.) Whenever the pH rises, the controller increases the acid inflow in order to lower the pH, and vice versa, creating data with a positive pH-acid correlation, as shown, i.e., the data pH-to-acid gain is positive. The correct physical relationship, given by the solid line, has a negative pH-to-acid gain, which completely contradicts the data.

Merging prior knowledge with neural networks has been addressed before in the literature, (Sill and Abu-Mostafa 1997), which provides a broad framework focusing on input-output relations rather than gains. All previous work formulates the problem in terms of equality bounds (point gain targets), although the formulation of (Lampinen and Selonen 1995) can in effect achieve interval targets by means of an associated certainty coefficient function.

Figure 27H:
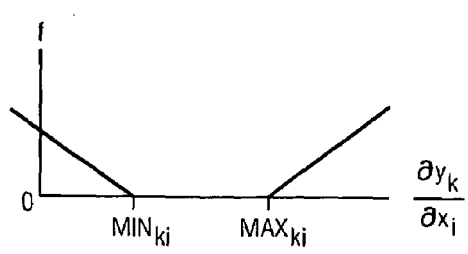
FIG. 27h illustrates a plot of gain constraints.
Figure 27E:
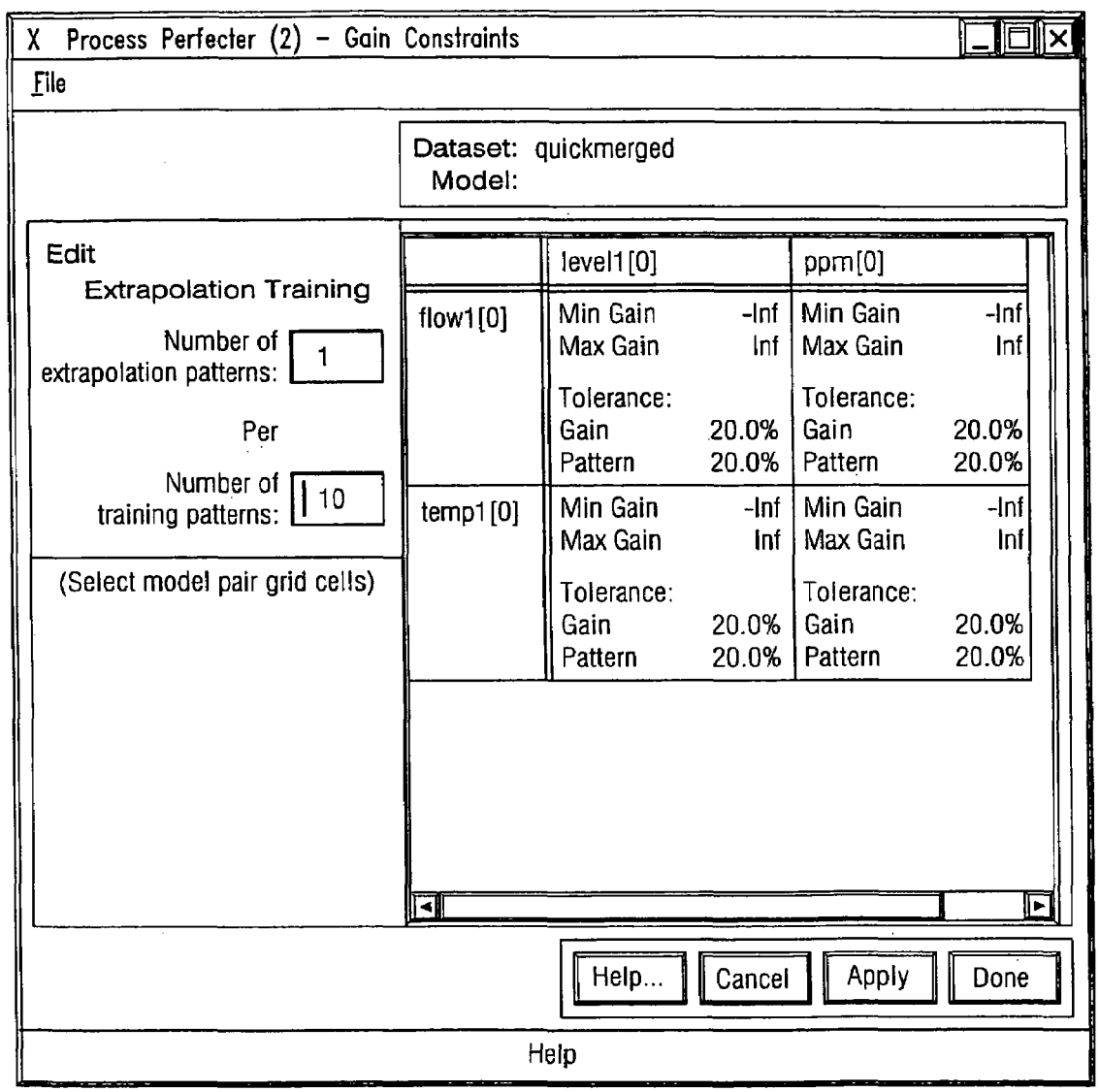
FIG. 27e illustrates a screen that allows the modeler to specify, for each pair of input-output variables, gain constraints.

FIG. 27e illustrates a screen that allows the modeler to specify, for each pair of input-output variables, gain constraints (min and max bounds), and a pair of tolerance parameters. (In addition, the ratio of extrapolation datapoints (patterns) per training datapoints (patterns) is specifiable.)

Figure 27F:
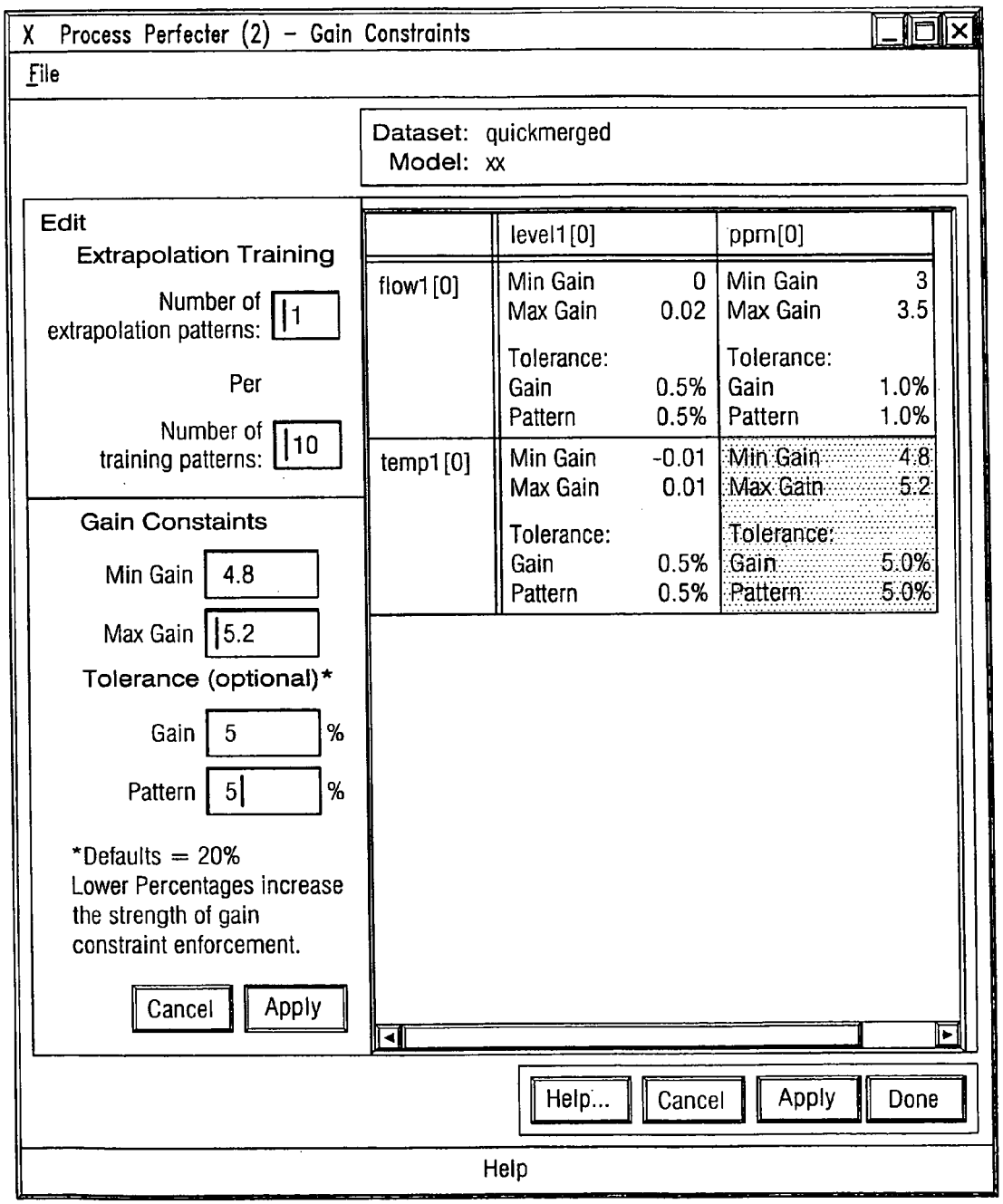
FIG. 27f illustrates a screen wherein the modeler can select input-output cells.

As illustrated in FIG. 27f, the modeler can select a (or any number of) input-output cells, and become able to specify the "Gain Constraints" and "Tolerance (optional)*" values for the cell(s) selected. The Min Gain and Max Gain are the bounds within which the modeler wishes the gain to lie when the model has completed training. It is allowable for the Min Gain value to take its (default) value of -Inf (-infinity), and/or the Max Gain value to take its (default) value of +Inf (+infinity). This is common when the intended bounds are simply positive or negative—that gain should be of a given sign. The Tolerance Gain parameter extends the specified (Min Gain, Max Gain) interval by the specified percentage for the purposes of term balancing only. While the gain constraints have priority over the data in the case that they are in conflict, both Tolerance parameters give the modeler a way to affect how strongly the constraints override the data in the case of conflict (lower values mean strong overriding). The Tolerances allow the model to not be distorted by attempting to bring the gain of every single datapoint strictly within the specified range; datapoints that represent gain "outliers" can badly distort a model or even prevent it from converging if undue and unnecessary attention is given to it. It is usually not necessary to change the Tolerance parameters from their default values of 20%; the default values perfectly achieve the desired results in almost all cases.

Figure 27G:
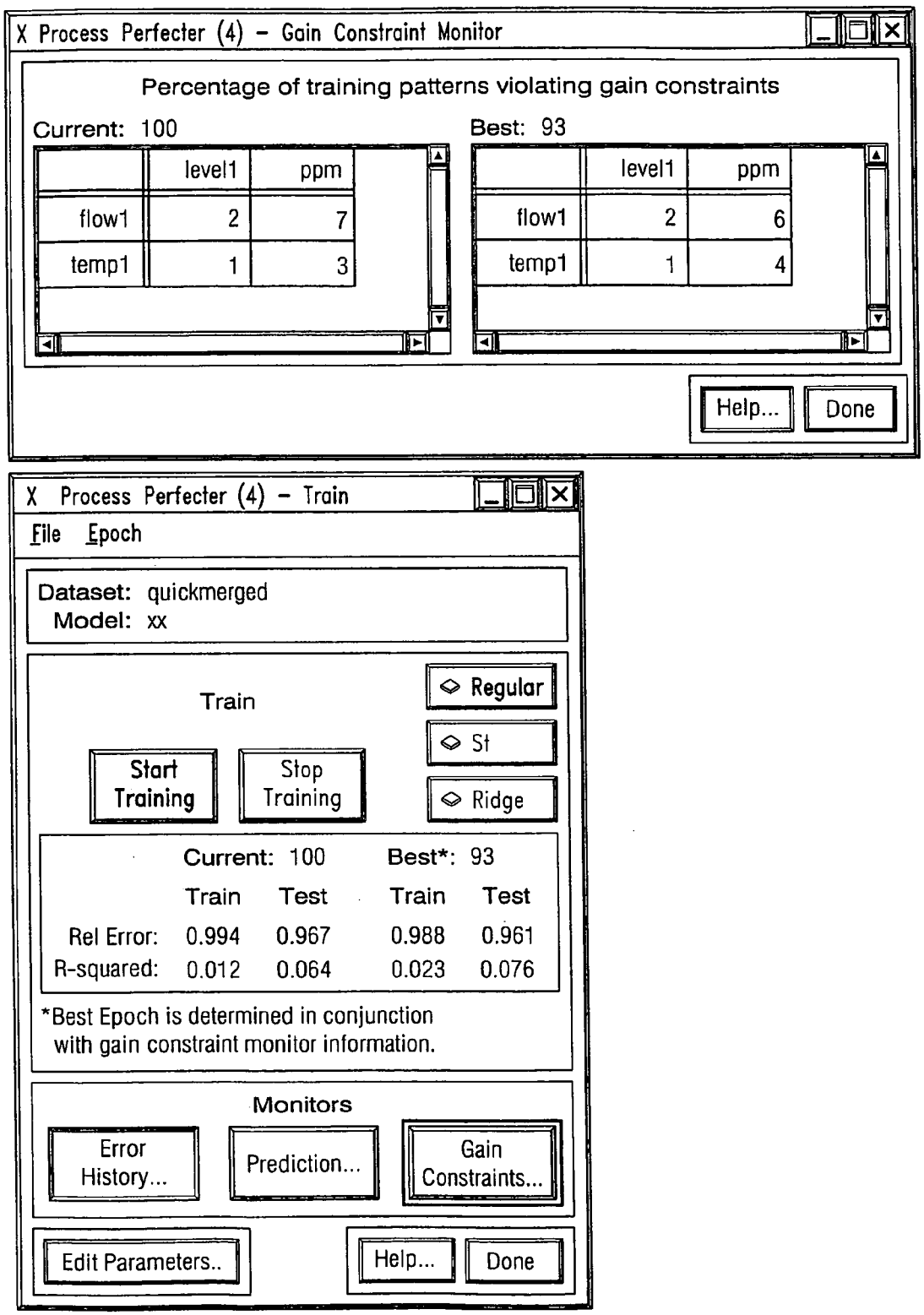
FIG. 27g illustrates the Gain Constraints Monitor viewable during and after training a gain-constrained model.

FIG. 27g illustrates the Gain Constraints Monitor viewable during and after training a gain-constrained model. As shown, the values in the Monitor indicate the percentage of the training datapoints (patterns) that violate the (Min Gain, Max Gain) interval; in the case shown, all values are well below the 20% Tolerance Pattern parameter value actually used to train the model. This information is analogous to the data-fitting error (Rel Error and R-squared, as shown in the "Train" screen also in FIG. 27g), but for gain constraints instead of data. It indicates the degree of conformance to "fitting the gains." As with poor data-fitting results, any number of remedies are available to the modeler if poor gain constraint conformance occurs; the methods employed depend heavily on the particulars of the data and the process being modeled.

The Objective Function

A neural network with outputs $y_k$ and inputs $x_i$ is trained subject to the set of constraints in equation 60. The objective function to be minimized in training is $$E = E^D + E^C \quad (61)$$

where $E^D$ is the data-fitting error, and $E^C$ is a penalty for violating the constraints. Weighting factors for $E^D$ and $E^C$ are introduced later in the form of learning rates (section 2.4). We use the standard sum of squares for $E^D$ $$E^D = \sum_k^{N_{out}} E_k^D = \sum_p^{N_{trp}} \sum_k^{N_{out}} (t_k^p - y_k^p)^2 \quad (62)$$

where p is the pattern index $t_k^p$ is the target for output $y_k^p$, $N_{out}$ is the number of output units, and $N_{trp}$ is the number of training patterns. Although we assume equation 62 throughout, the algorithm has no inherent restrictions to this form for $E^D$.

$E^C$ is written as:

$$E^C = \sum_k^{N_{out}} \sum_i^{N_{inp}} E_{ki}^C = \sum_p^{N_{trp}} \sum_k^{N_{out}} \sum_i^{N_{inp}} f\left(\frac{\partial y_k^p}{\partial x_i^p}\right) \quad (63)$$

where $N_{inp}$ is the number of input units and $f$ measures the degree to which $\partial y_k^p / \partial x_i^p$ violates its constraints, this illustrated in FIG. 27h.

The Penalty Function

For discussion purposes, n the following, the pattern index p is suppressed for clarity. The penalty function $f$ is defined as follows:

$$f\left(\frac{\partial y_k}{\partial x_i}\right) \equiv f_{ki} = \begin{cases} \frac{\partial y_k}{\partial x_i} - \max_{ki} & \text{if } \frac{\partial y_k}{\partial x_i} > \max_{ki} \quad \text{(max is violated)} \\ \min_{ki} - \frac{\partial y_k}{\partial x_i} & \text{if } \frac{\partial y_k}{\partial x_i} < \min_{ki} \quad \text{(min is violated)} \\ 0 & \text{else} \quad \text{(no violation)} \end{cases} \quad (64)$$

and its derivative as:

$$f_{ki}' = \begin{cases} +1 & \text{if } \frac{\partial y_k}{\partial x_i} > \max_{ki} \quad \text{(max is violated)} \\ -1 & \text{if } \frac{\partial y_k}{\partial x_i} < \min_{ki} \quad \text{(min is violated)} \\ 0 & \text{else} \quad \text{(no violation)} \end{cases} \quad (65)$$

The function $f$ is shown in FIG. 27h (such shapes are widely used in penalty functions). No improvement in solution quality resulted from using an everywhere smooth (and more time consuming) approximation of equation 64.

Gradient Descent Training

From equations 62, 63, 65, and the chain rule, the gradient descent update equation for a single pattern is given by:

$$\Delta w = -\sum_k^{N_{out}} \eta_k \frac{\partial}{\partial w}(t_k - y_k)^2 - \sum_k^{N_{out}} \sum_i^{N_{inp}} \lambda_{ki} f_{ki}' \frac{\partial}{\partial w}\left(\frac{\partial y_k}{\partial x_i}\right) \quad (66)$$

where w denotes and arbitrary weight or bias, $\eta_k$ is the learning rate for $E_k^D$, and $\lambda_{ki}$ is the learning rate for $E_{ki}^D$. Expressions for the second derivatives $\partial/\partial w(\partial y_k/\partial x_i)$ are given in the Appendix. The weights and biases are updated after M patterns (M a parameter) according to:

$$w(T) = \Delta w(T) + \mu \Delta w(T-1) \quad (67)$$

where T is the weight update index and $\mu$ is the momentum coefficient.

An alternative to this gradient descent formulation would be to train using a constrained nonlinear programming (NLP) method (e.g. SQP or GRG) instead because (1) commercial NLP codes use Hessian information (either exact or approximate), and experience shows that any such explicitly higher-order training method tends towards overfitting in a way that is difficult to control in a problem-independent manner, and (2) the methods described hereinbelow constitute "changes to the problem" for NLPs, which would interfere with their Hessian calculation procedures.

Extrapolation Training

Some degree of improved model extrapolation may be expected from gain-constrained training solely from enforcing correct gains at the boundaries of the training data set. However, extrapolation training explicitly improves extrapolation accuracy by shaping the response surface outside the training regions. Extrapolation training applies the gain constraint penalty terms alone to the network for patterns artificially generated anywhere in the entire input space, whether or not training patterns exist there. An extrapolation pattern consists of an input vector only—no output target is needed, as the penalty terms do not involve output target values. The number of extrapolation patterns to be included in each training epoch is an adjustable parameter. Extrapolation input vectors are generated at random from a uniform distribution covering all areas of the input space over which the constraints are assumed to be valid.

Training Procedure Summary

The training algorithm proceeds as follows:
1. Backpropagation is performed on $E^D$, and the $\Delta w$'s in equation 66 are incremented with the first term contributions.
2. A backward pass for each $y^k$ is performed to compute $\partial_{y_k}/\partial x_i$. This is done by clearing the propagation error $\delta$'s for all units, setting $\delta_{y_k} = y_k'$, and backpropagating to the inputs, which yields $\delta x_i = \partial_{y_k}/\partial x_i$. This follows easily from the definition of $\delta$ and this technique has long been known to practitioners.
3. Quantities computed immediate preceding step 2 are used to evaluate the $\partial/\partial w(\partial y_k/\partial x_i)$ expressions given in the Appendix, and the $\Delta w$'s in equation 66 are incremented withe the second term contributions.
4. The weights are updated after every M patterns ($1 \leq M \leq ?$) according to equation 67.

For an extrapolation pattern, step 1 is omitted and step 2 is preceded by a forward pass.

Dynamic Balancing of Objective Function Terms

If the constraints do not conflict with the data, balancing the relative strengths (learning rates) of the data and penalty terms in the objective function is relatively straightforward. If the constraints conflict with the data, however, a robust method for term balancing may be required.

While the constraints have priority over data in case of conflict, insisting that all constraint violations be zero is ordinarily neither necessary not conducive to obtaining good models (models of practical value) in real applications. Typically, it is not desirable to drive 'constant outliers" of negligible practical consequence into absolute conformance at the expense of significantly worsening the data fit.

Instead, the method of the present disclosure allows, for each constraint, a specified fraction of training patterns (typically 10–20%) to violate the constraint to any degree, before deeming the constraint to be in violation. The violating patterns may be different for each constraint, and the violating patterns for each constraint may be chosen from the entire training set. The resulting combinatorics allows the network enormous degrees of freedom to achieve maximum data-fitting while satisfying the constraints.

Dynamic term balancing proceeds as follows. The initial values of the $\eta_k$ are set to a standard value. For each output, the initial values for the $\lambda_{ki}$ are computed before training begins such that the average first level derivatives of the data term (for that output) is approximately equal to the first level derivative of the sum of the constraint terms (for that output). The learning rates $\eta_k$ and $\lambda_{ki}$ and then adjusted after each epoch according to the current state of the training process.

A wide variety of situations are possible in gain constrained training, such as: constraints may be consistent or inconsistent with the data; constraints may be violated at the outset of training or only much later after the gains have grown in magnitude; the constraints may be mis-specified and cannot be achieved at all; and so on. Hence, a variety of rules for adjusting the learning rates are necessary.

To adjust $\eta_k$ and $\lambda_{ki}$ after each epoch, we use an extension of the rapid/slow $\eta_k$ dynamics described in for training backpropnets, where $\eta_k$ is slowly (additively) increased if the error is decreasing and is rapidly (multiplicatively) decreased if the error is increasing. In the following, a "large" change indicates a multiplicative change and a "small" change indicates an additive change.

The fundamental goal that the constraints should override the data in case of conflict dictates the following basic scheme. ($\lambda_{ki}$ is of course subject to change only if a constraint for input-output variable pair ki has been specified).

$\lambda_{ki}$:
(a) large increase if constraint ki is not satisfied ("satisfaction" is defined above in this section).
(b) small decrease if constraint$_{ki}$ is satisfied.

$\eta_k$:
(a) large decrease if $E^D$ has worsened (increased).
(b) small decrease if $E^D$ has improved (decreased).

Some exceptions to these rules are required, however, which are presented in correspondence with the above rules.

$\lambda_{ki}$:
(a) no increase is made if $E_{ki}{}^C$ improved, since, given that $E^{kiC}$ is improving, increasing ki would make it unnecessarily harder for $E^D$ to improve.
(b) no decrease is made if all constraints are exactly satisfied ($E^C = 0$). In this case, either (a) the constraints agree with the data, in which case retaining the $\lambda_{ki}$ level will actually speed convergence, or (b) the constraints are such that they require large gains to be violated, and will therefore remain satisfied until later in the training process when the weights have grown sufficiently to produce large gains. In this case, repeatedly decreasing the $\lambda_{ki}$'s early in the training process would result in their being too small to be effective when such constraints become violated.

$\eta_k$:
(a) no decrease is made in two cases: (1) all constraints are satisfied but $E^C$ has increased. Both $E^D$ and $E^C$ are increasing, but the decrease in $\lambda_{ki}$ (due to the constraints being satisfied) might allow $E^D$ to improve without decreasing $\eta_k$. (2) all the constraints are not satisfied, but $E^C$ has improved; this improvement may allow $E^D$ to improve without increasing $\eta_k$.
(b) no increase is made if $E^C$ has increased, in accordance with allowing the constraints to dominate.

Parameter values used in these dynamics depend on the network architecture, but for typical networks are generally in the range of $1.3 * \lambda_{ki}$ and $0.8 * \eta_k$ for multiplicative changes, and $(-)0.03 * \lambda_{ki}$ and $(+)0.02 * \eta_k$ for additive changes. Also, expected statistical fluctuations in training errors are accounted for when deeming whether or not $E^D$, $E^C$ or $E_{ki}{}^C$ have increased.

Left and Right Gain Constraints

However, a limitation with the above described gain constraint method is that the gain constraints must be specified with the same min$_{ki}$ and max$_{ki}$ constants, for all input data points. In a further embodiment, the method would be to allow the user to specify different gain constraint bounds depending on where the input lies in the input space. However, when there are even just a few input variables, specifying many values of constraint bounds for each of the input variables becomes combinatorially explosive.

For a simple example, the user is unable with the above described method to specify, for instance, one set of gain bounds at the minimum value of $x_1$ and another set of gain bounds at the maximum value of $x_1$. If the user were able to specify this information, the user could, for instance, specify a positive gain at the minimum value of $x_1$, and a negative gain at the maximum value of $x_1$.

Given such a specification, the network could be visualized as creating an input-output relationship that would resemble a parabola with the peak pointing upwards. However, because a neural network has many degrees of freedom, the input-output relationship formed may contain a few to several "humps" (changes of the sign of the gain) between the minimum and the maximum of $x_1$.

In modeling the process industries, it has been observed that a single change in the sign of an input-output gain suffices to model the overwhelming majority of processes. To accommodate for this with gain constraints, a simplified model is provided that limits the number of changes in the sign of the gain to one change. In conjunction with this model, we allow the specification of "left" (minimum) and "right" (maximum) gain bounds.

The simplified model, which limits the number changes in the sign of the gain to one change, is given as follows:

$x_i$ denotes an arbitrary input variable, indexed by i. y denotes the output of the model (multiple outputs are treated as separate models).

The model is given by:

$$y = b + \sum_i^N (m_i x_i + g_i f(u_i)) \quad (68)$$

where N is the number of inputs $x_i$, $u_i$ is an intermediate "convenience" variable, given by $$u_i = \frac{x_i - x_i^a - \frac{1}{2}(x_i^b - x_i^a)}{\frac{1}{4}(x_i^b - x_i^a)} \quad (69)$$

the function $f(u_i)$ is given by $$f = \ln \frac{1}{1 + e^{u_i}} \quad (70)$$

and the regression parameters are b, $x_i^a$, $x_i^b$, $m_i$, and $g_i$.

The function y is a model which has at most one change in the sign of $\partial y/\partial_i$, for any $x_i$ (at most one "bend" in the function), and can be straight (no bends). The bends occur at $x_a$ (on the left) and at $x_b$ (on the right). The "ends" of the function have constant slopes at plus and minus infinity.

As described hereinabove, because neural networks have many available parameters, overfitting (overtraining) is an issue, and using NLP's (optimizers) to perform the regression optimization was avoided. The other reason NLP's were avoided was to allow extrapolation training. With the above simplified model, on the other hand, neither of these issues are relevant—overfitting cannot occur due to the limited number of parameters in the model, and extrapolation training is not an issue since the gains of the model may be specified by the user at the minimum and maximum values of each input, thereby specifying what shape the model should take in all regions of input space.

Therefore, the method of choice is to use an NLP to perform the constrained regression in the case of this simplified model. The objective function is in this case simply given by the Equation:

$$E = \sum_k^{N_{out}} E_k = \sum_p^{N_{trp}} \sum_k^{N_{out}} (t_k^p - y_k^p)^2 \quad (71)$$

where p is the data index, $t_k^p$ is the measures "target" value for output $y_k^p$, $N_{out}$ is the number of output units, and $N_{trp}$ is the number of data points in the set of data used to perform the regression, typically called the "training se."

The constraints in the NLP are the two gain bounds given for each input variable, one at the minimum value and one at the maximum value of each $x_i$.

The gain expression for the gain of y with respect to a given input $x_i$ is given by $$\frac{\partial y}{\partial x_i} = \frac{1}{\frac{1}{4}(x_i^b - x_i^a)}\left(m_i - g_i \frac{1}{1 + e^{u_i}}\right) \quad (72)$$

where, again, $u_i$ is given in terms of xi by equation 69.

Thus, the user specifies as constraints to the NLP, bounds for $\partial x/\partial y_i$, at both the minimum and maximum values of each $x_i$. The derivative is evaluated in each case given the minimum or maximum value of the $x_i$.

Adding Interactions to the Left and Right Gain Constraints

A notable feature of the above model given by equation 68, is that, unlike the neural network model, there are no "interactions" possible—that is, no product of inputs terms possible in the model, such as $x_1 * x_2$. In that process industries, it has been observed that this limitation is of minimal nuisance. However, it is easy to augment this Left and Right Gain Constraints Method to allow specific interactions which the user knows via process knowledge to be of value to the model. For example, then the $gain_{x1} = f(x_2)$ and $gain_{x2} = f(x_1)$ for the term relationship $x_1 * x_2$, such that there is a relationship of the gain of one variable to another.

The user may specify an interaction of any term (non-additive, as additive "interactions" are already present) by simple adding a 'dummy variable," say $x_{n+1}$ to the model, and setting it equal to the desired interaction of the variables of interest as a constraint to the NLP. That is, for example, the model would be augmented as follows:

$$y = b + \sum_i^{N+1} (m_i x_i + g_i f(u_i)) \quad (73)$$

Here, a constraint would be added to the NLP specifying that $$x_{N+1} = x_p x_q \quad (74)$$

for example. The intermediate variable $u_{n+1}$ would then be computed as $$u_{N+1} = \frac{(x_p x_q) - x_{N+1}^a - \frac{1}{2}(x_{N+1}^b - x_{N+1}^a)}{\frac{1}{4}(x_{N+1}^b - x_{N+1}^a)} \quad (75)$$

Identification of SS Model with Dynamic Data

Figure 28:
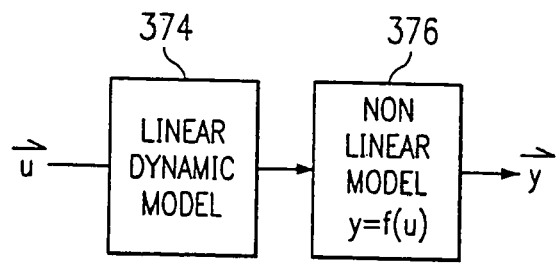
FIG. 28 illustrates a prior art Weiner model.

Referring now to FIG. 28, there is illustrated a block diagram of a prior art Weiner model, described in M. A. Henson and D. F. Seborg, "Nonlinear Process Control," *Prentice Hall PTR*, 1997, Chapter 2, pp 11–110. In the Weiner model, a non-linear model 376 is generated. This non-linear model is a steady-state model. This steady-state model may be trained on input data u(t) to provide the function y(t)=f(u(t)) such that this is a general non-linear model. However, the input u(t) is processed through a linear dynamic model 374 of the system, which linear dynamic model 374 has associated therewith the dynamics of the system. This provides on the output thereof a filtered output ū(t) which has the dynamics of the system impressed thereupon. This constitutes the input to the non-linear model 376 to provide on the output a prediction y(t).

Figure 29:
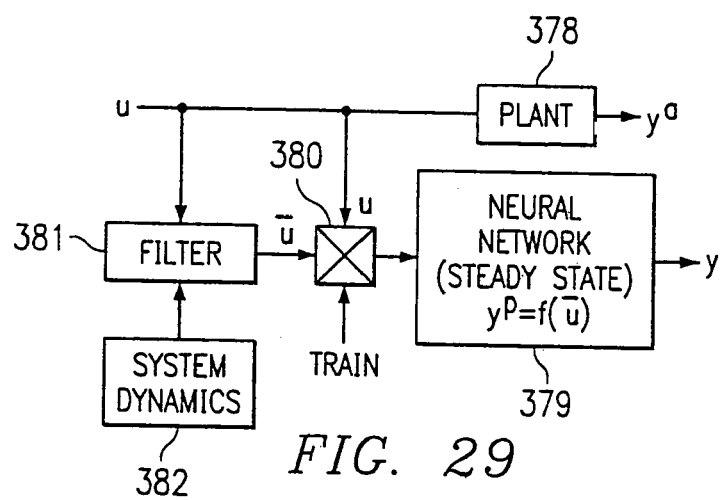
FIG. 29 illustrates a block diagram of a training method utilizing the system dynamics.

Referring now to FIG. 29, there is illustrated a block diagram of the training method of the present embodiment. A plant 378 is provided which can represent any type of system to be modeled, such as a boiler or a chemical process. There are various inputs provided to the plant in the form of u(t). This will provide an actual output $y^a(t)$. Although not illustrated, the plant has a number of measurable state variables which constitute the output of various sensors such as flow meters, temperature sensors, etc. These can provide data that is utilized for various training operations, these state outputs not illustrated, it being understood that the outputs from these devices can be a part of the input training data set.

A steady-state neural network 379 is provided which is a non-linear network that is trained to represent the plant. A neural network typically contains an input layer and an output layer and one or more hidden layers. The hidden layers provide the mapping for the input layers to the output layers and provide storage for the stored representation of the plant. As noted hereinabove, with a sufficient amount of steady-state data, an accurate steady-state model can be obtained. However, in a situation wherein there is very little steady-state data available, the accuracy of a steady-state model with conventional training techniques is questionable. As will be described in more detail hereinbelow, the training method of the present embodiment allows training of the neural network 374, or any other empirical modeling method to learn the steady-state process model from data that has no steady-state behavior, i.e., there is a significant dynamic component to all training data.

Typically, a plant during operation thereof will generate historical data. This historical data is collected and utilized to later train a network. If there is little steady-state behavior exhibited in the input data, the present embodiment allows for training of the steady-state model. The input data u(t) is input to a filter 381 which is operable to impress upon the input data the dynamics of the plant 378 and the training data set. This provides a filtered output $u^f(t)$ which is input to a switch 380 for input to the plant 378. The switch 380 is operable to input the unfiltered input data u(t) during operation of the plant, or the filtered input data $u^f(t)$ during training into the neural network 379. As will be described hereinbelow, the u(t) input data, prior to being filtered, is generated as a separate set of dynamic training data by a step process which comprises collecting step data in a local region. The filter 381 has associated therewith a set of system dynamics in a block 382 which allows the filter 381 to impress the dynamics of the system onto the input training data set. Therefore, during training of the neural network 379, the filtered data ū(t) is utilized to train the network such that the neural network 379 provides an output y(t) which is a function of the filtered data ū(t) or:

$$\bar{y}^p(t)=f(\bar{u}^f(t)) \tag{76}$$

Figure 30:
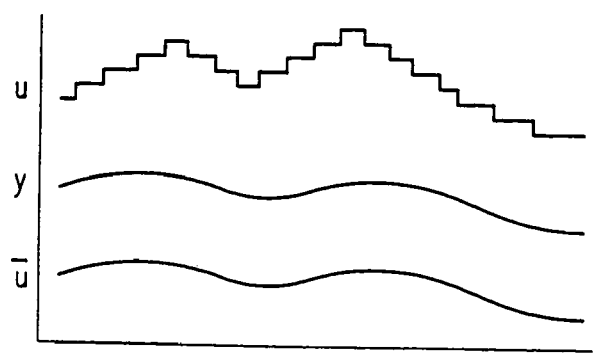
FIG. 30 illustrates plots of input data, actual output data, and the filtered input data which has the plant dynamics impressed thereupon.

Referring now to FIG. 30, there is illustrated a diagrammatic view of the training data and the output data. The training data is the actual set of training data which comprises the historical data. This is the u(t) data which can be seen to vary from point to point. The problem with some input data in a training set of data, if not all data, is that it changes from one point to another and, before the system has "settled," it will change again. That is, the average time between movements in u(t) is smaller than $T_{ss}$, where $T_{ss}$ is the time for y(t) to reach steady-state. As such, the corresponding output data y(t) will constitute dynamic data or will have a large dynamic component associated therewith. In general, the presence of this dynamic information in the output data must be accounted for to successfully remove the dynamic component of the data and retain the steady-state component of the steady-state neural network 379.

As will be described in more detail hereinbelow, the present embodiment utilizes a technique whereby the actual dynamics of the system which are inherent in the output data y(t) are impressed upon the input data u(t) to provide filtered input data ū(t). This data is scaled to have a gain of one, and the steady-state model is then trained upon this filtered data. As will also be described in more detail hereinbelow, the use of this filtered data essentially removes the dynamic component from the data with only the steady-state component remaining. Therefore, a steady-state model can be generated.

Figure 31:
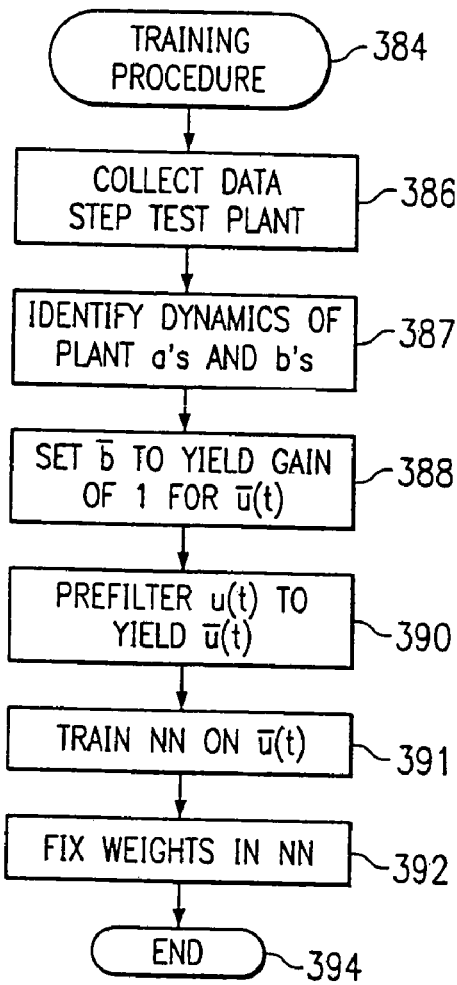
FIG. 31 illustrates a flow chart for the training operation.

Referring now to FIG. 31, there is illustrated a flow chart depicting the training procedure for the neural network 379 of FIG. 29 for a single output. As noted above, the neural network is a conventional neural network comprised of an input layer for receiving a plurality of input vectors, an output layer for providing select predicted outputs, and one or more hidden layers which are operable to map the input layer to the output layer through a stored representation of the plant 378. This is a non-linear network and it is trained utilizing a training data set of input values and target output values. This is, as described hereinabove, an iterative procedure utilizing algorithms such as the backpropagation training technique. Typically, an input value is input to the network during the training procedure, and also target data is provided on the output. The results of processing the input data through the network are compared to the target data, and then an error generated. This error, with the backpropagation technique, is then back propagated through the network from the output to the input to adjust the weights therein, and then the input data then again processed through the network and the output compared with the target data to generate a new error and then the algorithm readjusts the weights until they are reduced to an acceptable level. This can then be used for all of the training data with multiple passes required to minimize the error to an acceptable level, resulting in a trained network that provides therein a stored representation of the plant.

As noted above, one of the disadvantages to conventional training methods is that the network 379 is trained on the set of historical input data that can be incomplete, or have some error associated therewith. The incompleteness of the historical data may result in areas in the input space on which the network is not trained. The network, however, will extrapolate its training data set during the training operation, and actually provide a stored representation within that portion of the input space in which data did not exist. As such, whenever input data is input to the network in an area of the input space in which historical input data did not exist during training, the network will provide a predicted output value. This, however, effectively decreases the confidence level in the result in this region. Of course, whenever input data is input to the network in a region that was heavily populated with input data, the confidence level is relatively high.

Another source of error, as noted hereinabove, is the dynamic component of the data. If the historical data that forms the training data set is dynamic in nature, i.e., it is changing in such a manner that the output never settles down to a steady-state value, this can create some errors when utilizing this data for training. The reason for this is that the fundamental assumption in training a steady-state neural network with an input training data set is that the data is steady-state data. The training procedure of the present embodiment removes this error.

Referring further to FIG. 31, the flow chart is initiated at a block 384 and then proceeds to a block 386 wherein dynamic data for the system is collected. In the preferred embodiment, this is in the form of step test data wherein the input is stepped between an initial value and a final value multiple times and output data taken from the plant under these conditions. This output data will be rich in dynamic content for a local region of the input space. An alternative method is to examine the historical data taken during the operation of the plant and examine the data for movements in the manipulated variables (MVs) or the dynamic variables (DVs). These variables are then utilized for the purpose of identifying the dynamic model. However, the preferred model is to utilize a known input that will result in the dynamic change in the output. Of course, if there are no dynamics present in the output, then this will merely appear as a steady-state value, and the dynamic model will have filter values of a=0 and b=0. This will be described hereinbelow.

The step test data, as will be described hereinbelow, is data that is taken about a relatively small region of the input space. This is due to the fact that the variables are only manipulated between two values, and initial steady-state value and a final value, in a certain region of the input space, and the data is not taken over many areas of the input space. Therefore, any training set generated will represent only a small portion of the input space. This will be described in more detail hereinbelow. It should be noted that these dynamics in this relatively small region of the input space will be utilized to represent the dynamics over the entire input space. A fundamental presumption is that the dynamics at any given region remain substantially constant over the entire input space with the exception of the dynamic gain varying.

Once the dynamic data has been collected for the purpose of training, this dynamic training data set is utilized to identify the dynamic model of the system. If, of course, a complete steady-state data set were available, there would be a reduced need for the present embodiment, although it could be utilized for the purpose of identifying the dynamics of the system. The flow chart then proceeds to a block 387 wherein the dynamics of the plant are identified. In essence, a conventional model identification technique is utilized which models the dynamics of the plant. This is a linear model which is defined by the following equation:

$$y(t)=-a_1 y(t-1)-a_2(t-2)+b_1 u(t)+b_2 u(t-1) \tag{77}$$

In the above-noted model of Equation 77, the values of $a_1$, $a_2$, $b_1$ and $b_2$ define the parameters of the model and are defined by training this model. This operation will be described in detail hereinbelow; however, once trained, this model will define the dynamic model of the plant 378 as defined by the dynamics associated with the dynamic training data set at the location in the input space at which the data was taken. This will, of course, have associated therewith a dynamic gain, which dynamic gain will change at different areas in the input space.

Once the dynamic model has been identified utilizing the dynamic training data set, i.e., the a's and b's of the model have been determined, the program will flow to a function block 388 to determine the properties of a dynamic pre-filter model, which is operable to process the input values u(t) through the dynamic model to provide a filtered output $u^f(t)$ on the output which is, in effect, referred to as a "filtered" input in accordance with the following equation:

$$\vec{u}^f(t)=a_1 \vec{u}(t-1)-a_2 \vec{u}(t-1)+\vec{b}_1 u(t)+\vec{b}_2 u(t-1) \tag{78}$$

wherein the values of $a_1$ and $a_2$ are the same as in the dynamic model of the plant, and the values of $\vec{b}_1$ and $\vec{b}_2$ are adjusted to set the gain to a value of zero.

The pre-filter operation is scaled such that the gain of the dynamic model utilized for the pre-filter operation is set equal to unity. The b-values are adjusted to provide this gain scaling operation. The gain is scaled in accordance with the following:

$$\text{gain} = 1 = \frac{\overline{b}_1 + \overline{b}_2}{1 + a_1 + a_2} \tag{79}$$

If the gain were not scaled, this would require some adjustment to the steady-state model after training of the steady-state model. For example, if the gain of the model were equal to "two," this would require that the steady-state model have a gain adjustment of "one-half" after training.

After the filter values have been determined, i.e., the $\overline{b}$-values with the gain set equal to one, then the input values u(t) for the historical data are processed through the pre-filter with the gain set equal to one to yield the value of $\overline{u}(t)$, as indicated by a function block 390. At this point, the dynamics of the system are now impressed upon the historical input data set, i.e., the steady-state component has been removed from the input values. These input values $\overline{u}(t)$ are now input to the neural network in a training operation wherein the neural network 378 is trained upon the filtered input values over the entire input space (or whatever portion is covered by the historical data). This data $\overline{u}(t)$ has the dynamics of the system impressed thereupon, as indicated by block 391. The significance of this is that the dynamics of the system have now been impressed upon the historical input data and thus removed from the output such that the only thing remaining is the steady-state component. Therefore, when the neural network 378 is trained on the filtered output, the steady-state values are all that remain, and a valid steady-state model is achieved for the neural network 378. This steady-state neural network is achieved utilizing data that has very little steady-state nature. Once trained, the weights of the neural network are then fixed, as indicated by a function block 392, and then the program proceeds to an END block 394.

Figure 32:
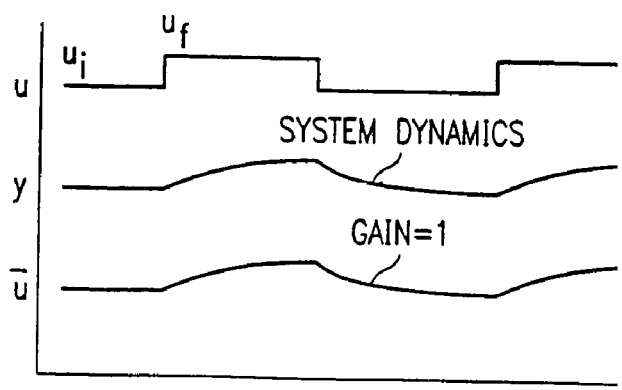
FIG. 32 illustrates a diagrammatic view of the step test.

Referring now to FIG. 32, there is illustrated a diagrammatic view of the step test. The input values u(t) are subjected to a step response such that they go from an initial steady-state value $u_i(t)$ to a final value $u'(t)$. This results in a response on the output $y(t)$, which is rich in dynamic content. The step test is performed such that the value of $u(t)$ is increased from $u_i(t)$ to $u'(t)$, and then decreased back to $u_i(t)$, preferably before the steady-state value has been reached. The dynamic model can then be identified utilizing the values of $u(t)$ presented to the system in the step test and the output values of $y(t)$, these representing the dynamic training data set. This information is utilized to identify the model, and then the model utilized to obtain the pre-filtered values of $\bar{u}(t)$ by passing the historical input data $u(t)$ through the identified model with the dynamic gain of the model set equal to one. Again, as noted above, the values of $\bar{b}$ are adjusted in the model such that the gain is set equal to one.

Figure 33:
FIG. 33 illustrates a diagrammatic view of a single step for u(t) and û(t)

Referring now to FIG. 33, there is illustrated a diagrammatic view of the relationship between the $u(t)$ and the $\bar{u}(t)$, indicating that the gain is set equal to one. By setting the gain equal to one, then only the dynamics determined at the "training region" will be impressed upon the historical input data which exists over the entire input space. If the assumption is true that the only difference between the dynamics between given regions and the input space is the dynamic gain, then by setting the gain equal to one, the dynamics at the given region will be true for every other region in the input space.

Figure 34:
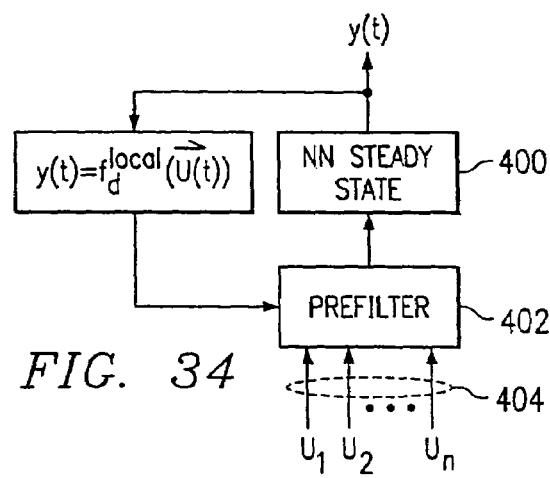
FIG. 34 illustrates a diagrammatic view of the pre-filter operation during training.

Referring now to FIG. 34, there is illustrated a block diagram of the system for training a given output. The training system for the embodiment described herein with respect to impressing the dynamics of the plant onto the historical input data basically operates on a single output. Most networks have multiple inputs and multiple outputs and are referred to as MIMO (multi-input, multi-output) networks. However, each output will have specific dynamics that are a function of the inputs. Therefore, each output must have a specific dynamic model which defines the dynamics of that output as a function of the input data. Therefore, for a given neural network 400, a unique pre-filter 402, will be required which receives the input data on the plurality of input lines 404. This pre-filter is operable to incorporate a dynamic model of the output $y(t)$ on the input $u(t)$. This will be defined as the function:

This represents the dynamic relationship between the inputs and a single output with the gain set equal to unity.

$$y(t) = f_d^{local}(\vec{u}(t)) \tag{80}$$

Figure 35:
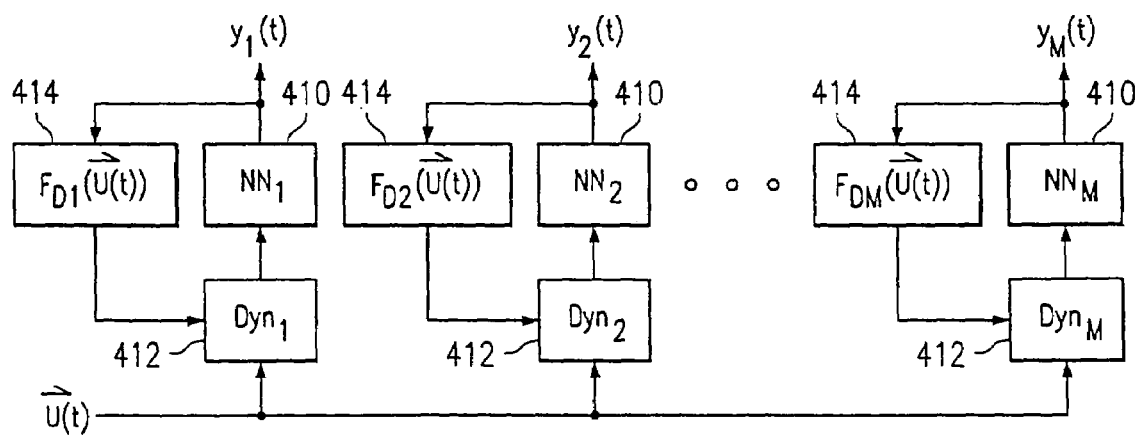
FIG. 35 illustrates a diagrammatic view of a MIMO implementation of the training method of the present disclosure.

Referring now to FIG. 35, there is illustrated a dynamic representation of a MIMO network being modeled. In a MIMO network, there will be required a plurality of steady-state neural networks 410, labeled $NN_1$, $NN_2$, ... $NN_M$. Each one is associated with a separate output $y_1(t)$, $y_2(t)$, ... $y_M(t)$. For each of the neural networks 410, there will be a pre-filter or dynamic model 412 labeled $Dyn_1$, $Dyn_2$ ... $Dyn_M$. Each of these models 412 receives on the input thereof the input values $u(t)$, which constitutes all of the inputs $u_1(t)$, $u_2(t)$, ... $u_n(t)$. For each of the neural networks 410, during the training operation, there will also be provided the dynamic relationship between the output and the input $u(t)$ in a block 14. This dynamic relationship represents only the dynamic relationship between the associated one of the outputs $y_1(t)$, $y_2(t)$, ... $y_M(t)$. Therefore, each of these neural networks 410 can be trained for the given output.

Figure 36:
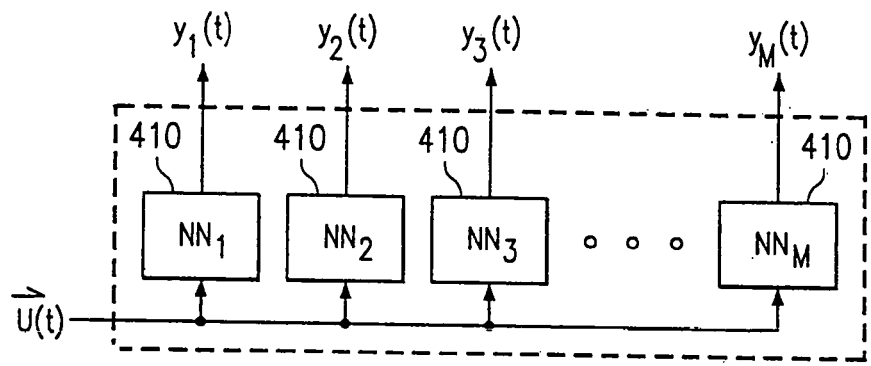
FIG. 36 illustrates a non-fully connected network.

Referring now to FIG. 36, there is illustrated the block diagram of the predicted network after training. In this mode, all of the neural networks 410 will now be trained utilizing the above-noted method of FIG. 30, and they will be combined such that the input vector $u(t)$ will be input to each of the neural networks 410 with the output of each of the neural networks comprising one of the outputs $y_1(t)$, $y_2(t)$, ... $y_M(t)$.

Graphical Interface for Model Identification

Figure 37:
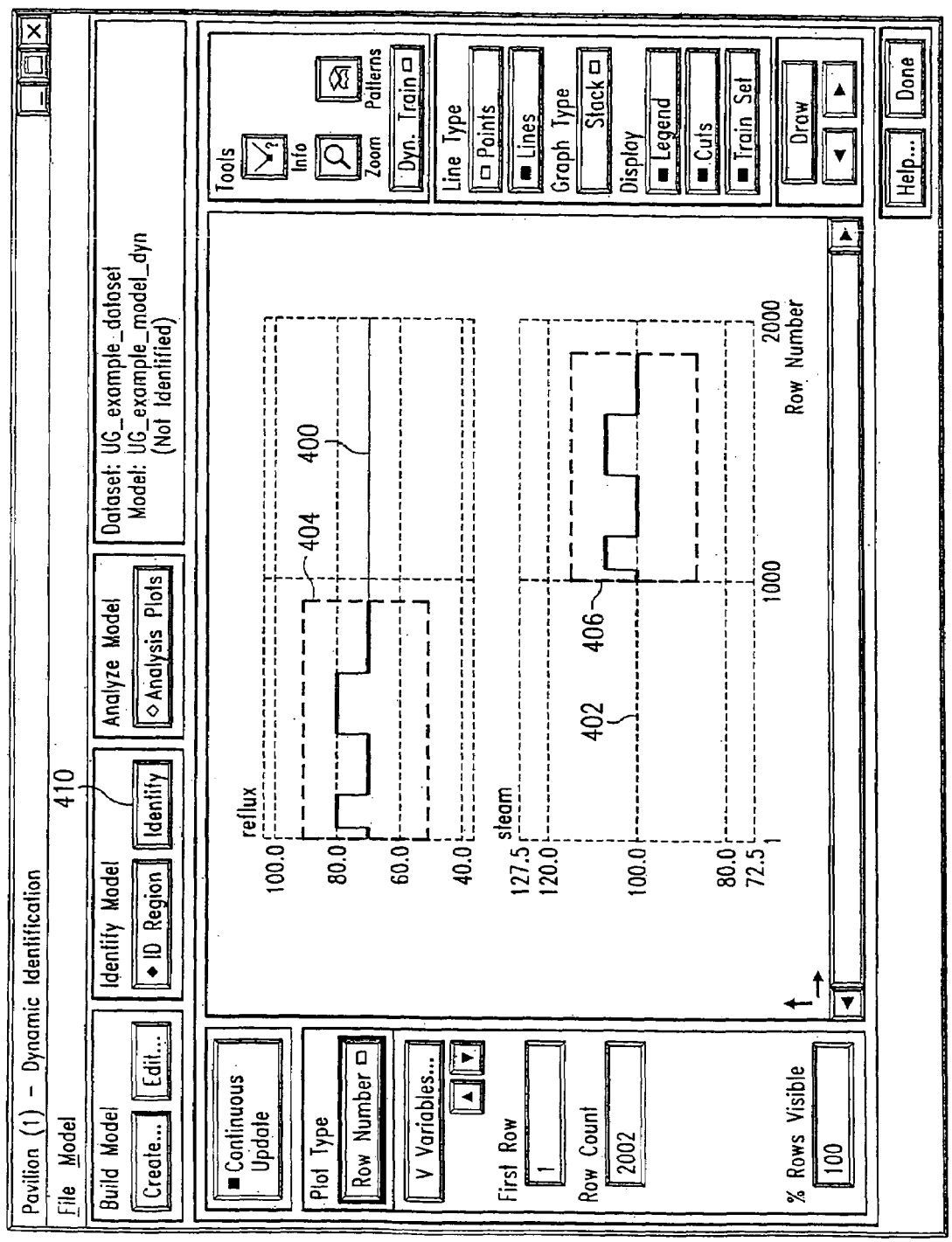
FIG. 37 illustrates a graphical user interface for selecting ranges of values for the dynamic inputs in order to train the dynamic model.
Figure 39:
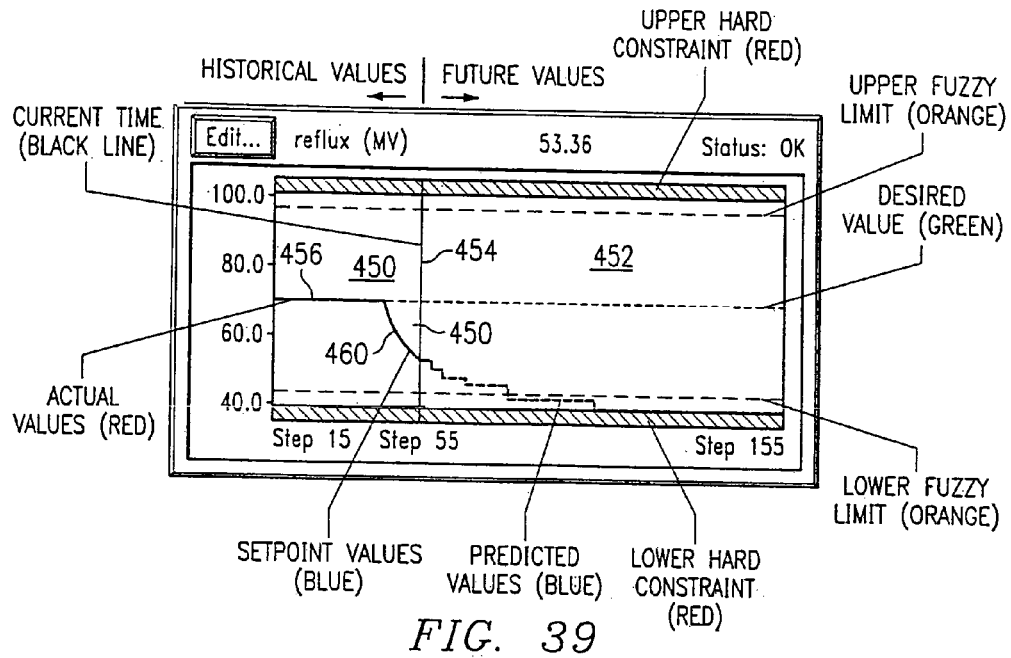
FIGS. 39 and 40 illustrate graphical user interfaces for depicting both the actual historical response and the predictive response.

Referring now to FIG. 37, there is illustrated a graphical user interface (GUI) for allowing the user to manipulate data on the screen, which manipulated data then defines the parameters of the model identification procedure. In FIG. 39 there are illustrated two input values, one labeled "reflux" and one labeled "steam." The reflux data is represented by a curve 400 whereas the steam data is represented by curve 402. These curves constitute dynamic step data which would have corresponding responses on the various outputs (not shown). As noted hereinabove with respect to FIG. 34, the output would have a dynamic response as a result of the step response of the input.

The user is presented the input data taken as a result of the step test on the plant and then allowed to identify the model from this data. The user is provided a mouse or similar pointing device (not shown) to allow a portion of one or more of the data values to be selected over a user defined range. In FIG. 37, there is illustrated a box 404 in phantom about a portion of the input reflux data which is generated by the user with the pointing device. There is also illustrated a box 406 in phantom about a portion of the steam data on curve 402. The portion of each of the curves 400 and 402 that is enclosed within the respective boxes 404 and 406 is illustrated in thick lines as "selected" data. As noted hereinabove, the step test data is taken in a particular localized portion of the input space, wherein the input space is defined by the various input values in the range over which the data extends. By allowing the user the versatility of selecting which input data is to be utilized for the purpose of identifying the model, the user is now permitted the ability to manipulate the input space. Once the user has selected the data that is to be utilized and the range of data, the user then selects a graphical button 410 which will then perform an "identify" operation of the dynamic model utilizing the selected information.

Figure 38:
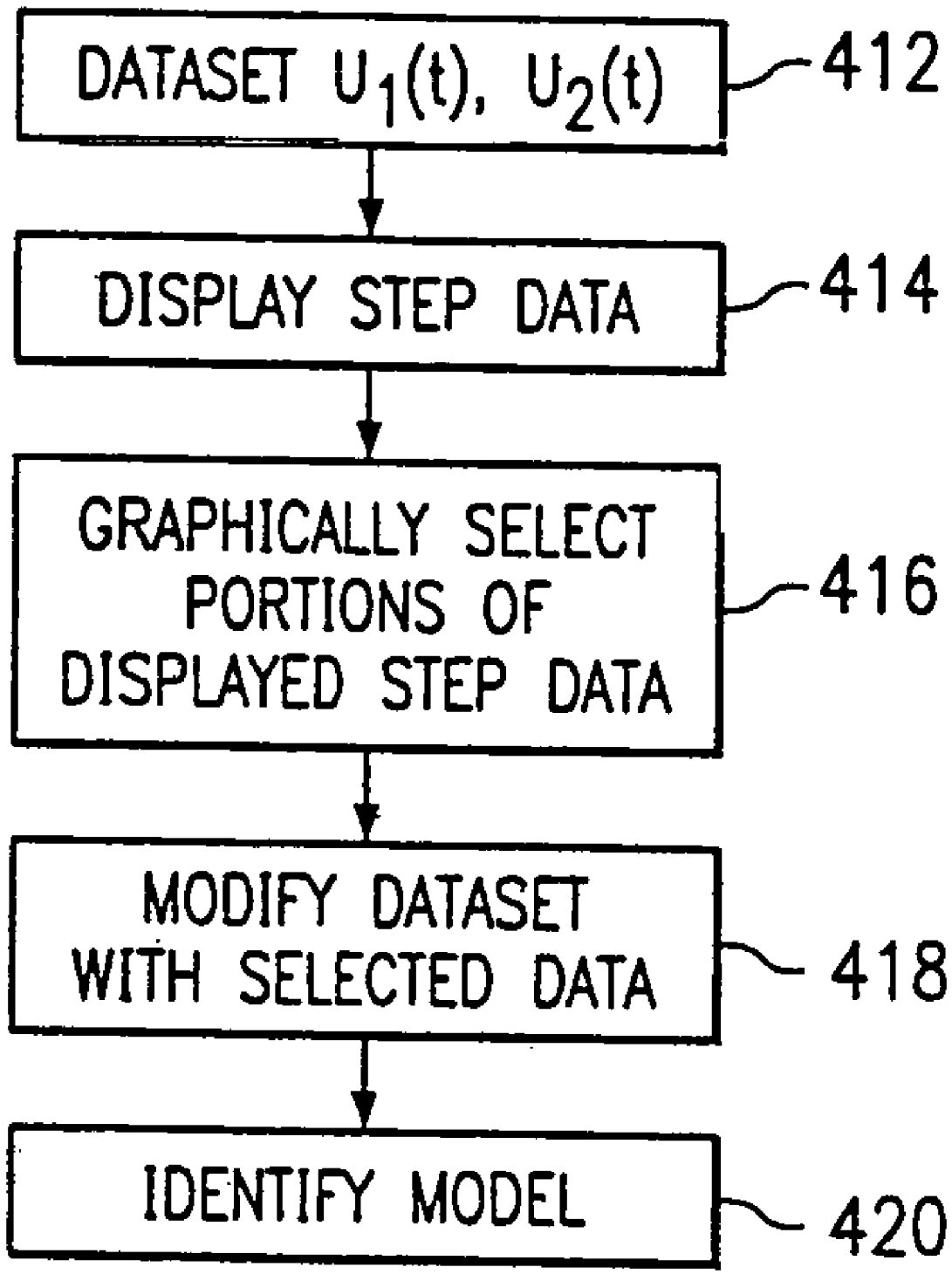
FIG. 38 illustrates a flowchart depicting the selection of data and training of the model.

Referring now to FIG. 38, there is illustrated a flowchart depicting the general identify operation described above with respect to FIG. 39. The program is initiated at a function block 412 which indicates a given data set, which data set contains the step test data for each input and each output. The program then flows to a function block 414 to display the step test data and then to a function block 416 to depict the operation of FIG. 38 wherein the user graphically selects portions of the display step test data. The program then flows to a function block 418 wherein the data set is modified with the selected step test data. It is necessary to modify the data set prior to performing the identification operation, as the identification operation utilizes the available data set. Therefore, the original data set will be modified to only utilize the selected data, i.e., to provide a modified data set for identification purposes. The program will then flow to a function block 420 wherein the model will be identified utilizing the modified data set.

Referring now to FIG. 39, there is illustrated a second type of graphical interface. After a model has been created and identified, it is then desirable to implement the model in a control environment to control the plant by generating new input variables to change the operation of the plant for the purpose of providing a new and desired output. However, prior to placing the model in a "run-time" mode, it may be desirable to run a simulation on the model prior to actually incorporating it into the run time mode. Additionally, it may be desirable to graphically view the system when running to determine how the plant is operating in view of what the predicted operation is and how that operation will go forward in the future.

Figure 40:
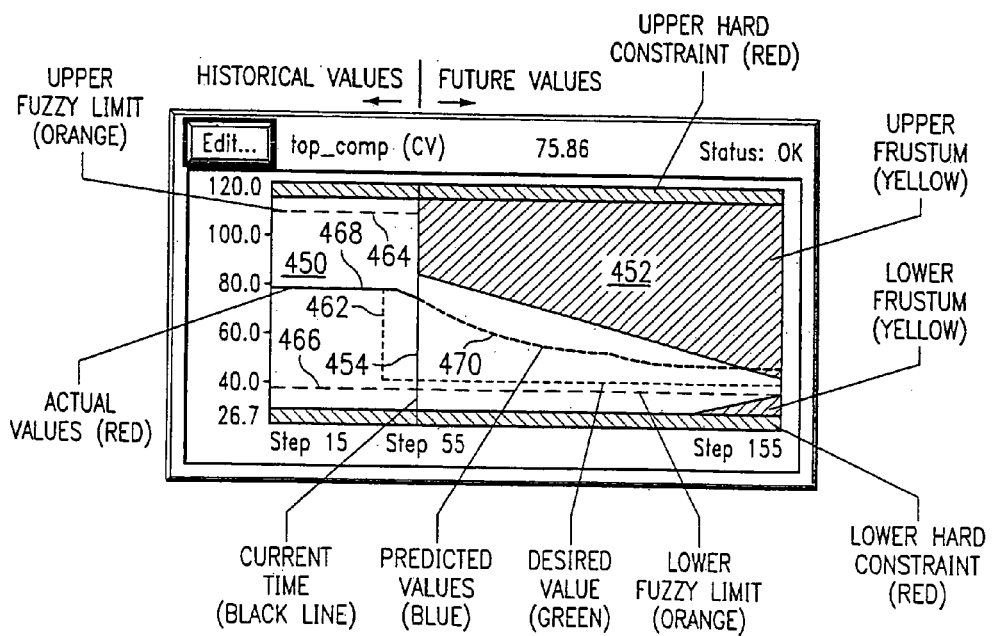

Referring further to FIG. 40, there is illustrated a plot of a single manipulatable variable (MV) labeled "reflux." The plot illustrates two sections, a historical section 450 and a predictive section 452. There is illustrated a current time line 454 which represents the actual value at that time. The x-axis is comprised of the steps and horizontal axis illustrates the values for the MV. In this example of FIG. 41, the system was initially disposed at a value of approximately 70.0. In historical section 450, a bold line 456 illustrates the actual values of the system. These actual values can be obtained in two ways. In a simulation mode, use the actual values that are input to the simulation model. In the run-time mode, they are the set point values input to the plant.

In a dynamic system, any change in the input will be made in a certain manner, as described hereinabove. It could be a step response or it could have a defined trajectory. In the example of FIG. 40, the change in the MV is defined along a desired trajectory 458 wherein the actual values are defined along a trajectory 460. The trajectory 458 is defined as the "set point" values. In a plant, the actual trajectory may not track the setpoints (desired MVs) due to physical limitations of the input device, time constraints, etc. In the simulation mode, these are the same curve. It can be seen that the trajectory 460 continues up to the current time line 454. After the current time line 454, there is provided a predicted trajectory which will show how it is expected the plant will act and how the predictive model will predict. It is also noteworthy that the first value of the predicted trajectory is the actual input to the plant. The trajectory for the MV is computed every iteration using the previously described controller. The user therefore has the ability to view not only the actual response of the MV from a historical standpoint but, also the user can determine what the future prediction will be a number of steps into the future.

Figure 41:
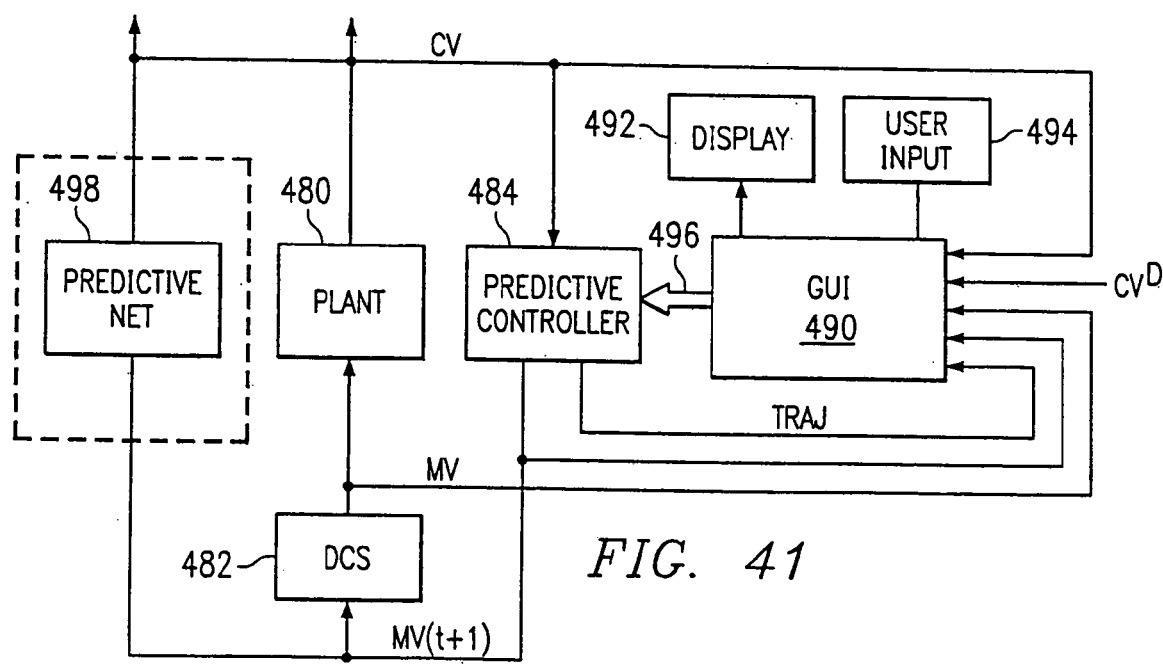
FIG. 41 illustrates a block diagram of a predictive control system with a GUI interface.
Figure 42:
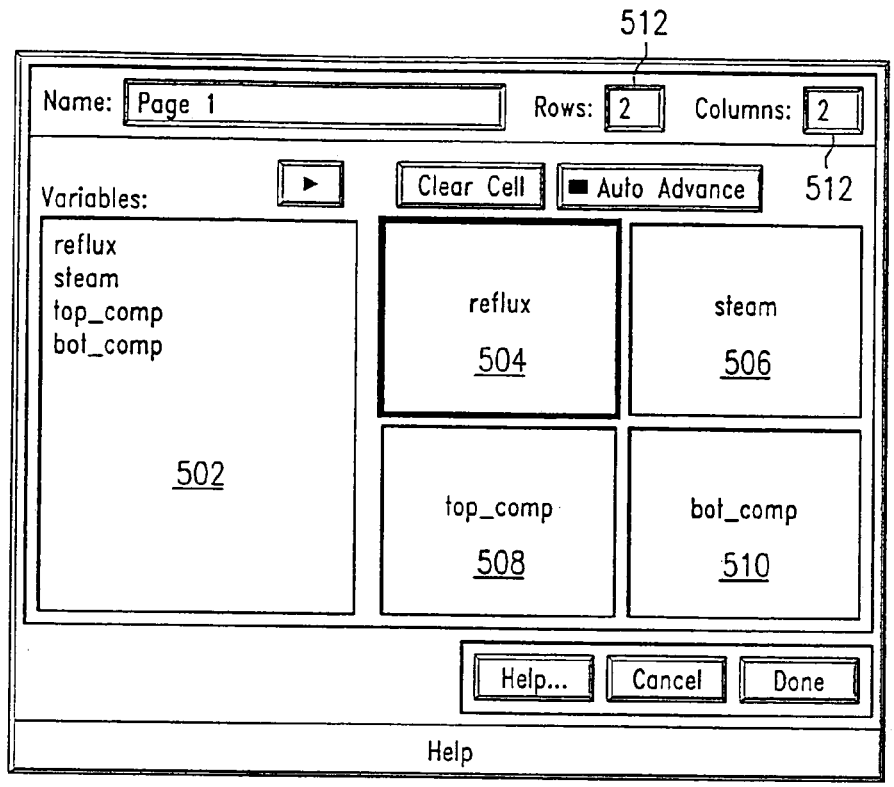

A corresponding controlled variable (CV) curve is illustrated in FIG. 42. In this figure, there is also a historical section 450 and a predictive section 452. In the output, there is provided therein a desired response 462 which basically is a step response. In general, the system is set to vary from an output value of 80.0 to an input value of approximately 42.0 which, due to dynamics, cannot be achieved in the real world. Various constraints are also illustrated with a upper fuzzy constraint at a line 464 and a lower fuzzy constraint at a line 466. The system will show in the historical section the actual value on a bold line 468 which illustrates the actual response of the plant, this noted above as being either a simulator or by the plant itself. It should be remembered that the user can actually apply the input MV while the plant is running. At the current time line 454, a predicted value is shown along a curve 470. This response is what is predicted as a result of the input varying in accordance with the trajectory of FIG. 41. In addition to the upper and lower fuzzy constraints, there are also provided upper and lower hard constraints and upper and lower frustum values, that were described hereinabove. These are constraints on the trajectory which are determined during optimization.

By allowing the user to view not only historical values but future predicted values during the operation of a plant or even during the simulation of a plant, the operator is now provided with information as to how the plant will operate during a desired change. If the operation falls outside of, for example, the upper and lower frustum of a desired operation, it is very easy for the operator to make a change in the desired value to customize this. This change is relatively easy to make and is made based upon future predicted behavior as compared to historical data.

Referring now to FIG. 41, there is illustrated a block diagram of a control system for a plant that incorporates the GUI interface. Basically, there is illustrated a plant 480 which has a distributed control system (DCS) 482 associated therewith for generating the MVs. The plant outputs the control variables (CV). A predictive controller 484 is provided which is basically the controller as noted hereinabove with respect to FIG. 2 utilized in a control environment for predicting the future values of the manipulated variables MV(t+1) for input to the DCS 482. This will generate the predicted value for the next step. The predictive controller requires basically a number of inputs, the MVs, the output CVs and various other parameters for control thereof. A GUI interface 490 is provided which is operable to receive the MVs, the CVs, the predicted manipulated variables MV(t+1) for t+1, t+2, t+3, . . . t+n, from the predictive controller 484. It is also operable to receive a desired control variable $CV^D$. The GUI interface 490 will also interface with a display 492 to display information for the user and allow the user to input information therein through a user input device 494, such as a mouse or pointing device. The predictive controller also provides to the GUI interface 490 a predicted trajectory, which constitutes at one point thereof MV(t+1). The user input device 494, the display 492 and the GUI interface 490 are generally portions of a software program that runs on a PC, as well as the predictive controller 484.

In operation, the GUI interface 490 is operable to receive all of the information as noted above and to provide parameters on one or more lines 496 to the predictive controller 484 which will basically control the predictive controller 484. This can be in the form of varying the upper and lower constraints, the desired value and even possibly parameters of the identifying model. The model itself could, in this manner, be modified with the GUI interface 490.

The GUI interface 490 allows the user to identify the model as noted hereinabove with respect to FIG. 39 and also allows the user to view the system in either simulation mode or in run time mode, as noted in FIG. 41. For the simulation mode, a predictive network 498 is provided which is operable to receive the values MV(t+1) and output a predicted control variable rather than the actual control variable. This is described hereinabove with reference to FIG. 2 wherein this network is utilized in primarily a predictive mode and is not utilized in a control mode. However, this predictive network must have the dynamics of the system model defined therein.

Referring now to FIGS. 42–45, there is illustrated a screen view which comprises the layout screen for displaying the variables, both input and output, during the simulation and/or run-time operation. In the view of FIG. 42, there is illustrated a set-up screen wherein four variables can be displayed: reflex, steam, top_comp, and bot_comp. These are displayed in a box 502. On the right side of the screen are displayed four boxes 504, 506, 508 and 510, for displaying the four variables. Each of the variables can be selected for which box they will be associated with. The boxes 504–510 basically comprise the final display screen during simulation. The number of rows and columns can be selected with boxes 512.

Figure 44:
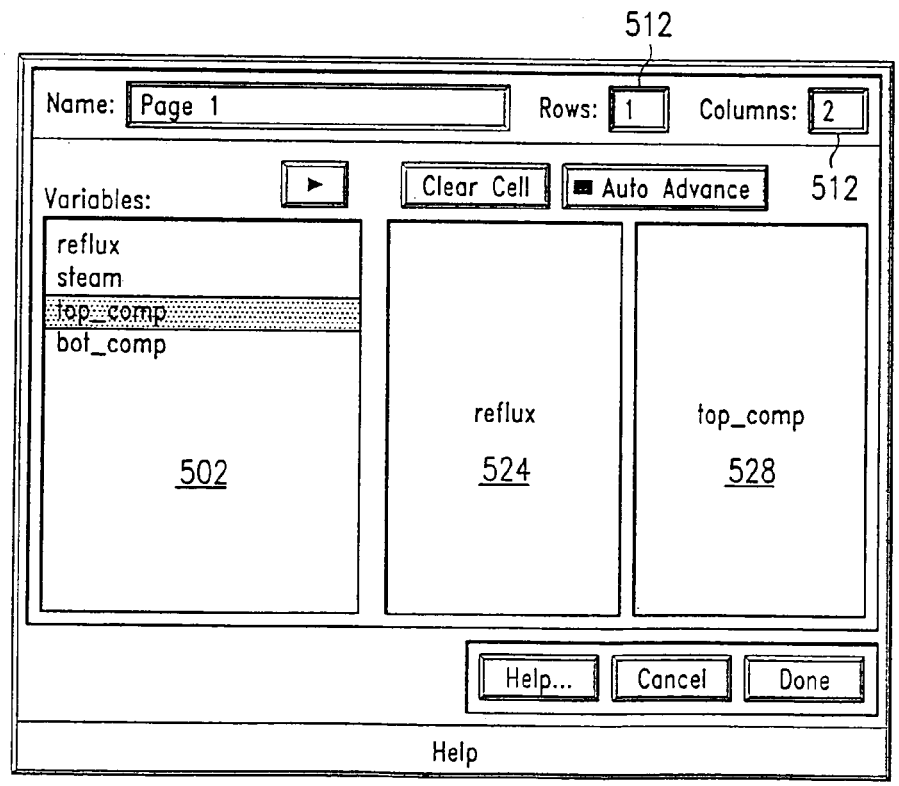
Figure 43:
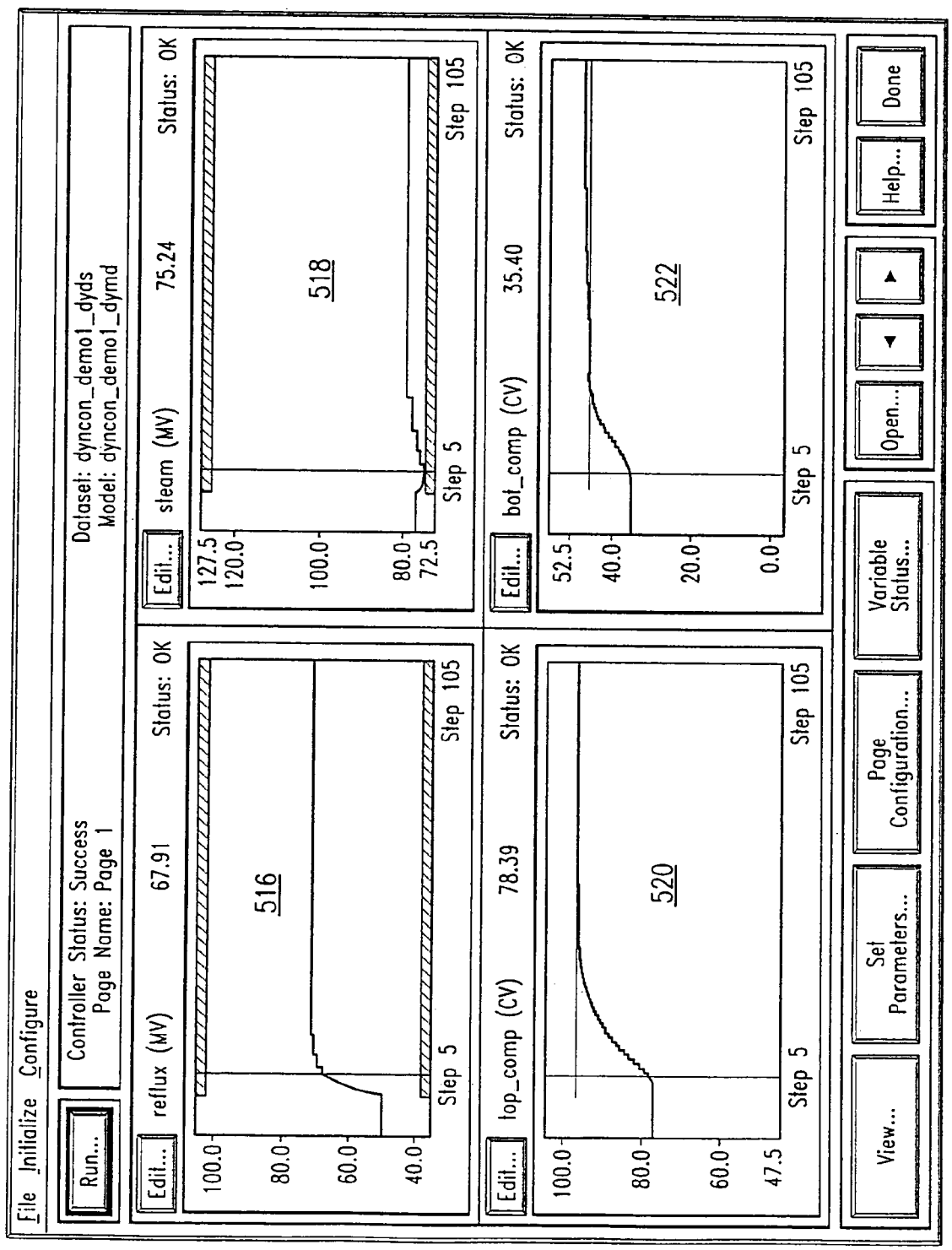
Figure 45:
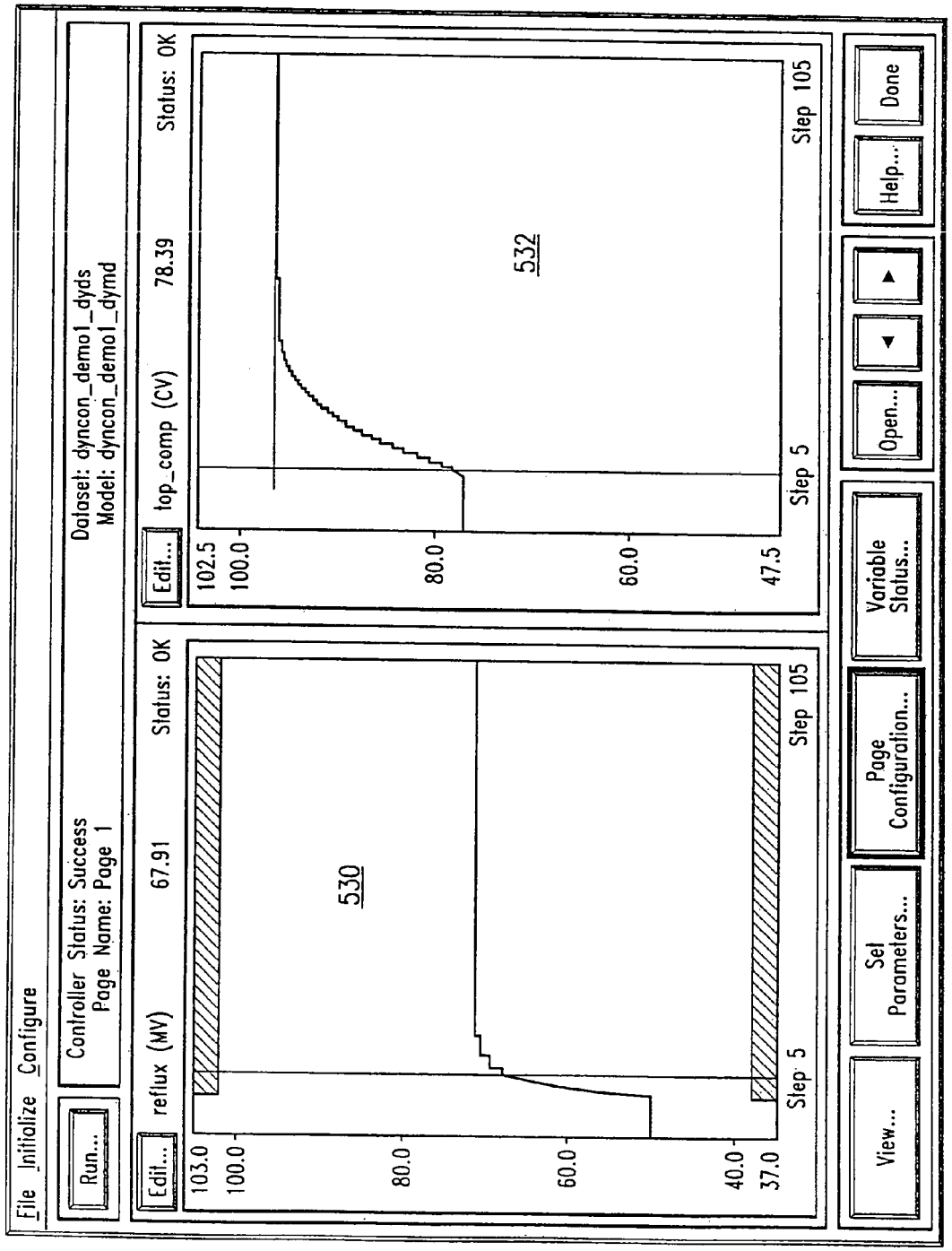

Referring now to FIG. 42, there is illustrated the screen that will result when the system is "stepped" for the four variables as selected in FIG. 43. This will result in four screens displaying the two MVs, reflex and steam, and the two CVs, top_comp and bot_comp. In some situations, there may be a large number of variables that can be displayed on a single screen; there could be as many as thirty variables displayed in the simulation mode as a function of time. In the embodiment of FIG. 44, there are illustrated four simulation displays 516, 518, 520 and 522, associated with boxes 504–510, respectively.

Referring now to FIG. 43, there is illustrated another view of the screen of FIG. 42 with only one row selected with the boxes 512 in two columns. This will result in two boxes 524 and 528 that will be disposed on the final display. It can be seen that the content of these two boxes, after being defined by the boxes 512, is defined by moving to the variable box 502 and pointing to the appropriate one of the variable names, which will be associated with the display area 524 or 528. Once the variables have been associated with the particular display, then the user can move to the simulation screen illustrated in FIG. 45, which only has two boxes 530 and 532 associated with the boxes 524 and 528 in FIG. 44. Therefore, the user can very easily go into the set-up screen of FIGS. 42 and 44 to define which variables will be displayed during the simulation process or during run-time execution.

On-Line Optimizer

Figure 46:
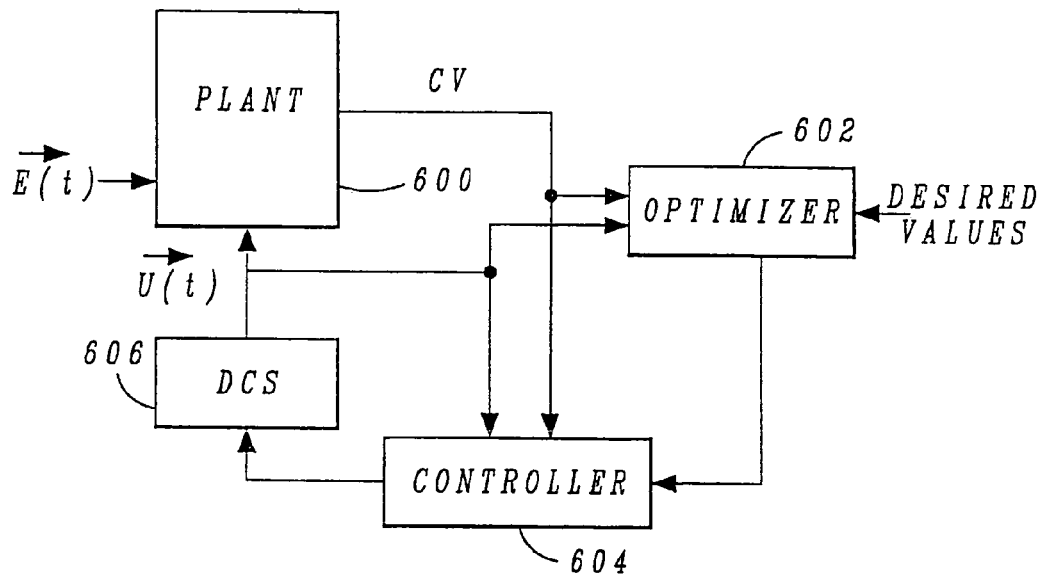
FIG. 46 illustrates a diagrammatic view of a plant utilizing on-line optimization.

Referring now to FIG. 46, there is illustrated a block diagram of a plant 600 utilizing an on-line optimizer. This plant is similar to the plant described hereinabove with reference to FIG. 6 in that the plant receives inputs u(t) which are comprised of two types of variables, manipulatable variables (MV) and disturbance variables (DV). The manipulatable variables are variables that can be controlled such as flow rates utilizing flow control valves, flame controls, etc. On the other hand the disturbance variables are inputs that are measurable but cannot be controlled such as feed rates received from another system. However, they all constitute part of the input vector u(t). The output of the plant constitutes the various states that are represented by the vector y(t). These outputs are input to an optimizer 602 which is operable to receive desired values and associated constraints and generate optimized input desired values. Since this is a dynamic system, the output of the optimizer 602 is then input to a controller 604 which generates the dynamic movements of the inputs which are input to the distributed control system 606 for generation of the inputs to the plant 600, it being understood that the DCS 606 will only generate the MVs that are actually applied to the plant. The distinction of this system over other systems is that the optimizer 602 operates on-line. This aspect is distinctive from previous system in that the dynamics of the system must be accounted for during the operation of this optimizer. The reason for this is that when an input value moves from one value to another value, there are dynamics associated therewith. These dynamics must be considered or there will multiple errors. This is due to the fact that most predictive systems utilizing optimizers implement the optimization routine with steady state models. No decisions can be made until the plant settles out, such that such an optimization must be performed off-line.

Figure 47:
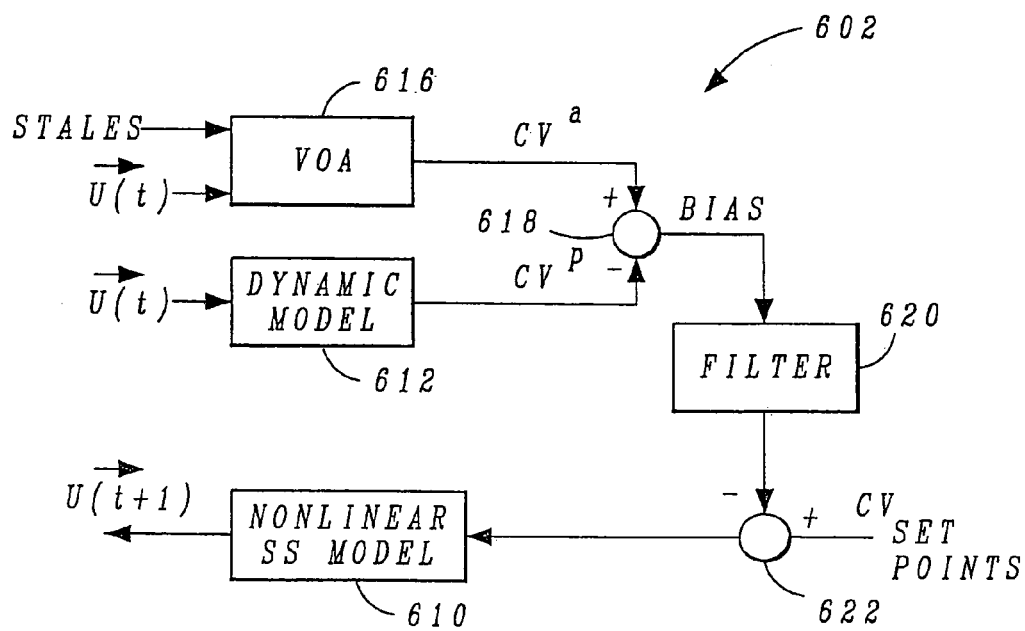
FIG. 47 illustrates a block diagram of the optimizer.

Referring now to FIG. 47, there is illustrated a block diagram of the optimizer 602. In general, there is provided a nonlinear steady state model 610 which is operable to receive control variables (CV) which are basically the outputs of the plant y(t). The steady state model 610 is operable to receive the CV values as an input in the form of set points and generates an output optimized value of u(t+1). This represents the optimized or predicted future value that is to be input to the controller for controlling the system. However, the steady state model 610 was generated with a training set of input vectors and output vectors that represented the plant at the time that this training data was taken. If, at a later time, the model became inaccurate due to changes in external uncontrollable aspects of the plant 600, then the model 610 would no longer be accurate. However, it is noted that the gain of the steady state model 610 would remain accurate due to the fact that an offset would be present. In order to account for this offset, a dynamic model 612 is utilized which receives the inputs values and generates the output values CV which provide a prediction of the output value CV. This is compared with an actual plant output value which is derived from a virtual on-line analyzer (VOA) 616. The VOA 616 is operable to receive the plant outputs CV and the inputs u(t). The output of the VOA 616 provides the actual output of the plant which is input a difference circuit 618, the difference thereof being the offset or "bias." This bias represents an offset which is then filtered with a filter 620 for input to an offset device 622 to offset external CV set points, i.e., desired CV values, for input to the nonlinear steady state model 610.

Figure 48:
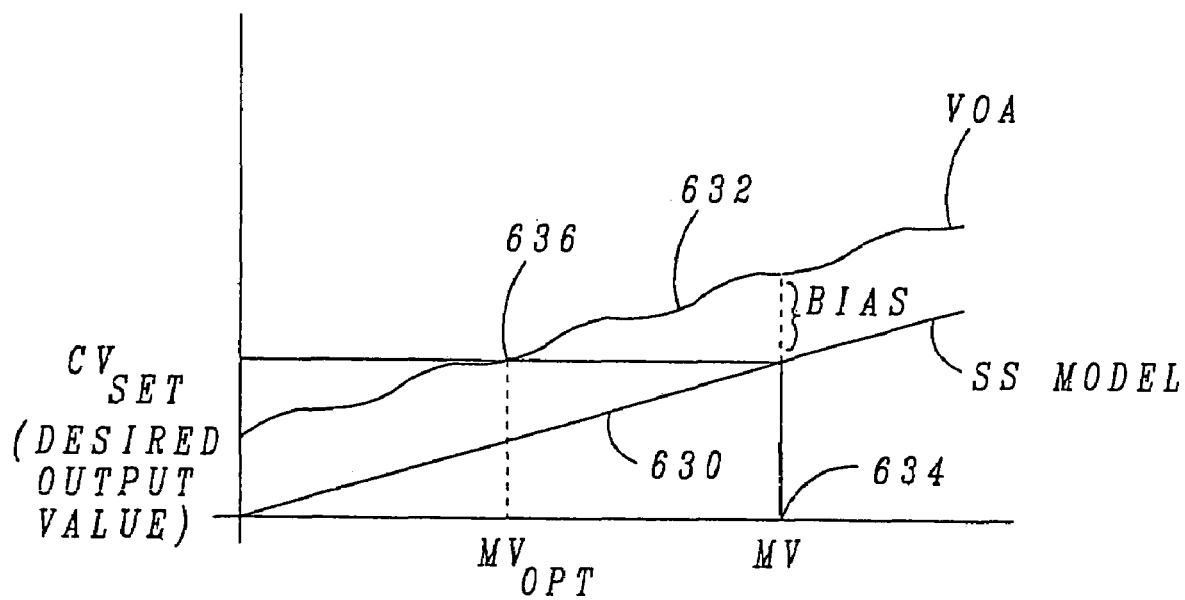
FIG. 48 illustrates a plot of manipulatable variables and controlled variables or outputs.

Referring now to FIG. 48, there is illustrated a diagrammatic view of the application of the bias illustrated in FIG. 47. There is illustrated a curve 630 representing the mapping of the input space to the output space through a steady state model. As such, for each manipulatable variable (MV), there will be provided a set of output variables (CV). Although the steady state model is illustrated as a straight line, it could have a more complex surface. Also, it should be understood that this is represented as a single dimension, but this could equally apply to a multi-variable system wherein there are multiple input variables for a given input vector and multiple output values for a given output vector. If the steady state model represents an accurate predictive model of the system, then input vector MV will correspond to a predicted output value. Alternatively, in a control environment, it is desirable to predict the MVs from a desired output value $CV_{SET}$. However, the predicted output value or the predicted input value, depending upon whether the input is predicted or the output is predicted, will be a function of the accuracy of the model. This can change due to various external unmeasurable disturbances such as the external temperature, the buildup of slag in a boiler, etc. This will effectively change the way the plant operates and, therefore, the model will no longer be valid. However, the "gain" or sensitivity of the model should not change due to these external disturbances. As such, when an MV is varied, the output would be expected to vary from an initial starting point to a final resting point in a predictable manner. It is only the value of the predicted value at the starting point that is in question. In order to compensate for this, some type of bias must be determined and an offset provided.

In the diagrammatic view of FIG. 48, there is provided a curve 632 representing the actual output of the plant as determined by the VOA 616. A bias is measured at the MV point 634 such that an offset can be provided. When this offset is provided, there will be an optimized MV, $MV_{OPT}$. This will occur at a point 636 on the curve 632. Therefore, in order to provide a desired value $CV_{SET}$, the MV that must be associated with that for the operation of the current plant must be $MV_{OPT}$.

Figure 49:
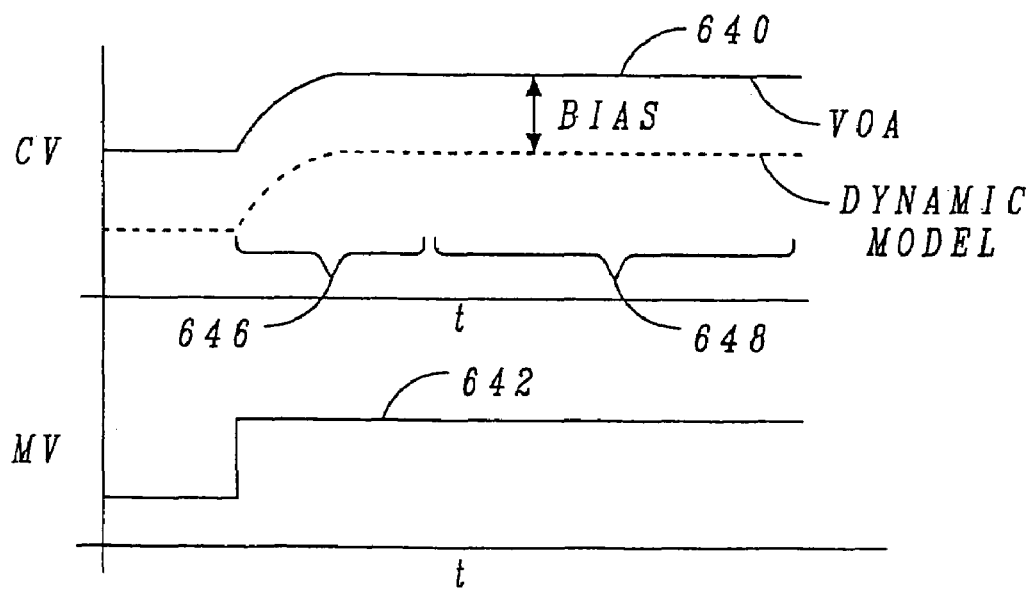
FIGS. 49–51 illustrate plots of the dynamic operation of the system and the bias.

Referring now to FIG. 49, there is illustrated a plot of both CV and MV illustrating the dynamic operation. There is provided a first plot or curve 640 illustrating the operation of the CV output in response to a dynamic change which is the result of a step change in the MV input, represented by curve 642. The dynamic model 612 will effectively predict what will happen to the plant when it is not in steady state. This occurs in a region 646. In the upper region, a region 648, this constitutes a steady state region.

Figure 50:
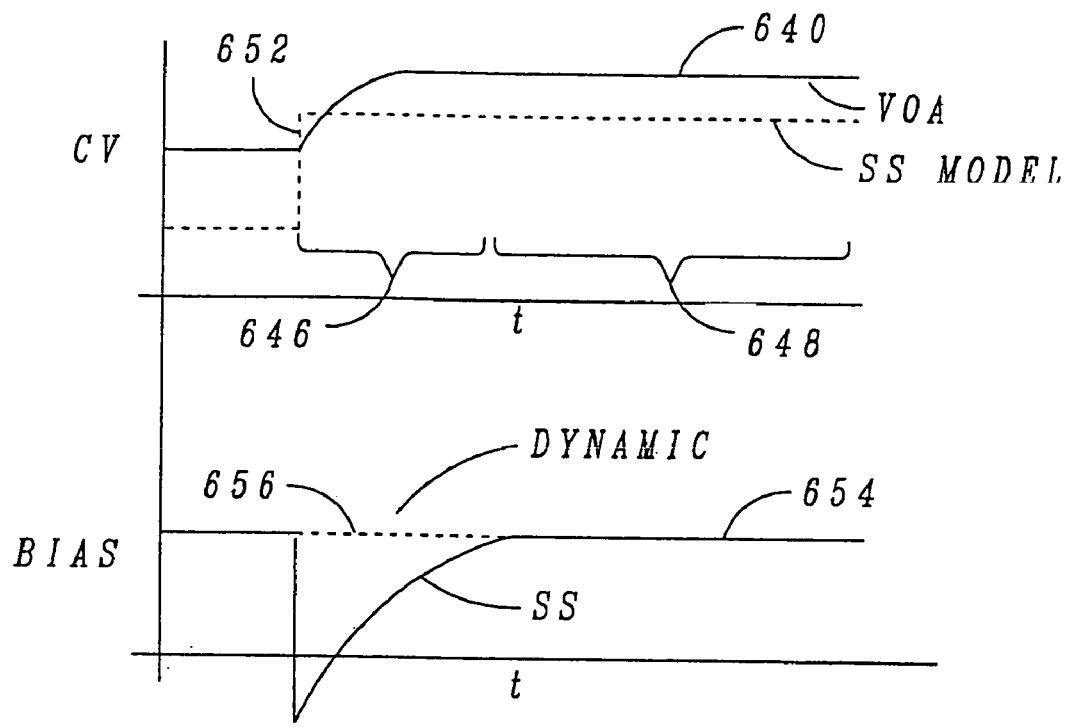

Referring now to FIG. 50, there is illustrated a plot illustrating the predicted model as being a steady state model. Again, there is provided the actual output curve 640 which represents the output of the VOA and also a curve 650 which represents the prediction provided by the steady state nonlinear model. It can be seen that, when the curve 642 makes a step change, the output, as represented by the curve 640, will change gradually up to a steady state value. However, the steady state model will make an immediate calculation of what the steady state value should be, as represented by a transition 652. This will rise immediately to the steady state level such that, during the region 646, the prediction will be inaccurate. This is representative in the plot of bias for both the dynamic and the steady state configurations. In the bias for the steady state model, represented by a solid curve 654, the steady state bias will become negative for a short period of time and then, during the region 646, go back to a bias equal to that of the dynamic model. The dynamic model bias is illustrated by a dotted line 656.

Figure 51:
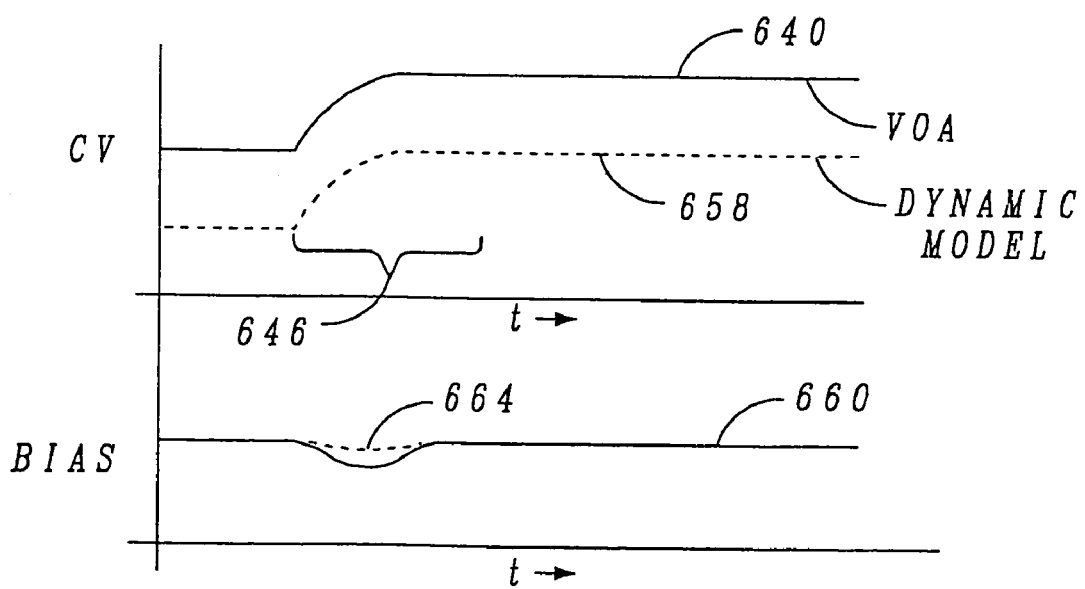

Referring now to FIG. 51, there are illustrated curves representing the operation of the dynamic model wherein the dynamic model does not accurately predict the dynamics of the system. Again, the output of the system, represented by the VOA, is represented by the curve 640. The dynamic model provides a predictive output incorporated in the dynamics of the system, which is represented by a curve 658. It can be seen that, during the dynamic portion of the curve represented by region 646, that the dynamic model reaches a steady state value too quickly, i.e., it does not accurately model the dynamics of the plant during the transition in region 646. This is represented by a negative value in the bias, represented by curve 660 with a solid line. The filter 620 is utilized to filter out the fast transitions represented by the dynamic model in the output bias value (not the output of the dynamic model itself). Also, it can be seen that the bias, represented by a dotted line 664, will be less negative.

Figure 52:
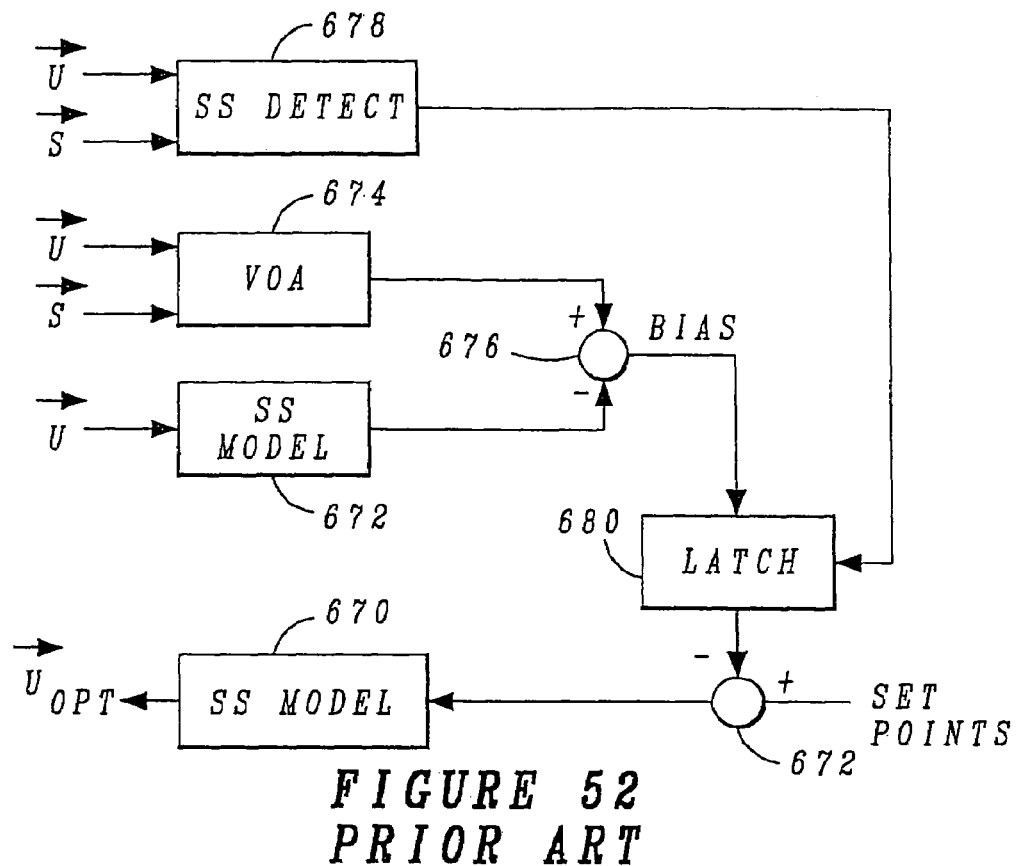
FIG. 52 illustrates a block diagram of a prior art optimizer utilizing steady-state.

Referring now to FIG. 52, there is illustrated a block diagram of a prior art system utilizing a steady state model for optimization. In this system, there is provided a steady state model 670 similar to the steady state model 610. This is utilized to receive set points and predict optimized MVs, represented as the vector $u_{OPT}$. However, in order to provide some type of bias for the operation thereof, the actual set points are input to an offset circuit 672 to be offset by a bias input. This bias input is generated by comparing the output of a steady state model 672, basically the same steady state model 670, with the output of a VOA 674, similar to VOA 616 in FIG. 47. This will provide a bias value, as it does in FIG. 47. However, it is noted that this is the bias between the steady state model, a steady state predicted value, and possibly the output of the plant which may be dynamic in nature. Therefore, it is not valid during dynamic changes of the system. It is only valid at a steady state condition. In order to utilize the bias output by a difference circuit 676 which compares the output of a steady state model 672 with that of the VOA 674, a steady state detector 678 is provided. This steady state detector 678 will look at the inputs and outputs of the network and determine when the outputs have "settled" to an acceptable level representative of a steady state condition. This can then be utilized to control a latch 680 which latches the output of the difference circuit 676, the bias value, which latched value is then input to the offset circuit 672. It can therefore be seen that this configuration can only be utilized in an off-line mode, i.e., when there are no dynamics being exhibited by the system.

Steady State Optimization

In general, steady state models are utilized for the steady state optimization. Steady state models represent the steady state mapping between inputs of the process (manipulated variables (MV) and disturbance variables (DV)) and outputs (controlled variables (CV)). Since the models represent a steady state mapping, each input and output process is represented by a single input or output to the model (time delays in the model are ignored for optimization purposes). In general, the gains of a steady state model must be accurate while the predictions are not required to be accurate. Precision in the gain of the model is needed due to the fact that the steady state model is utilized in an optimization configuration. The steady state model need not yield an accurate prediction due to the fact that a precise VOA can be used to properly bias the model. Therefore, the design of the steady state model is designed from the perspective of developing an accurate gain model during training thereof to capture the sensitivities of the plant. The model described hereinbelow for steady state optimization is a nonlinear model which is more desirable when operating in multiple operating regions. Moreover, when operating in a single operating region, a linear model could be utilized. A single operating region process is defined as a process whose controlled variables operate at constant set-points, whose measured disturbance variables remain in the same region, and whose manipulated variables are only changed to reject unmeasured disturbances. Since the MVs are only moved to reject external disturbances, the process is defined to be external disturbance dominated. An example of a single operating region process is a distillation column. By comparison, a multiple operating region process is a process whose manipulated variables are not only moved to reject unmeasured disturbances, but are also changed to provide desired process performance. For example, the manipulated variables may be changed to achieve different CV set points or they may be manipulated in response to large changes to measured disturbances. An example of this could be a distillation column with known and significant changes in feed rate or composition (measured disturbance variable) which operates at a constant set point. Since the MVs or CVs of a multiple operating region process are often set to non-constant references to provide desired process performance, a multiple region process is reference dominated rather than disturbance dominated. The disclosed embodiment herein is directed toward multiple operating region processes and, therefore, a non-linear dynamic model will be utilized. However, it should be understood that both the steady state model and the dynamic model could be linear in nature to account for single operating region processes.

As described hereinabove, steady state models are generated or trained with the use of historical data or a first principals model, even a generic model of the system. The MVs should be utilized as inputs to the models but the states should not be used as inputs to the steady state models. Using states as inputs in the steady state models, i.e., the states being the outputs of the plant, produces models with accurate predictions but incorrect gains. For optimization purposes, as described hereinabove, the gain is the primary objective for the steady state optimization model.

Figure 53:
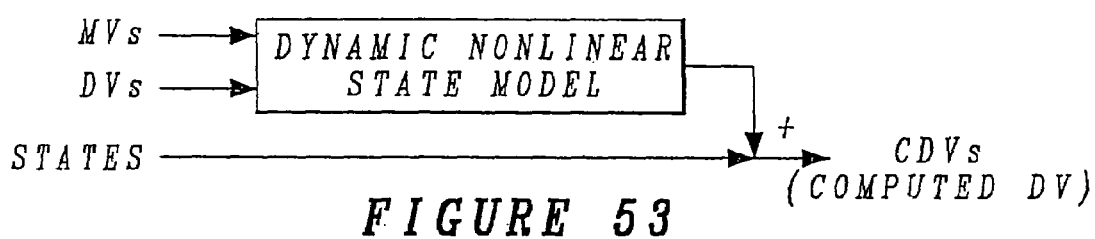
FIG. 53 illustrates a diagrammatic view for determining the computed disturbance variables.
Figure 54:
FIG. 54 illustrates a block diagram for a steady state model utilizing the computer disturbance variables.

Referring now to FIG. 53, there is illustrated a block diagram of a model which is utilized to generate residual or computed disturbance variables (CDVs). A dynamic non-linear state model 690 which provides a model of the states of the plant, the measurable outputs of the plant, and the MVs and DVs. Therefore, this model is trained on the dynamics of the measurable outputs, the states, and the MVs and DVs as inputs. The predicted output, if accurate, should be identical to the actual output of the system. However, if there are some unmeasurable external disturbances which affect the plant, then this prediction will be inaccurate due to the fact that the plant has changed over that which was originally modeled. Therefore, the actual state values, the measured outputs of the plant, are subtracted from the predicted states to provide a residual value in the form of the CDVs. Thereafter, the computed disturbances, the CDVs, are provided as an input to a non-linear steady state model 692, illustrated in FIG. 54, in addition to the MVs and DVs. This will provide a prediction of the CVs on the output thereof. Non-linear steady state model 692, described hereinabove, is created with historical data wherein the states are not used as inputs. However, the CDVs provide a correction for the external disturbances. This is generally referred to as a residual activation network which was disclosed in detail in U.S. Pat. No. 5,353,207 issued Oct. 4, 1994 to J. Keeler, E. Hartman and B. Ferguson, which patent is incorporated herein by reference.

On-Line Dynamic Optimization

Figure 55:
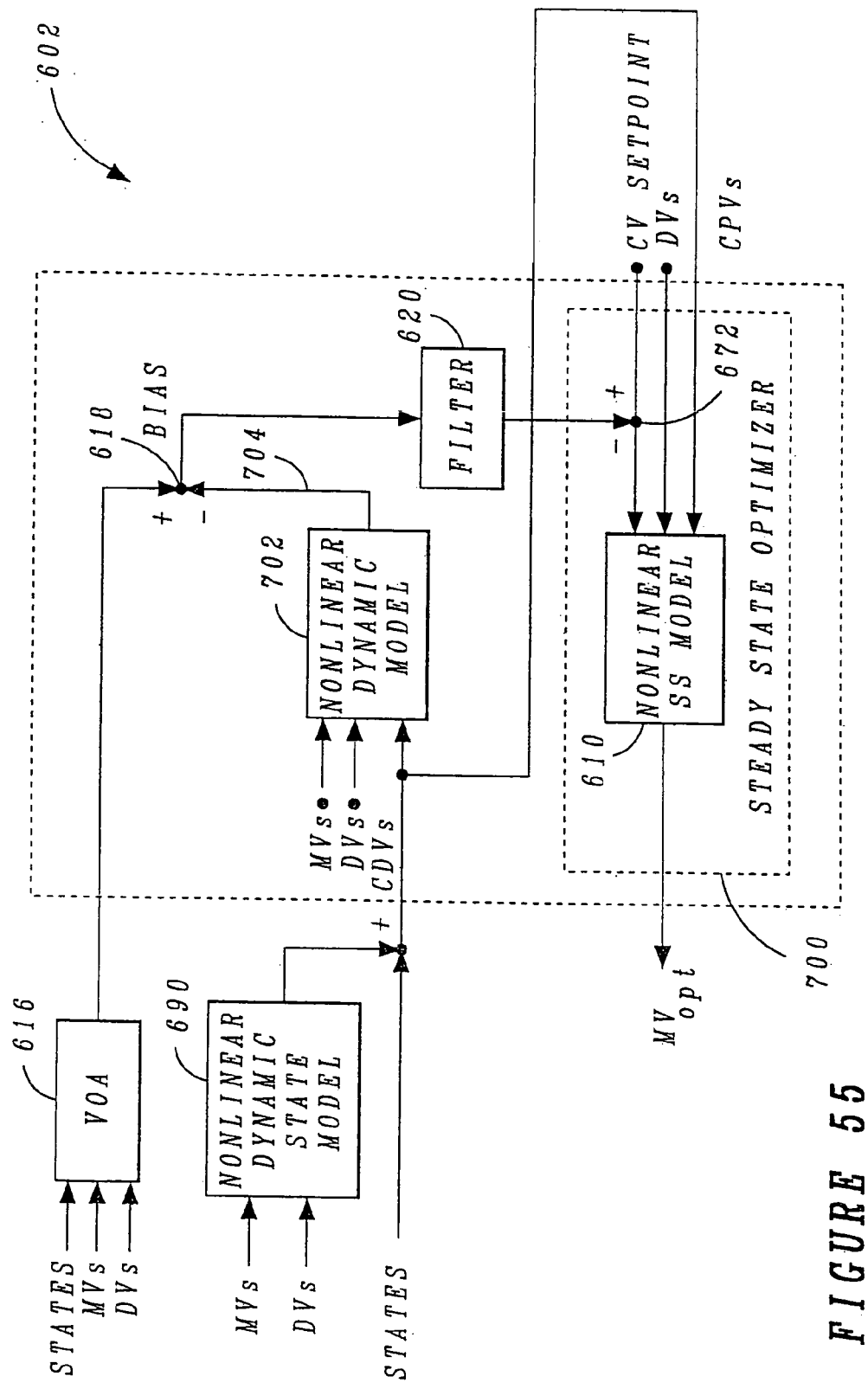
FIG. 55 illustrates an overall block diagram of an optimization circuit utilizing computed disturbance variables.

Referring now to FIG. 55, there is illustrated a detailed block diagram of the model described in FIG. 47. The non-linear steady state model 610, described hereinabove, is trained utilizing manipulated variables (MV) as inputs with the outputs being the CVs. In addition it also utilizes the DVs. The model therefore is a function of both the MVs, the DVs and also the CDVs, as follows:

$$CV = f(MV, DV, CDV) \qquad (81)$$

The non-linear steady state model 610 is utilized in an optimization mode wherein a cost function is defined to which the system is optimized such that the MVs can move only within the constraints of the cost function. The cost function is defined as follows:

$$J = f(MV, DV, CV_{SET}) \qquad (82)$$

noting that many other factors can be considered in the cost function, such as gain constrains, economic factors, etc. The optimized manipulatable variables ($MV_{OPT}$) are determined by iteratively moving the Mvs based upon the derivative dJ\dMV. This is a conventional optimization technique and is described in Mash, S. G. and Sofer, A., "Linear and Nonlinear Programming," McGraw Hill, 1996, which is incorporated herein by reference. This conventional steady state optimizer is represented by a block 700 which includes the non-linear steady state model 610 which receives both the CDVs, the DVs and a CV set point. However, the set point is offset by the offset block 672. This offset is determined utilizing a non-linear dynamic prediction network comprised of the dynamic non-linear state model 690 for generating the CDVs, from FIG. 53, which CDVs are then input to a non-linear dynamic model 702. Therefore, the combination of the dynamic non-linear state model 690 for generating the CDVs and the non-linear dynamic model 702 provide a dynamic prediction on output 704. This is input to the difference circuit 618 which provides the bias for input to the filter 620. Therefore, the output of the VOA 616 which receives both states as an input the MVs and DVs as inputs provides an output that represents the current output of the plant. This is compared to the predicted output and the difference thereof constitutes a bias. VOA 616 can be a real time analyzer that provides an accurate representation of the current output of the plant. The non-linear dynamic model 702 is related to the non-linear steady state model 610 as described hereinabove, in that the gains are related.

The use of the non-linear dynamic model 702 and the dynamic non-linear state model 690 provides a dynamic representation of the plant which can be compared to the output of the VOA 616. Therefore the bias will represent the dynamics of the system and, therefore, can be utilized on line.

Figure 56:
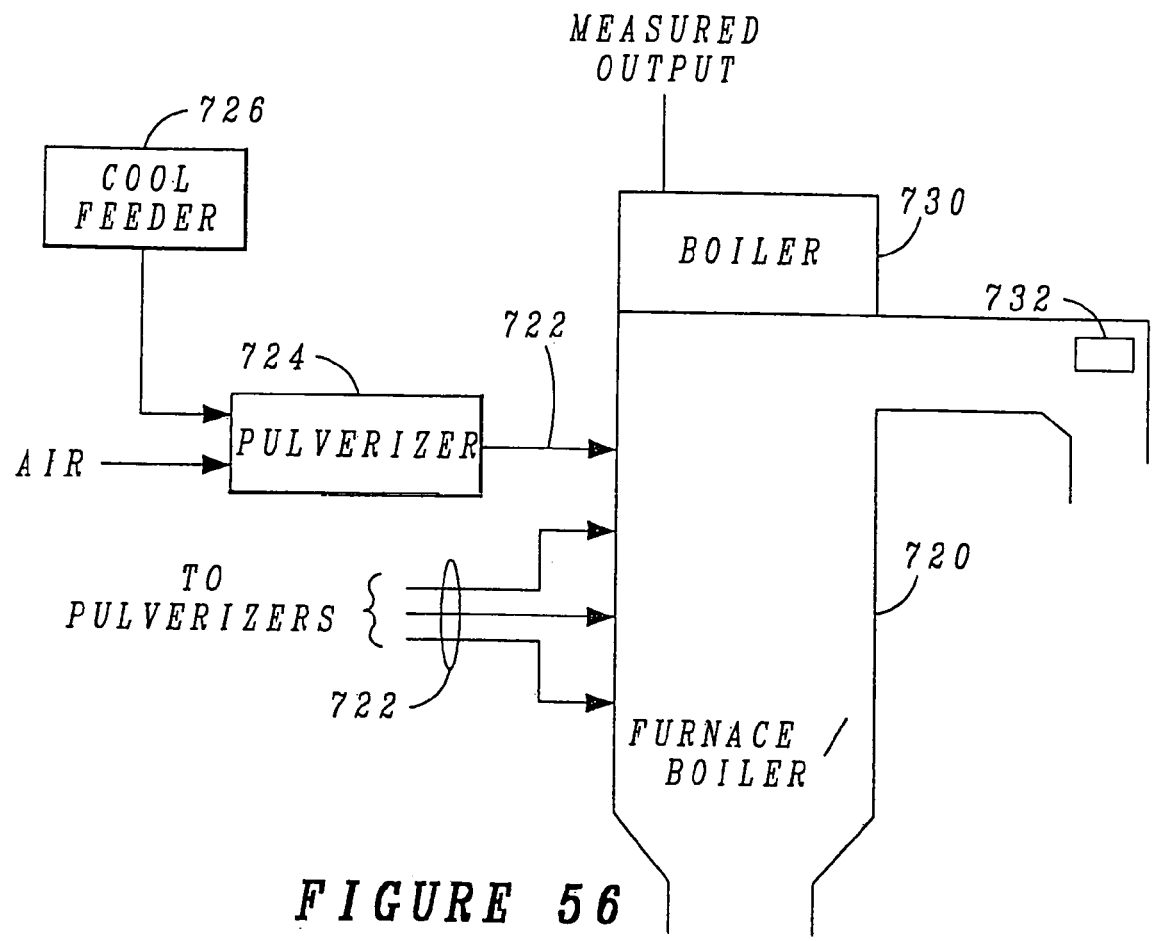
FIG. 56 illustrates a diagrammatic view of furnace/boiler system which has associated therewith multiple levels of coal firing.

Referring now to FIG. 56, there is illustrated a diagrammatic view of a furnace/boiler system which has associated therewith multiple levels of coal firing. The central portion of the furnace/boiler comprises a furnace 720 which is associated with the boiler portion. The furnace portion 720 has associated therewith a plurality of delivery ports 722 spaced about the periphery of the boiler at different elevations. Each of the delivery ports 720 has associated therewith a pulverizer 724 and a coal feeder 726. The coal feeder 726 is operable to feed coal into the pulverizer 724 at a predetermined rate. The pulverizer 724 mixes the pulverized coal with air and then injects it into the furnace portion 720. The furnace/boiler will circulate the heated air through multiple boiler portions represented by a section 730 which provides various measured outputs (CV) associated with the boiler operation as will be described hereinbelow. In addition, the exhaust from the furnace which is re-circulated, will have nitrous oxides ($NO_X$) associated therewith. An $NO_X$ sensor 732 will be provided for that purpose.

Figure 57:
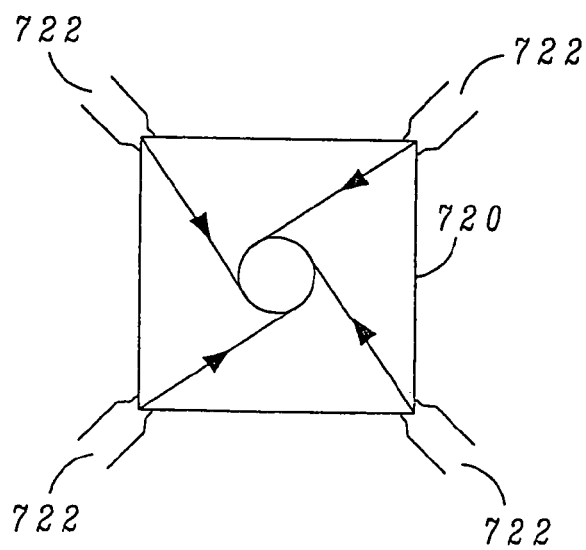
FIG. 57 illustrates a supply top sectional view of the tangentially fired furnace.

Referring now to FIG. 57, there is illustrated a cross-sectional view of the furnace portion 720 illustrating four of the delivery ports 722 spaced about the periphery of the furnace portion 720. The pulverized coal is directed into the furnace portion 720 to the interior thereof tangential to what is referred to as a "fireball" interior to the furnace. This is what is referred to as a "tangentially fired" boiler. Utilizing this technique, a conventional technique, a fireball can be created proximate to the delivery or inlet ports 722. Further, the feed rates for each of the elevations and the associated inlet ports 722 can be controlled in order to define the center of the fireball. By varying the feed rates to the various elevations, this fireball can be placed at certain levels. The placement of this fireball can have an effect on the efficiency and the $NO_X$ level. For this particular application, two important features to control or optimize are the efficiency and the $NO_X$ levels.

In these boilers with multiple elevations of coil firing, the combination of the elevations in service is an important parameter when utilizing a prediction and optimization system. This is specifically so with respect to optimizing the $NO_X$ emissions and the performance parameters. Additionally, some of these boilers in the field have excess installed pulverizer capacity for delivering fuel for each elevation and, therefore, opportunities exist to alter the way fuel is introduced using any given combination, as additional fuel can be added. In general, for any given output level a relatively stable coal feed rate is required such that the increase or decrease of fuel flow to one elevation results in a corresponding, opposite direction change in coal flow to another elevation. A typical utility boiler will have between four to eight elevations of fuel firing and may have dual furnaces. This presents a problem in that representation of a plant in a neural network or some type of first principals model will require the model to represent the distribution of fuel throughout the boiler in an empirical model with between four and sixteen highly correlated, coal flow input variables. Neural networks, for example, being nonlinear in nature, will be more difficult to train with so many variables.

Much of the effect on the $NO_X$ emissions and performance parameters, due to these changes in fuel distribution, relate to relative height in the boiler that the fuel is introduced. Concentrating the fuel in the bottom of the furnace by favoring the lower elevations of coal firing will yield different output results than that concentrating the fuel at the top of the furnace. The concept of Fuel Elevation has been developed in order to represent the relative elevation of the fuel in the furnace as a function of the feed rate and the elevation level. This provides a single parameter or manipulatable variable for input to the network which is actually a function of multiple elevations and feed rate. The Fuel Elevation is defined as a parameter that increases between "0" and "1" as fuel is introduced higher in the furnace. Fuel Elevation is calculated according to the following equation:

where:

$$_{Fe}Fe = \frac{(K_1)(R_1) + (K_2)(R_2) + (K_3)(K_4)\ldots + (K_n)(R_n)}{R_1 + R_2 + R_3 \ldots + R_n} \quad (83)$$

Calculated Fuel Elevation $K_1 \ldots K_n$ = Elevation Constant for elevation 1 to n (described hereinbelow)

$R_1 \ldots R_n$ = Coal Feed Rate for elevation 1 to n

Constants for each elevation are calculated to represent the relative elevation that the coal from each elevation is introduced. For example, for a unit with four elevations of fuel firing, there are four compartments each representing 25% of the combustion area. If the fuel is introduced to the furnace at the center of the each of the combustion areas, then the Fuel Elevations constants for the lowest to the highest elevations are 0.125, 0.375, 0.625 and 0.875.

Figure 58:
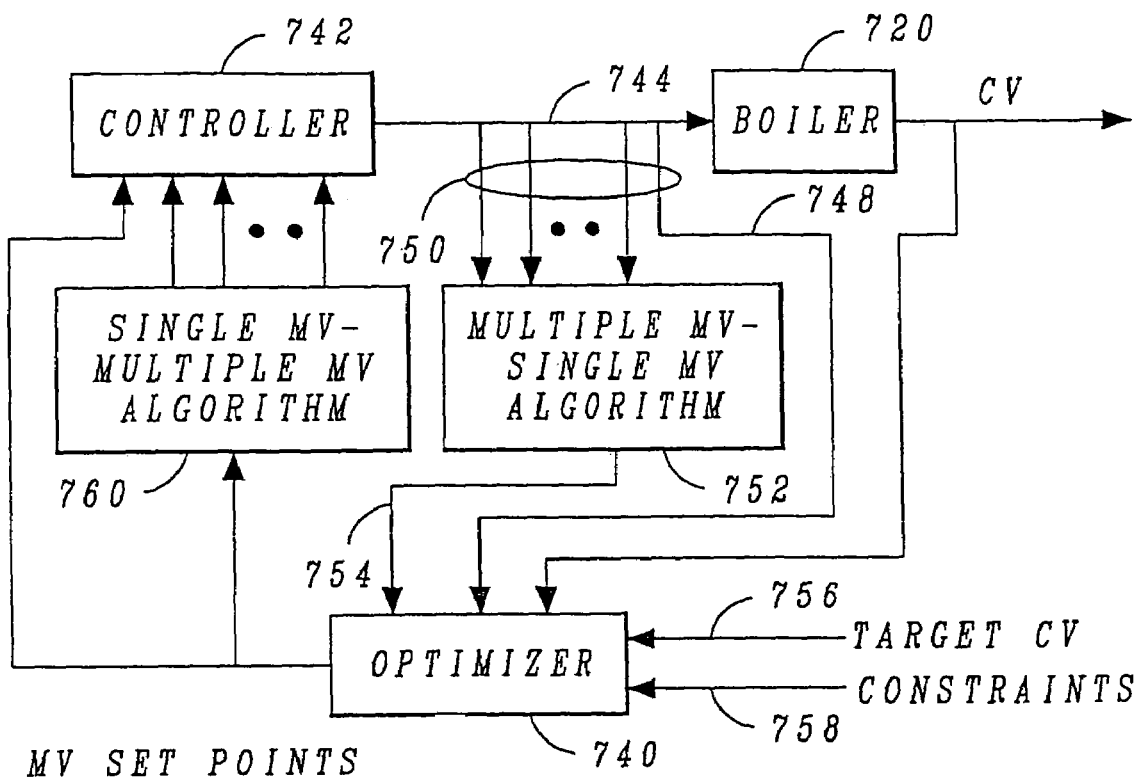
FIG. 58 illustrates a block diagram of one application of the on-line optimizer.

Referring now to FIG. 58, there is illustrated a block diagram of the boiler/furnace 720 connected in a feedback or control configuration utilizing an optimizer 740 in the feedback loop. A controller 742 is provided, which controller 742 is operable to generate the various manipulatable variables of the input 744. The manipulatable variables, or MVs, are utilized to control the operation of the boiler. The boiler will provide multiple measurable outputs on an output 746 referred to as the CVs of the system or the variables to be controlled. In accordance with the disclosed embodiment, some of the outputs will be input to the optimizer 740 in addition to some of the inputs.

There are some inputs that will be directly input to the optimizer 740, those represented by a vector input 748. However, there are a plurality of other inputs, represented by input vector 750, which are combined via a multiple MV-single MV algorithm 752 for input to the optimizer 740. This algorithm 752 is operable to reduce the number of inputs and utilize a representation of the relationship of the input values to some desired result associated with those inputs as a group. In the disclosed embodiment, this is the Fuel Elevation. This, therefore, results in a single input on a line 754 or a reduced set of inputs.

The optimizer 740 is operable to receive a target CV on a vector input 756 and also various constraints on input 758. These constraints are utilized by the optimizer, as described hereinabove. This will provide a set of optimized MVs. Some of these MVs can be directly input to the controller, those that are of course correlated to the input vector 748. The input vector or MV corresponding to the vector input 754 will be passed through a single MV-multiple MV algorithm 760. This algorithm 760 is basically the inverse of the algorithm 752. In general, this will represent the above-noted Fuel Elevation calculation. However, it should be recognized that the algorithm 752 could be represented by a neural network or some type of model, as could the algorithm 760, in additional to some type of empirical model. Therefore, the multiple inputs need to be reduced to a lessor number of inputs or single input via some type of first principals algorithm or some type of predetermined relationship. In order to provide these inputs to the boiler, they must be processed through the inverse relationship. It is important to note, as described hereinabove, that the optimizer 740 will operate on-line, since it takes into account the dynamics of the system.

Figure 59:
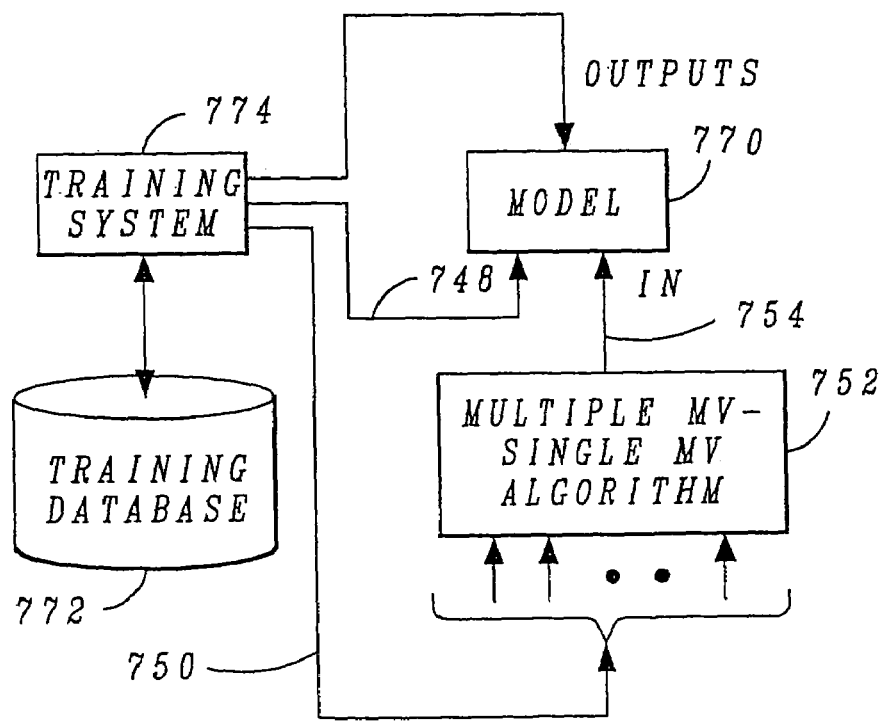
FIG. 59 illustrates a block diagram of training algorithm for training a model using a multiple to single MV algorithm.

Referring now to FIG. 59, there is illustrated a block diagram of the training system for training the optimizer 740 at the neural networks. A general model 770 is provided which is any type of trainable nonlinear model. These models are typically trained via some type of backpropagation technique such that a training database is required, this represented by training database 772. A training system 774 operates the model 770 such that it is trained on the outputs and the inputs. Therefore, inputs are applied thereto with target outputs representing the plant. The weights are adjusted in the model through an iterative procedure until the error between the outputs and the inputs is minimized. This, again, is a conventional technique.

In the disclosed embodiment, since there is defined a relationship between multiple inputs to a single or reduced set of inputs, it is necessary to train the model 770 with this relationship in place. Therefore, the algorithm 752 is required to reduce the plurality of inputs on vector 750 to a reduce set of inputs on the vector 754, which, in the disclosed embodiment, is a single value. This will constitute a single input or a reduced set of inputs that replace the multiple inputs on vector 750, which input represents some functional relationship between the inputs and some desired or observed behavior of the boiler. Thereafter, the remaining inputs are applied to the model 770 in the form of the vector 748. Therefore, once the model 770 is trained, it is trained on the representation generated by the algorithm in the multiple MV-single MV algorithm 752.

Figure 60:
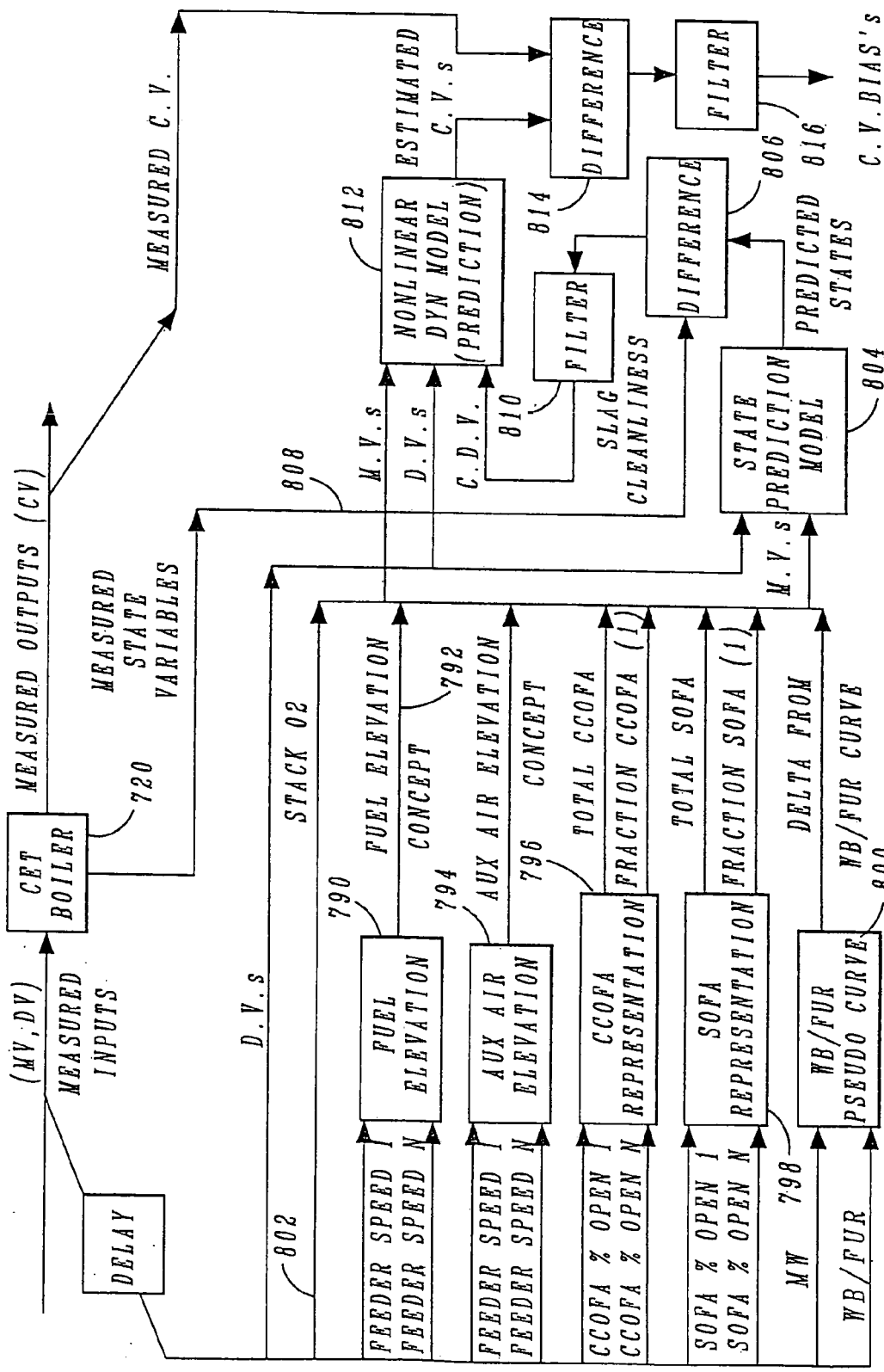
FIGS. 60 and 61 illustrate more detailed block diagrams of the embodiment of FIG. 57.
Figure 61:
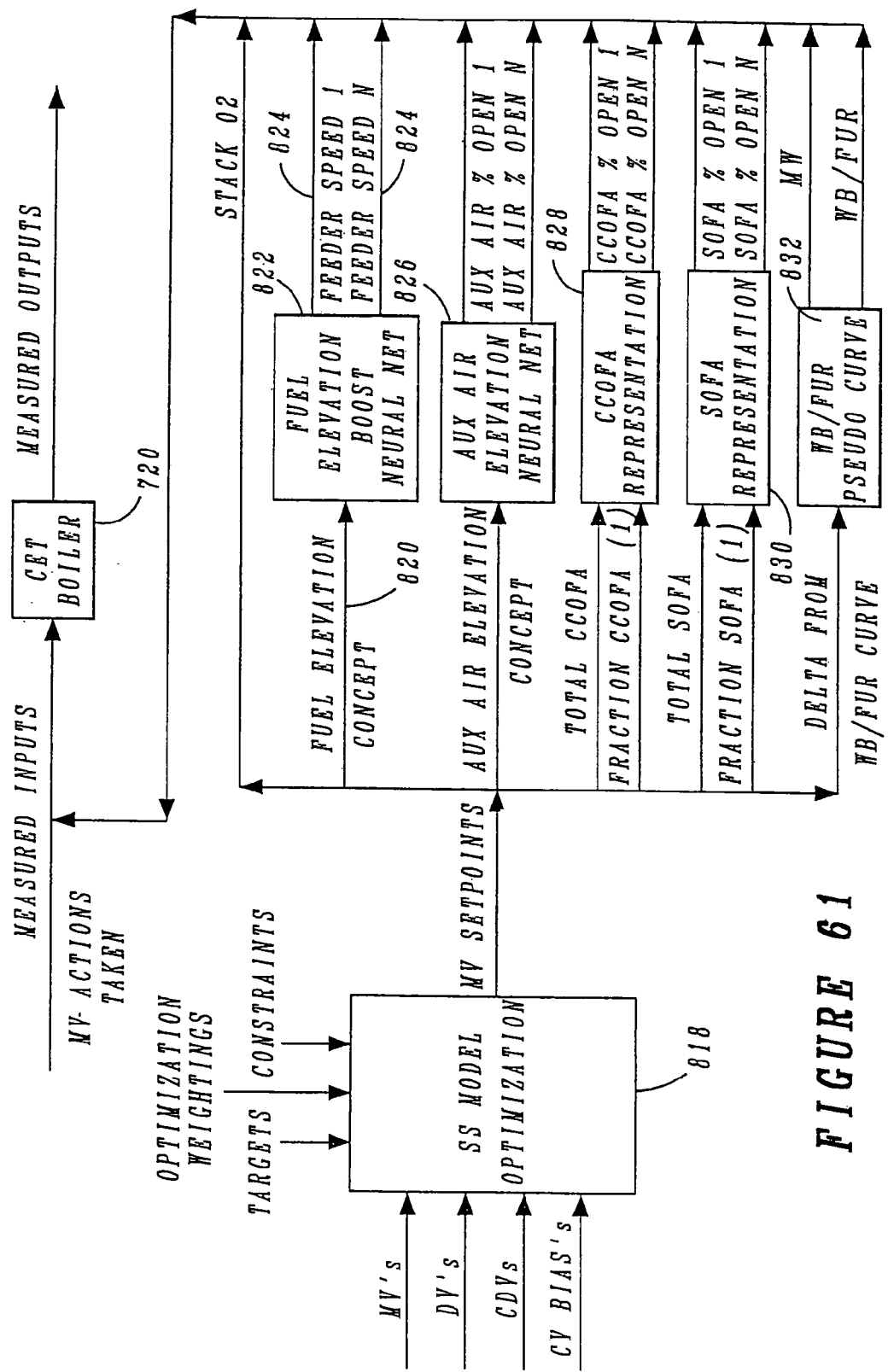

Referring now to FIGS. 60 and 61, there is illustrated a more detailed block diagram of the embodiment of FIG. 57. The portion of the embodiment illustrated in FIG. 59 is directed toward that necessary to generate the CV bias for biasing the set points. There are a plurality of measured inputs (MV) that are provided for the conventional boiler. These are the feeder speeds for each of the pulverizers, the Close Coupled Over-fired Air (CCOFA) value comprising various vents or dampers that have a preset open value, a Separated Over-fired Air (SOFA) value which also is represented in terms of a percent open of select dampers, a tilt value, which defined the tilt of the inlet ports for injecting the fuel, the Wind Box to Furnace Pressure (WB/Fur) which all are utilized to generate input variables for a network.

With respect to outputs, the outputs will be in the form of the $NO_X$ values determined by a sensor: the dry gas loss, the main steam temperature, and the loss on ignition (LOI) for both reheat and superheat.

Of the inputs, the feeder speeds are input to a Fuel Elevation algorithm block 790 which provides a single output on an output 792 which is referred to as the Fuel Elevation concept, a single value. In addition, the multiple feeder speeds are input to an auxiliary air elevation algorithm block 794, which also provides a single value representing auxiliary air elevation, this not being described in detail herein, it being noted that this again is a single value representing a relationship between multiple inputs and a desired parameter of the boiler. The CCOFA values for each of the dampers provide a representation of a total CCOFA value and a fraction CCOFA value, and represented by an algorithm block 796. This is also the case with the SOFA representation in a block 798 and also with the WB/Fur representation wherein a pseudo curve is utilized and a delta value is determined from that pseudo curve based upon the multiple inputs. This is represented by a block 800. The output of all of the blocks 790, 794, 796, 798, and 800 provide the MVs in addition to the Stack $O_2$ value on a line 802. These are all input to a state prediction model 804 similar to the model 690 in FIG. 55. This model also receives the disturbance variables (DV) for the system, these not being manipulatable inputs to the boiler. The state prediction then provides the predicted states to a difference block 806 for determining the difference between predicted states and the measured state variable output by the boiler 720 on a line 808 which provides the measured states. This is the current output of the boiler 720. The difference block 806 provides the Computed Disturbance Variables (CDV) which are filtered in a filter 810. This essentially, for the boiler, will be due to the slag and the cleanliness of the boiler. Thereafter, the CDVs, the MVs and the DVs are input to a model 812, which basically is the nonlinear dynamic model 702. The output of model 812 provides the estimated CVs which are then compared with the measured CVs in a difference block 814 to provide through a filter 816 the CV bias value.

Referring further to FIG. 60, the CV bias value output by the filter 816 is input to a steady state model optimization block 818, in addition to the MVs, DVs, and the CDVs. In addition, there are provided various targets in the form of set points, various optimization weightings and various constraints such as gain constraints, etc. This is substantially identical to the steady state optimizer 700 illustrated in FIG. 55. It should be understood that this is a conventional optimization technique which defines a cost function which operates on the targets, constraints, and the optimization weightings in the cost function relationship and then essentially utilizes the derivative of the cost function to determine the move of the MV. This is conventional and is described in Mash, S. G. and Sofer, A., "Linear and Nonlinear Programming," McGraw Hill, 1996, which was incorporated herein by reference.

The optimization model 818 will provide MV set points. These MV set points could be, for such MVs as the Stack $O_2$, input directly to the boiler 720 for control thereof as a new input value. However, when the MVs that represent the single values such as Fuel Elevation which relates back to multiple inputs must be processed through the inverse of that relationship to generate the multiple inputs. For example, Fuel Elevation value is provided as MV on a line 820 for input to a Fuel Elevation neural network 822 which models the relationship of Fuel Elevation to feeder speed. However, a neural network is not necessarily required in that the basic relationship described hereinabove with respect to Fuel Elevation will suffice and the algorithm required is only the inverse of that relationship. This will provide on the output feeder speeds on lines 824, which are multiple inputs. In addition, the auxiliary elevation is processed through a representation of a neural network which relates the multiple auxiliary air open values to the MV input in a block 826. The CCOFA representation provides the same inverse relationship in a block 828 to provide the MV set points associated therewith, the CCOFA, and the fraction CCOFA and provide the CCOFA percent open values. Of the SOFA MVs, the total SOFA and the fraction SOFA are processed through an inverse SOFA representation to provide the SOFA percent open inputs to the boiler 720. Lastly, the delta value from the WB/Fur curve is provided as MV set point through an inverse relationship in a block 832 in order to determine the WB/Fur input value to the boiler 720. All of these operations, the optimization and the conversion operations, are done in real time, such that they must take into account the dynamics of this system. Further, as described hereinabove, by reducing the amount of inputs, the actual steady state models and dynamic models will provide a better representation, and the sensitivities have been noted as being augmented for these representations. With this technique, the center of mass of the ball in the furnace 720 can be positioned with the use of one representative input modeled in the neural network or similar type model to allow efficiency and NOx to be optimized. It is noted that each of the inputs that represents multiple inputs to any of the algorithm blocks noted hereinabove and which are represented by a single variable each have a predetermined relationship to each other, i.e., the feed rate at each elevation has some relationship to the other elevations only with respect to a parameter defined as the center of mass of the fireball. Otherwise, each of these feeder rates is independent of each other. By defining a single parameter that is of interest and the relationship between the inputs to define this relationship, then that parameter itself can become a more important aspect of the model.

In summary, there has been provided an on-line optimizer which provides an estimation of a plant which can then be compared to the actual output of the plant. This difference creates a bias which bias will then be utilized to create an offset to target set points for the optimization process. Therefore, the steady state optimizer, which can include a nonlinear steady model for a multi-variable system can be optimized for gain as opposed to an accurate prediction. A nonlinear dynamic model provides for an accurate prediction and also provides an estimation of the dynamics of the system. Therefore, the bias will have reflected therein dynamics of the system.

Although the preferred embodiment has been described in detail, it should be understood that various changes, substitutions and alterations can be made therein without departing from the spirit and scope of the invention as defined by the appended claims.

Appendix: The Second Derivatives

Gradient descent (equation 66) requires the second derivatives $$\frac{\partial}{\partial w}\left(\frac{\partial y_k}{\partial x_i}\right) \quad (84)$$

where w denotes an arbitrary weight or bias in the network. This Appendix gives the expressions for these second derivatives.

Direct input-output connections are often necessary in real applications. Generalizing the recursive equations of (lee and Oh 1007) to include layer-skipping connections would be relatively straight-forward. Instead, the second derivatives are provided in an easy-to-implement nonrecursive form for the usual three-layer network, and include direct input-output connections.

Full connectivity between layers is not assumed. A second derivative $\partial/\partial w(\partial y_k/\partial x_i)$ is zero if no path exists from w to $y_k$. The questions below are valid provided weights corresponding to non-existing connections are fixed at zero.

Let $a_k$ and $a_j$ denote the total input to the model to output $y_k$ and to hidden layer $h_j$ respectively:

$$a_k = \sum_j w_{kj} h_j + \sum_i w_{ki} x_i b_k \quad (85)$$

$$a_j = \sum_i w_{ji} x_i + b_j \quad (86)$$

The activation values are then $$y_k^\sigma = \sigma(a_k) \quad y_k^L = a_k \quad (87)$$

$$h_j^\sigma = \sigma(a_j) \quad h_j^L = a_j \quad (88)$$

where the superscripts a and L indicate sigmoid and linear units, respectively, and a(.) Is the usual sigmoid transfer function $a(a)=(1+e^{-a})^{-1}$. The derivatives for output and hidden units are then $$y_k' \equiv \frac{dy_k}{da_k} = \begin{cases} y_k(1-y_k) & \text{for } y_k^\sigma \\ 1 & \text{for } y_k^L \end{cases} \quad (89)$$

$$h_j' \equiv \frac{dh_j}{da_j} = \begin{cases} h_j(1-h_j) & \text{for } h_j^\sigma \\ 1 & \text{for } h_j^L \end{cases} \quad (90)$$

For conciseness in the equations below, we define the quantities $$u_k = \begin{cases} 1-2y_k & \text{for } y_k^\sigma \\ 0 & \text{for } y_k^L \end{cases} \quad (100)$$

-continued $$u_j = \begin{cases} 1-2h_j & \text{for } h_j^\sigma \\ 0 & \text{for } h_j^L \end{cases} \quad (101)$$

The gains $\partial y_k/\partial x_i$ appearing in the equations below are computed according to the above described section entitled "Training Procedure."

The second derivative equations are written separately for each type of weight and bias:

Hidden-Output Weight:

$$\frac{\partial}{\partial w_{kj}}\left(\frac{\partial y_m}{\partial x_n}\right) = \delta_{km}\left(u_m h_j \frac{\partial y_m}{\partial x_n} + y_m' h_j' w_{jn}\right) \quad (102)$$

Where $\delta_{km}$ is a Kronecker delta.

Input-Output Weight:

$$\frac{\partial}{\partial w_{ki}}\left(\frac{\partial y_m}{\partial x_n}\right) = \delta_{km}\left(u_m x_i \frac{\partial y_m}{\partial x_n} + y_m' \delta_{in}\right) \quad (103)$$

Input-Hidden weight:

$$\frac{\partial}{\partial w_{ji}}\left(\frac{\partial y_m}{\partial x_n}\right) = h_j' w_{mj}\left[u_m x_i \frac{\partial y_m}{\partial x_n} + y_m'(u_j x_i w_{jn} + \delta_{in})\right] \quad (104)$$

Output Bias:

$$\frac{\partial}{\partial b_k}\left(\frac{\partial y_m}{\partial x_n}\right) = \delta_{km}\left(u_m \frac{\partial y_m}{\partial x_n}\right) \quad (105)$$

Hidden Bias:

$$\frac{\partial}{\partial b_j}\left(\frac{\partial y_m}{\partial x_n}\right) = h_j' w_{mj}\left(u_m \frac{\partial y_m}{\partial x_n} + y_m' u_j w_{jn}\right) \quad (106)$$

What is claimed is:

1. A system for managing a plant or process, comprising:
    a computer system, comprising:
        a processor; and
        a memory medium coupled to the processor, wherein the memory stores program instructions executable by the processor to implement a model, wherein the model comprises a representation of a plant or process, and wherein the plant or process comprises linear and non-linear aspects;
    an input, coupled to the computer system, wherein the input is operable to receive an input vector comprising one or more inputs for the model, each input representing an attribute of the plant or process; and
    an output, coupled to the computer system;
    wherein the model comprises:
        a linear portion, representing the linear aspects of the plant or process; and
        a non-linear portion, representing the non-linear aspects of the plant or process, wherein the nonlinear portion comprises a function, wherein for each of the one or more inputs, $x_i$, the function is of the form:

$$f = \ln\frac{1}{1 + e^{u_i}}$$

wherein $$u_i = \frac{x_i - x_i^a - \frac{1}{2}(x_i^b - x_i^a)}{\frac{1}{4}(x_i^b - x_i^a)}; \text{ and}$$

wherein $x_i^a$ and $x_i^b$ are regression variables;

wherein the processor is operable to execute the model to compute a predicted output corresponding to one or more attributes of the plant or process, based on the received input vector; and wherein the output is operable to provide the predicted output to manage the plant or process.

2. The system of claim 1, wherein the model is operable to be trained by a training process, wherein the training process is operable to:
  a) receive training input data representative of inputs to the plant or process;
  b) execute the model to generate predicted training output data for the plant or process corresponding to the training input data;
  c) compare the predicted training output data to training output data representative of output of the plant or process to determine an error;
  d) update the model in accordance with the determined error; and
  e) perform a)–d) in an iterative manner to minimize the error.

3. The system of claim 2, wherein, to train the model, the training process is operable to train the model to optimize a specified objective function.

4. The system of claim 3, wherein the training process is operable to train the model to optimize the specified objective function subject to one or more constraints.

5. The system of claim 4, wherein the system further comprises an optimizer coupled to the model, wherein the one or more constraints comprise one or more of:
  one or more hard constraints, wherein the one or more hard constraints comprise strict limitations on the training process in optimizing the objective function; and/or
  one or more soft constraints, wherein the one or more soft constraints comprise a weighted penalty function comprised in the objective function.

6. The system of claim 5, wherein the optimizer comprises a non-linear programming (NLP) optimizer.

7. The system of claim 4,
  wherein the model comprises one or more gains, wherein each gain comprises a partial derivative of an output with respect to a respective input, wherein the one or more constraints comprise one or more gain constraints.

8. The system of claim 7, wherein each of the one or more inputs has a lower bound and an upper bound, wherein the gain constraints comprise respective constraints on the gain at the lower bound and/or the upper bound of the respective input.

9. The system of claim 4, wherein the one or more constraints comprise one or more soft constraints, and wherein the training process is operable to train the model via gradient descent.

10. The system of claim 1, wherein the model comprises a neural network.

11. The system of claim 1, wherein the system further comprises:
  a module coupled to the plant or process, wherein the module is operable to:
    receive plant or process input data;
    provide the plant or process input data to the model as input;
    execute the model to generate predicted plant or process output based on the plant or process input data; and
  wherein the predicted plant or process output is useable to manage the plant or process.

12. The system of claim 1, wherein the system further comprises:
  an optimizer coupled to the plant or process;
  wherein the optimizer is operable to utilize the model for optimization of the plant or process, wherein, to utilize the model for optimization of the plant or process, the optimizer is operable to:
    receive desired plant or process output;
    use the desired plant or process output to generate optimized plant or process inputs;
    provide the optimized plant or process inputs to the plant or process to operate the plant or process to produce optimized plant or process output substantially in accordance with the desired plant or process output.

13. The system of claim 12, wherein, to optimize the plant or process, the optimizer is operable to optimize a specified objective function.

14. The system of claim 13, wherein the optimizer is operable to optimize the specified objective function subject to one or more constraints.

15. The system of claim 14, wherein the one or more constraints comprise one or more of:
  one or more hard constraints, wherein the one or more hard constraints comprise strict limitations on the training process in optimizing the objective function; and/or
  one or more soft constraints, wherein the one or more soft constraints comprise a weighted penalty function comprised in the objective function.

16. The system of claim 15, wherein the optimizer comprises a non-linear programming (NLP) optimizer.

17. The system of claim 14, wherein the one or more constraints comprise one or more soft constraints, and wherein the optimizer is operable to optimize the plant or process via gradient descent.

18. A computer-accessible memory medium that stores program instructions implementing a model of a plant or process, wherein the program instructions are executable by a processor to perform:
  receiving an input vector comprising one or more inputs, each input representing an attribute of a plant or process, wherein the plant or process comprises linear and non-linear aspects, wherein the model comprises a linear portion representing the linear aspects of the plant or process, and a non-linear portion, representing the non-linear aspects of the plant or process, and wherein the non-linear portion comprises a function, and wherein for each of the one or more inputs, $x_i$, the function is of the form:

$$f = \ln\frac{1}{1+e^{u_i}}$$

wherein $$u_i = \frac{x_i - x_i^a - \frac{1}{2}(x_i^b - x_i^a)}{\frac{1}{4}(x_i^b - x_i^a)}; \text{ and}$$

wherein $x^a_i$ and $x^b_i$ are regression variables;

computing predicted output corresponding to one or more attributes of the plant or process using the model; and outputting the predicted output, wherein the predicted output is usable to manage the plant or process.

19. The memory medium of claim 18, wherein the program instructions are further executable to perform:

executing an optimizer coupled to the plant or process to utilize the model for optimization of the plant or process, wherein the optimizer is executable to perform:

receiving desired plant or process output;

using the desired plant or process output to generate optimized plant or process inputs;

providing the optimized plant or process inputs to the plant or process to operate the plant or process to produce optimized plant or process output substantially in accordance with the desired plant or process output.

20. The memory medium of claim 18, wherein the model comprises a neural network.

21. A method for managing a plant or process, comprising:

receiving one or more inputs to a model, each input representing an attribute of a plant or process, wherein the process comprises linear aspects and non-linear aspects, wherein the model comprises a representation of the plant or process, wherein the model comprises a linear portion representing the linear aspects of the plant or process, and a non-linear portion representing the non-linear aspects of the plant or process, and wherein the non-linear portion comprises a function, and wherein for each of the one or more inputs, $x_i$, the function is of the form:

$$f = \ln\frac{1}{1+e^{u_i}}$$

wherein $$u_i = \frac{x_i - x_i^a - \frac{1}{2}(x_i^b - x_i^a)}{\frac{1}{4}(x_i^b - x_i^a)}; \text{ and}$$

wherein $x^a_i$ and $x^b_i$ are regression variables;

computing predicted output corresponding to one or more attributes of the plant or process using the model; and outputting the predicted output, wherein the predicted output is usable to manage the plant or process.

22. The method of claim 21, further comprising:

an optimizer coupled to the plant or process executing to utilize the model for optimization of the plant or process, comprising:

receiving desired plant or process output;

using the desired plant or process output to generate optimized plant or process inputs;

providing the optimized plant or process inputs to the plant or process to operate the plant or process to produce optimized plant or process output substantially in accordance with the desired plant or process output.

23. The method of claim 21, wherein the model comprises a neural network.

* * * * *